US010553126B2

(12) United States Patent
Volpa et al.

(10) Patent No.: US 10,553,126 B2
(45) Date of Patent: Feb. 4, 2020

(54) VIDEO ROLE-PLAY LEARNING SYSTEM AND PROCESS

(71) Applicant: Rebellion Training, LLC, Reno, NV (US)

(72) Inventors: Darik Volpa, Reno, NV (US); Joseph Szakara, Reno, NV (US); Ian Berry-Jewett, Easton, PA (US)

(73) Assignee: Rebellion Training, LLC, Reno, NV (US)

( * ) Notice: Subject to any disclaimer, the term of this patent is extended or adjusted under 35 U.S.C. 154(b) by 345 days.

(21) Appl. No.: 15/142,260

(22) Filed: Apr. 29, 2016

(65) Prior Publication Data

US 2016/0351064 A1    Dec. 1, 2016

Related U.S. Application Data

(63) Continuation of application No. PCT/US2014/063558, filed on Oct. 31, 2014.

(60) Provisional application No. 61/962,155, filed on Oct. 31, 2013.

(51) Int. Cl.
*A63F 13/00* (2014.01)
*G09B 5/14* (2006.01)

(52) U.S. Cl.
CPC ..................... *G09B 5/14* (2013.01)

(58) Field of Classification Search
CPC . G09B 5/02; G09B 5/065; G09B 5/08; G09B 5/14
See application file for complete search history.

(56) References Cited

U.S. PATENT DOCUMENTS

| 2002/0059376 | A1  | 5/2002 | Schwartz |             |
|--------------|-----|--------|----------|-------------|
| 2006/0115802 | A1* | 6/2006 | Reynolds | G09B 5/00   |
|              |     |        |          | 434/236     |
| 2008/0020361 | A1* | 1/2008 | Kron     | G09B 23/28  |
|              |     |        |          | 434/262     |
| 2010/0099060 | A1  | 4/2010 | Bijou    |             |
| 2014/0057238 | A1* | 2/2014 | Okamoto  | G09B 5/06   |
|              |     |        |          | 434/308     |

OTHER PUBLICATIONS

International Search Report and Written Opinion of The International Searching Authority for International Application PCT/US2014/063558, dated Dec. 9, 2014.

* cited by examiner

*Primary Examiner* — David L Lewis
*Assistant Examiner* — Eric M Thomas
(74) *Attorney, Agent, or Firm* — Craig Macy

(57) ABSTRACT

An automated video role-play teaching system and process. In some embodiments, the system and process provides a software interface for teachers or others to establish situation scenarios for students, students to review the scenarios locally and locally record their role-play responses, which one or more teachers or others can then review in order to provide feedback to the students through the system. The interface can provide leaderboard ranking of students or role-play videos, selectable role-play scenarios established by a teacher or another, an automated calendar of role-play system related dates, such as due dates for example, and hot-seat role-play limiting the number of times a student can record the student's role-play into the system.

29 Claims, 44 Drawing Sheets

Figure 32B

VIDEO ROLE-PLAY LEARNING SYSTEM AND PROCESS

CROSS-REFERENCE TO RELATED APPLICATIONS

This application is a continuation of International Application No. PCT/US2014/063558 entitled "Video Role-Play Learning System And Process," filed on Oct. 31, 2014, which claims priority from U.S. Provisional Patent Application No. 61/962,155 entitled "Video Role-Play Learning System And Methods Of Use," filed on Oct. 31, 2013. Each of these applications are hereby incorporated by reference in their entirety.

COPYRIGHT NOTICE

This patent document contains material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF DISCLOSURE

The present application relates to the technical field of data processing devices, and more particularly, to real time transactional web applications providing automated video role-play learning.

APPLICANTS' VIEW OF SOME ASPECTS OF PRIOR ART

Role-play scenarios have been found to be particularly effective for certain types of training, such as sales training. Often one or more experts on a particular subject would travel to a location for a scheduled training session with a team of individuals, where the training would be conducted as a one-time, face-to-face, unrecorded event, often during regular business hours only. This often resulted in high training costs, limited training time for a student, limited ability to identify top performing students, limited ability of the student to practice and then review and learn from their performances (either through the review or from the teacher), little to no capturing of the level of knowledge transfer to or from students during the process, and limited access to such training by students generally.

In the field of online training generally, systems have been developed to allow a user to participate in video role-play scenarios. These systems allow a user to view scenarios and practice their response. Such systems tend to be ad-hoc, stand-alone applications that offer little to no structure in the organization of the role-play content, and lack integration with learning management systems and functions. Further, these systems typically fail to provide integration with other types of learning content. Coordinating organization, delivery, evaluation, and feedback often involves manual procedures, dual data entry, or both. In addition, existing systems often have little to no support for knowledge management, as they lack the capabilities for complex organization, integration into structured course offerings, capturing and sharing of multiple types of feedback, and identification and organization of expert knowledge.

For at least these reasons, the applicants believe that they have discovered a need for a more structured, efficient, interactive, automated, flexible, and on-demand role-play learning system.

BRIEF SUMMARY OF SOME ASPECTS OF THIS SPECIFICATION

The applicants believe that they have discovered at least some of the issues and problems, or their scope, identified in the Aspects section above. The applicants have therefore developed, among other things, automated systems, processes, and devices that solve one or more of the above-mentioned problems with video role-play learning systems. In some embodiments, the video role-play learning system allows students, instructors, or other evaluators to participate in a structured but flexible learning program, including generating, sharing, and responding to content in a manner that reduces cost and time commitments while improving training efficiency and effectiveness.

In some embodiments, a leaderboard identifies and makes available response videos by top performers ordered according to selected criteria. In some embodiments, inclusion on the leaderboard can be determined, at least in part, as a function of votes received by viewers, evaluator selection, or both. In certain instances, the set of response videos included on the leaderboard can constitute a collection of best practices by top performers, providing easy and convenient access to important business knowledge without regard to the location of the student or the availability of the responder. Some leaderboard applications can provide recognition for top performers, providing motivation and encouragement to continue or increase their participation and submission volume. Such feedback systems can result in cycle of continued content improvement, and in some embodiments can further increase the transfer and capture of institutional knowledge.

In certain instances, an automated video role-play module or service is integrated with automated functionality related to a learning management system. This integration can provide improved structure to the organization and more efficient or broad delivery of role-based learning. For example, some systems can organize role-play scenarios within courses and programs, so that role-play content delivery and availability can be tailored to a particular goal.

In some applications, the role-play scenario content can be combined with other learning content such as exams, simulations, or the like to expand the overall content included in a learning program. In some systems, performance in a role-based scenario through the automated system can then become part of the overall evaluation a student receives relating to a particular class or subject without having to treat the video role-play performance as an ad hoc data item in an evaluation.

An automated calendar module or service can provide information to a user relating to events such as expected availability of new role-play scenarios, due dates for completion of role-play scenarios, upcoming courses, and the like. This integration between calendaring and the video role-play module can improve communication of, and compliance with due dates, reduce errors, and reduce overhead associated with data entry duplication across systems. In some instances, integration with a notification service can provide a further facility for more reliably communicating important information relating to video role-play scenario activities, thus potentially reducing communication failures that might otherwise occur in the absence of such an integrated facility. In some systems, the class management and registration management functionality of the learning management system can be integrated in order to, provide seamless access to the video role-play module functionality, thus improving the user experience for the student, evaluator, or trainer.

In some embodiments, a calendar module or service can provide information to a user relating to events such as expected availability of new role-play scenarios, due dates for completion of role-play scenarios, upcoming courses, and the like. In some instances, integration between calendaring and the video role-play module or service can reduce errors and overhead associated with data entry duplication across systems. In some systems, integration of calendaring with a notification service can provide a facility for communicating important information relating to video role-play scenario activities, thus potentially reducing communication failures that might otherwise occur in the absence of such an integrated facility. In some embodiments, integration of a video role-play module or service with the class management and registration management functionality of the learning management system can provide seamless access to the video role-play module functionality, thus improving the user experience for the student, evaluator, and/or trainer.

In some implementations, video role-play scenarios can be individually designated as hotseat role-plays. A hotseat role-play limits the number of times a student can view the scenario, the number of times the student can record a response, or both. For example, some embodiments of a hotseat configuration can indicate that a student only be allowed to view a scenario once without pausing, and then record a single response. This type of restricted delivery and response can accurately simulate the pressure a student might experience in an actual situation, thus improving their confidence, their degree of preparation, and their familiarity with their weaknesses.

In addition, hotseat role-play can provide the evaluator with a more accurate understanding of the student's current performance level. Some embodiments can indicate areas in which the student should improve. Some applications can indicate when a student is not performing at a performance level that should be achieved prior to engaging in related real world scenarios.

In some embodiments, evaluators can provide various types of feedback, including video feedback, in response to the student's video response submission. Video feedback, in combination with narrative feedback and grading if desired, can improve the quality of the evaluation, thus increasing the student's understanding of their performance level as well as the student's rate of improvement. Further, enabling video feedback in combination with the video role-play scenario and response can eliminate travel dependencies for the student, the trainer, and/or the evaluator, resulting in an increase in time available for productive work and reducing costs associated with travel. This type of on-demand model for the student, trainer, and evaluator can also reduce or eliminate wait time and scheduling issues with training delivery, thus increasing training efficiency.

There are many other novel features, problem solutions, and advantages of the present specification. They will become apparent as this specification proceeds. In this regard, it is to be understood that the scope of the invention is to be determined by the claims as issued and not by whether the subject matter provides features because they are set forth in the Aspects sections of this specification.

BRIEF DESCRIPTION OF THE DRAWINGS

The applicants' preferred and other embodiments are disclosed in association with the accompanying Figures. In the Figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

FIG. 1

FIG. 32B is a screen capture of a client device of FIG. 1 displaying an alternative expanded admin users view.

DETAILED DESCRIPTION OF SOME EMBODIMENTS

Figure 1:
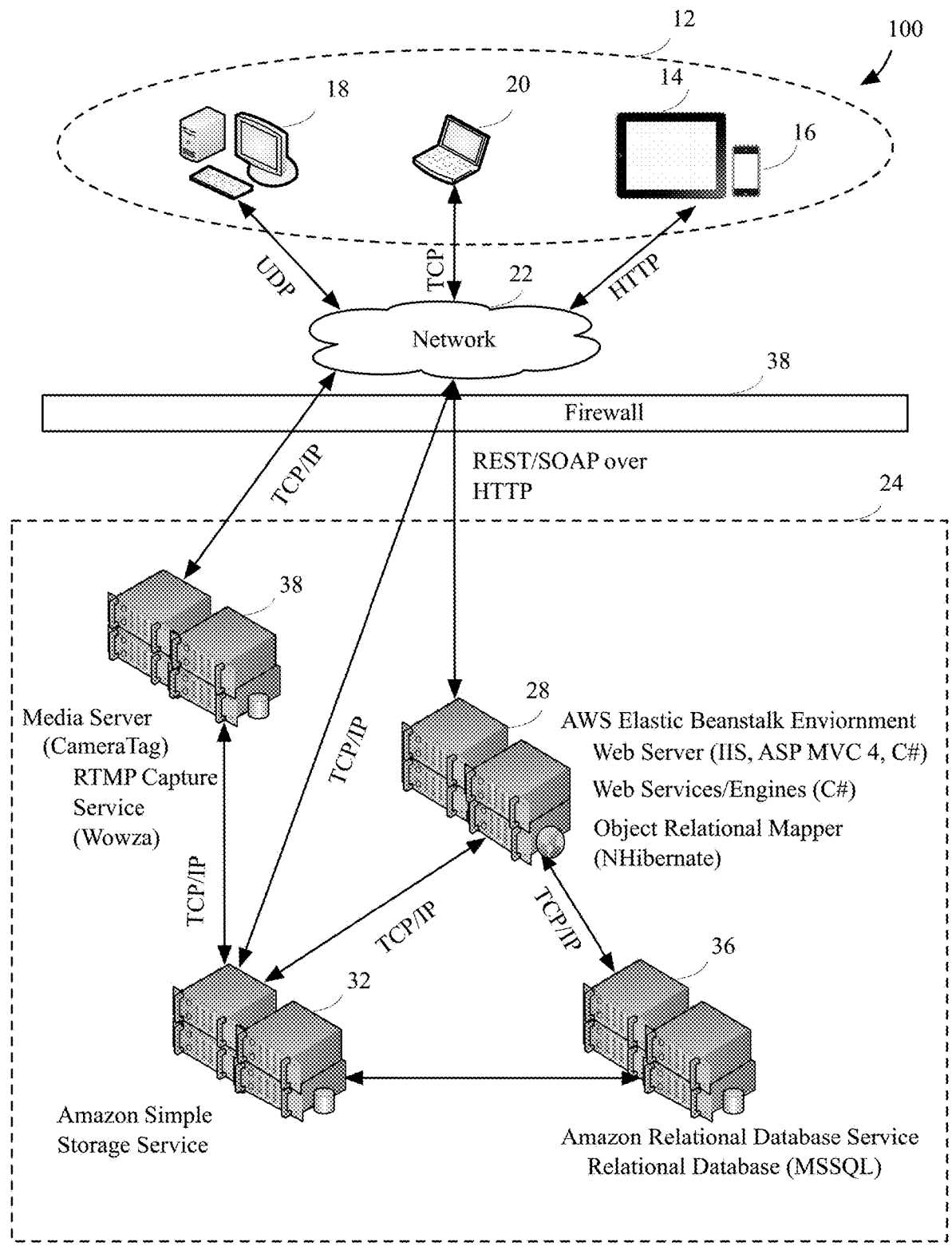
FIG. 1 is a computer network or similar digital processing environment in which a video role-play learning system can be implemented according to an exemplary embodiment.

This disclosure is directed to the technical field of automated teaching computing platforms and methods. The prior Brief Summary and the following description provide examples, and are not limiting of the scope, applicability. Changes can be made in the function and arrangement of elements discussed without departing from the spirit and scope of the disclosure. Various embodiments can omit, substitute, add, or mix and match various procedures or components as appropriate. For instance, the methods disclosed can be performed in an order different from that described, and various steps can be added, omitted, or combined. Also, features disclosed with respect to certain embodiments can be combined in or with other embodiments as well as features of other embodiments Certain embodiments of the video role-play system and methods of use are described with reference to methods, apparatus (systems), and computer program products that can be implemented by computer program instructions. These computer program instructions can be provided to a processor of a computing devices, such as a general purpose computer, special purpose computer, mobile computing device, or other programmable data processing apparatus to produce a particular machine, such that the instructions, which execute via the processor of the computing device, implement the acts specified herein to transform data from a first state to a second state, transmit data from one computing device to another computing device, and generate physical state transitions at one or more geographic locations.

These computer program instructions can be stored in a computer-readable memory that can direct a computing device or other programmable data processing apparatus to operate in a particular manner, such that the instructions stored in the computer-readable memory produce an article of manufacture including instructions for implementing the acts specified herein. The computer program instructions can also be loaded onto a computing device or other programmable data processing apparatus to cause a series of operational steps to be performed on the computing device or other programmable apparatus to produce a computer-implemented process such that the instructions which execute on the computer or other programmable apparatus provide steps for implementing the acts specified herein.

The programming of the programmable apparatus creates a new machine, creating a special purpose computer once it is programmed that performs particular functions pursuant to instructions from program instructions. The video role-play learning system can be described in terms of a dedicated circuit or a process that emulates that circuit. The software processes of the video role-play learning system are, at least in part, interchangeable with a hardware circuit. This new machine can thus be implemented as a complex array of hardware circuits, programming that facilitates the unique functions of the video role-play learning system, or both.

The various illustrative logical blocks, modules, and algorithm steps described in connection with the embodiments disclosed herein can be implemented as electronic hardware, computer software, or combinations of both. To illustrate this interchangeability of hardware and software, various illustrative components, blocks, modules, and steps have been described generally in terms of their functionality. Whether such functionality is implemented as hardware or software depends upon the particular application and design constraints imposed on the overall system. The described functionality can be implemented in varying ways for each particular application and function, but such implementation decisions should not be interpreted as causing a departure from the scope of the disclosure.

The various illustrative logical blocks and modules described in connection with the embodiments disclosed herein can be implemented or performed with a general purpose processor, a specific purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices such as, for example, a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a computer terminal. In the alternative, the processor and the storage medium can reside as discrete components in a computer terminal.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently such as, for example, through multi-threaded processing, interrupt processing, or multiple processors or processor cores, rather than sequentially. Moreover, in certain embodiments, acts or events can be performed on alternate tiers or on alternate components within the architecture.

In some embodiments, the system includes several components, such as, for example, a web application including a presentation layer in communication with a server-side business logic layer, and a cloud-based database environment employing structured data, such as, for example, SQL defined data structures. In some instances, cloud-based file stores and media stores are communicatively coupled to one or more from the group of the web application, the server side business logic layer, and the cloud-based database environment. In some implementations, one or more components are deployed on a Linux or UNIX operating system, such as, for example, Ubuntu Linux or Mac OS X. One or more languages can be use to implement the various components across the various architecture layers. Languages and frameworks can include, but are not limited to, ASP, MVC, C#, HTML, JavaScript, CSS, Flash, and SQL.

Communication within the system can include standard web protocols such as, for example, HTTP/S via standard network protocols such as TCP/IP. Alternative web protocols for intra-system and Internetwork communication currently under development including HTTP version 2.0, HTTPS version 2.0, and SPDY are contemplated and within the scope of this disclosure. Successors to these protocols are also envisioned and are supported within the scope of this disclosure.

Referring now to FIG. 1, a computer network or similar digital processing environment 100 in which the system and method disclosed can be implemented. The present systems and methods can also run on different architectures that can include a LAN, WAN, stand-alone PC, stand-alone mobile device, a stand-alone, clustered, or networked mini or mainframe computers, etc. The video role-play learning system and method of use can be distributed on multiple computers and devices 12, 24.

FIG. 1 is representative of many specific computing arrangements that can support the system and method disclosed. In one embodiment, the software implementing the video role-play learning system runs in the Windows® environment. In another embodiment, the software is implemented to run in other environments, such as Linux®, UNIX®, and can run on any hardware having enough power to support timely operation of software such as that identified in FIG. 1. In some implementations of the video role-play learning system, Internet Information Server® is deployed on one or more server computers 28. In certain instances, computers are deployed as virtual instances rather than physical computers.

Data traffic can travel through a firewall 38 to and from web server computers and/or virtual instances 28. In some deployments, these web servers 28 are distributed instances of Windows Internet Information Server®. In some deployments, redundant virtual servers 32 are providing cloud storage services through a platform as a service offering such as, for example Amazon Simple Storage Service. The redundant virtual servers 32 are communicatively coupled to computers hosting one or more persistent data stores 36. These data stores can be distributed databases such as, for example, Microsoft SQLServer®, MySQL®, and/or high-performance key/value index store used to store derivative data.

Client computers of various types 12 can connect to a remote server infrastructure 24 via a network 22 over one or more communication protocols. All computers can pass information as unstructured data, structured files, structured data streams such as, for example, XML, structured data objects and/or structured messages. Client computers 18, 20, 14, 16 can communicate over various protocols such as, for example, UDP, TCP/IP and/or HTTP/S.

Client computers and devices 18, 20, 14, 16 and server computers 24 provide processing, storage, and input/output devices executing application programs. Client computers 12 can also be linked through communications network 22 to other computing devices, including other client devices/processes 12 and server computers 24. In some embodiments, server computers 36 run software to implement centralized persistent data storage and retrieval. The network 22 can be a local area network and/or a wide area network that is part of a remote access network, a global network (e.g., the Internet), a worldwide collection of computers, and/or gateways that currently use respective protocols (TCP/IP, UDP, etc.) to communicate with one another. Multiple client computer devices 12 can each execute and operate various instances of the applications accessing the video role-play learning system servers 24.

On reading this disclosure, those of skill in the art will recognize that many of the components discussed as separate units can be combined into one unit and an individual unit can be split into several different units. Further, the various functions could be contained in one computer or spread over several networked computers and/or devices. The identified components can be upgraded and replaced as associated technology improves and advances are made in computing technology.

Within AWS Elastic Beanstalk Environment 28, there are several subsystems that provide communication among and between various engines of the video role-play learning system. These engines, in tandem or in parallel, can capture, return and transform data in a manner unique to the communications and interactions of the client devices 12. These unique data transformations and systematic interactions with the user comprise an article of manufacture produced by the interaction of the various engines with the data inputs from the user, transformation from other engines operating within the Elastic Beanstalk Environment 28 and generally within system 100.

In some implementations, the web server is an MVC architecture implemented in Microsoft's .NET framework, and deployed via application server pages (ASP)s provisioned on one or more Internet Information Server (IIS) instances operated within the Amazon AWS Elastic Beanstalk Service 28. The Elastic Beanstalk Service is configured to instantiate new instances when load tolerances are met. One or more of the application services operating within web application server can be written in the C# language. Communications between these services and data stored in the persisted data store of the data layer of system 100 can be connected and structured via an "object relational model" or ORM service provided by, for example, nHibernate.

In some embodiments, within System 100, the persisted data store is provisioned on Amazon's AWS Relational Database Service (RDS) operating instances of database server 36 operating Microsoft SQL Server® (MSSQL Server), and communicating with the ORM layer via a TCP/IP connection. Connection with ORM can, in some instances communicate via sql queries to structure, store and retrieve data persistently stored within the database server 36. The communications of the connection can be performed across a virtual private network (VPN).

In other embodiments, the services provided by the web applications server can be written in other programming languages, such as, for example, Ruby, PHP, or Coldfusion. The ORM layer can also employ frameworks other than nHibernate, including, for example, Entity Framework. The database server 36 can also be implemented in storage engines and servers other than those provided by MSSQL server, including but not limited to MySQL, PostgreSQL, or Oracle® DB. Non-relational data stores can also be used in some embodiments. Communication with database server 36 across the connection to ORM can also be performed in alternative embodiments via a direct TCP/IP connection without employing a VPN or via proprietary data layer protocols such as those used with myrinet or infiniband. Web servers other than IIS in web applications server can be used, including but not limited to nginx, Apache, and lighthttpd. These web servers can be integrated with an application server, such as, for example, PHP or Coldfusion, providing dynamic presentation of views based upon programmatic inputs from the data models and controllers that support system services.

Figure 2:
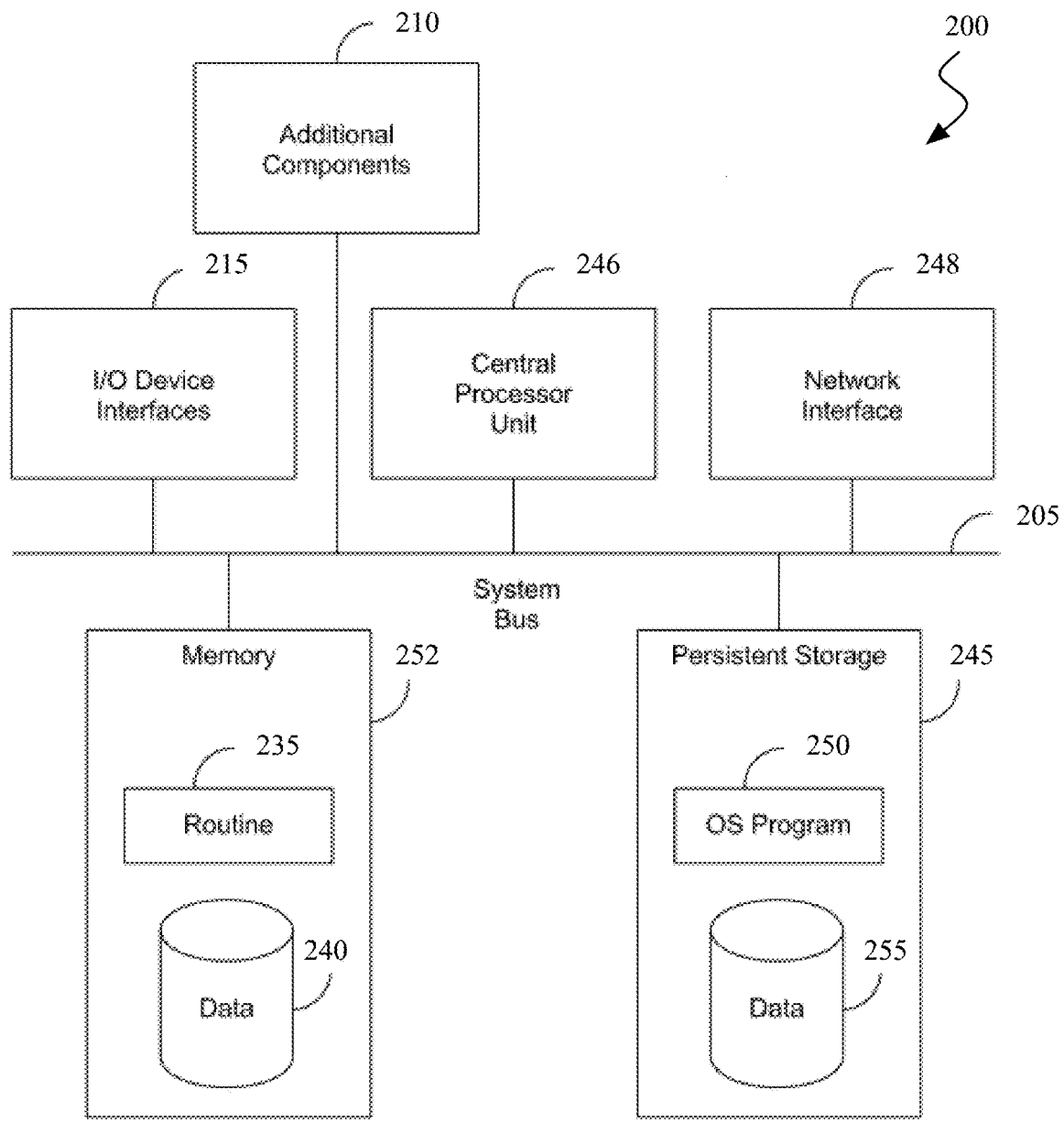
FIG. 2 is a block diagram of the internal structure of a computer used in the computer network of FIG. 1.

Referring now to FIG. 2, each component of the video role-play learning system 100 is connected to a system bus 205, providing a set of hardware lines used for data transfer among the components of a computer or processing system. Also connected to the bus 205 are additional components 210, such as additional memory storage, digital processors, network adapters, and I/O devices. The bus 205 is essentially a shared conduit connecting different elements of a computer system (e.g., processor, disk storage, memory, input/output ports, network ports, etc.) and enabling transfer of information between the elements. An I/O device interface 215 is attached to system bus 205 in order to connect various input and output devices (e.g., keyboard, mouse, touchscreens, displays, printers, speakers, etc.) to the extended package collaboration system. A network interface 248 allows the computer to connect to various other devices attached to a network (e.g., network 120 of FIG. 1). A memory 252 provides volatile storage for computer software instructions 235 and data 240 used to implement methods employed by the system disclosed herein. Disk or persistent storage 245 provides non-volatile storage for computer software instructions 250 and data 255 used to implement an embodiment of the present disclosure. A central processor unit 246 is also attached to system bus 205 and provides for the execution of computer instructions.

In one embodiment, the processor routines 235 and 250 are a computer program product, including a computer readable medium (e.g., a removable storage medium such as one or more flash drives, DVDROM's, CD-ROM's, diskettes, tapes, etc.) that provides at least a portion of the software instructions for the system. A computer program product that combines routines 235 and data 240 can be installed by any suitable software installation procedure, as is well known in the art. In another embodiment, at least a portion of the software instructions can also be downloaded over a cable, communication, and/or wireless connection.

Figure 3:
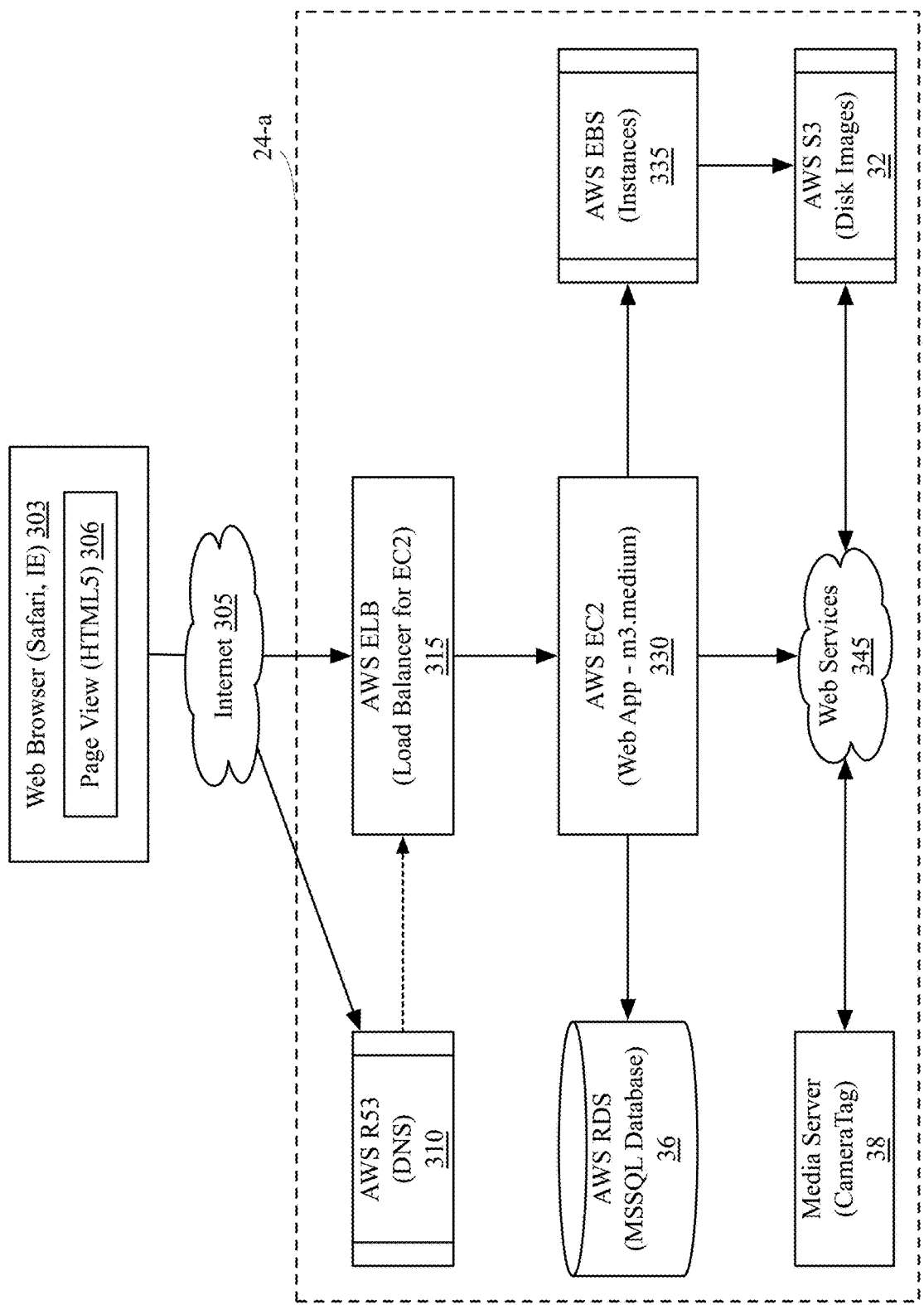
FIG. 3 is a block diagram of an implementation of the backend server services subsystem of FIG. 1 implemented using cloud services.

Referring now to FIG. 3, in some implementations of the video role-play learning system 100, the server architecture 24-*a* employs one or more platform-as-a-service technologies, such as, Amazon Web Services® cloud computing service as all or part of the server subsystem 24-*a*. In some instances, these services can be managed through a services management interface such as AWS Elastic Beanstalk, RightScale®, or the like. Such Amazon Web Services are generally referred to using the following acronyms:

a) AWS—Amazon Web Services;
b) R53—Route 53, Amazon's DNS hosting service 310;
c) DNS—Domain Name Service, the method for looking up the Internet address of a server from its domain name;
d) ELB—Elastic Load Balancer, Amazon's hosted balancer service for distributing web traffic across multiple machines 315;
e) RDS—Relational Data Store, Amazon's hosted SQL database service, including, for example, the MSSQL database 325;
f) EC2—Elastic Compute Cloud, Amazon's hosted Infrastructure as a Service (IaaS) for requesting and reserving virtual hardware resources 330;
g) EBS—Elastic Block Store, one of Amazon's persistent storage services, specifically emulating a network connected persistent volume on the virtual machine for saving configuration and other system and user files 335; and
h) S3—Simple Storage Service, one of Amazon's persistent storage services, specifically this stores data in "buckets" which are saved and retrieved by a unique ID 301.

In addition, or alternatively, some or all of the system can be implemented on a proprietary stack rather than on a platform-as-a-service architecture. For example, the system can be implemented on multi-core Intel-compatible (×86) architecture servers with, for example, 2 GB of memory and 20 GB of on-board persistent storage. In some instances, two servers running the same software components can be load balanced using an off-the-shelf load balancer.

In some instances, the software infrastructure consists of several layers such as, for example, a presentation layer, logic layer, and data layer, which can be implemented by a Model-View-Controller architecture. Referring still to FIG. 3, a cloud storage service 32, such as AWS S3, is communicatively coupled to a media server with a video capture service 38, such as CameraTag, via a TCP/IP connection communicating via one or more HTTP/S channels. CameraTag can operate a media server or services such as, for example, Wowza or Red5 that can provision and translate various video feeds employing one or more codecs, such as, for example, VP6, MP4, and the like. The cloud storage service 32 can also connect with a user side web application client 306 embodied within a standard web browser 303, such as Safari, Firefox, Internet Explorer, and Chrome via a TCP/IP connection and communicating via one or more HTTP/S channels through one or more layers of the AWS Beanstalk Environment 28. Video capture service 38 is connected with web client application 306 via a TCP/IP connection communicating via one or more RTMP channels. In some instances, RTMP channels piggyback across an HTTP or HTTP/S channel.

In some embodiments, a web browser 303 is connected to the web application server hosing one or more web applications 330 providing one or more web services 345 via a TCP/IP connection communicating via one or more HTTP/S channels. The web applications server is operated upon one or more virtualized environments provided by the web application provisioning service 28, such as, for example, Amazon AWS Elastic Beanstalk.

Figure 4:
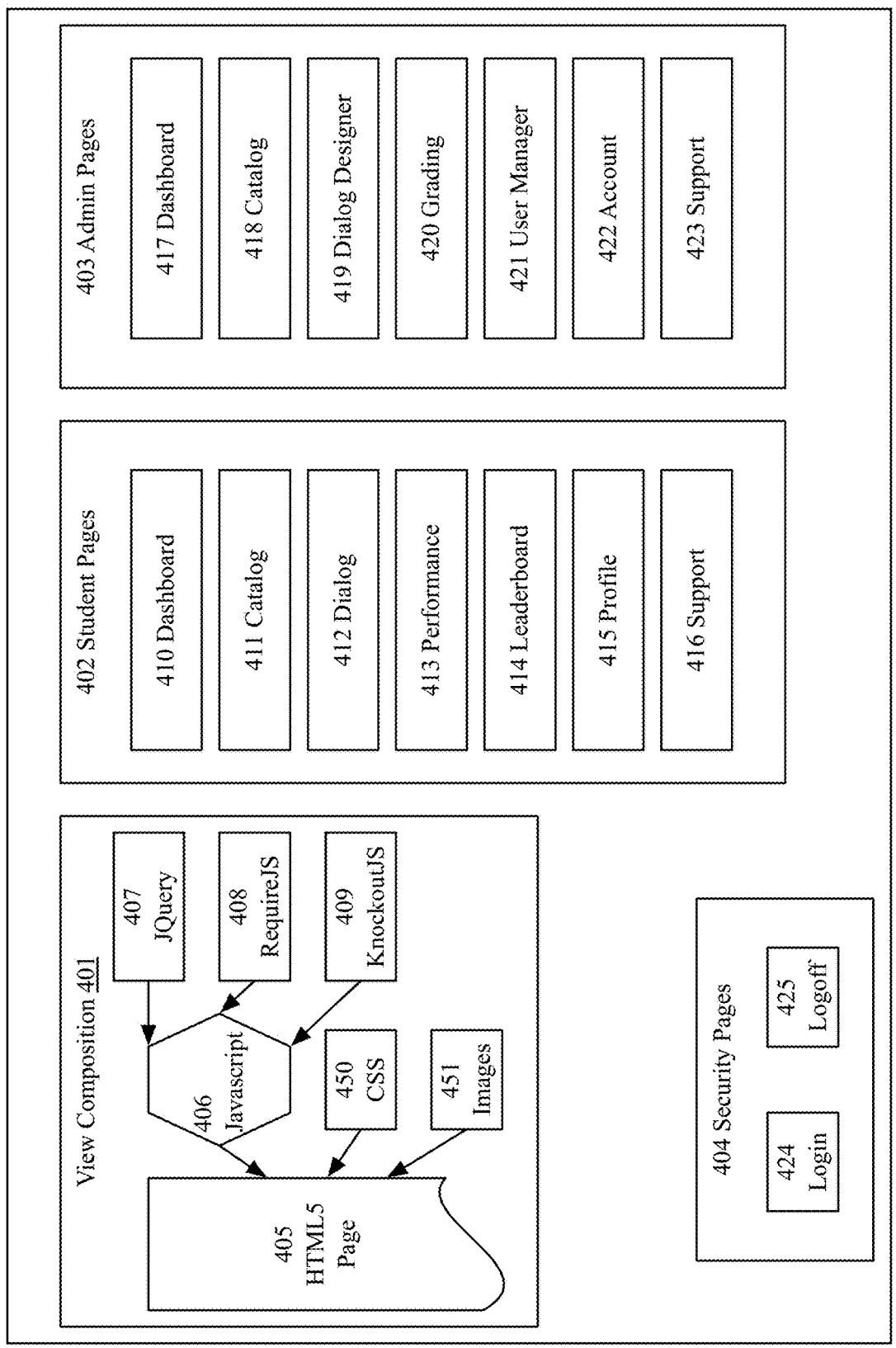
FIG. 4 is a page structure diagram of web page classes served by the web server of FIG. 1.

Referring now to FIG. 4, the presentation framework of subsystem 401 can operate within the web browser of the client and can communicate with web application servers via HTTP/S (see, e.g., FIG. 3), receiving audio, video, textual and binary data. In some instances, across one or more pages, actions prompted programmatically or via user inputs are controlled by Javascript 406 which, in some implementations, combine jQuery 407, RequireJS 408, and KnockoutJS 409 frameworks to control data flow and presentation of data from views provided by web application server to the user interface. The layout and presentation can be formatted into a user interface by cascading style sheets 450 (CSS) and images 451 are fed into the system from content stores in web application server 28 or from outside services, such as cloud storage service 36.

In some instances, the web pages presented include two groupings; student pages 402 and admin pages 403, with access to these subsets of admin and student pages authenticated by the security pages presented within the security page sets of grouping 404. Within student pages 402, admin pages 403, and security pages 404, a series of pages can provide the user interface, incorporating various views provided by web application serves 28. In some embodiments, the pages of group 402 include a dashboard 410, a catalog 411, a role-play dialog 412, a performance 413, a leaderboard 414, a profile 415, and support 416. The pages of group 403 can include of a dashboard 417, a catalog 418, a role-play designer 419, a grading page 420, a user manager 421, an account page 422, and a support page 423. The security pages of 404, in some implementations, include a login page 424, and a logout page 425.

Figure 5A:
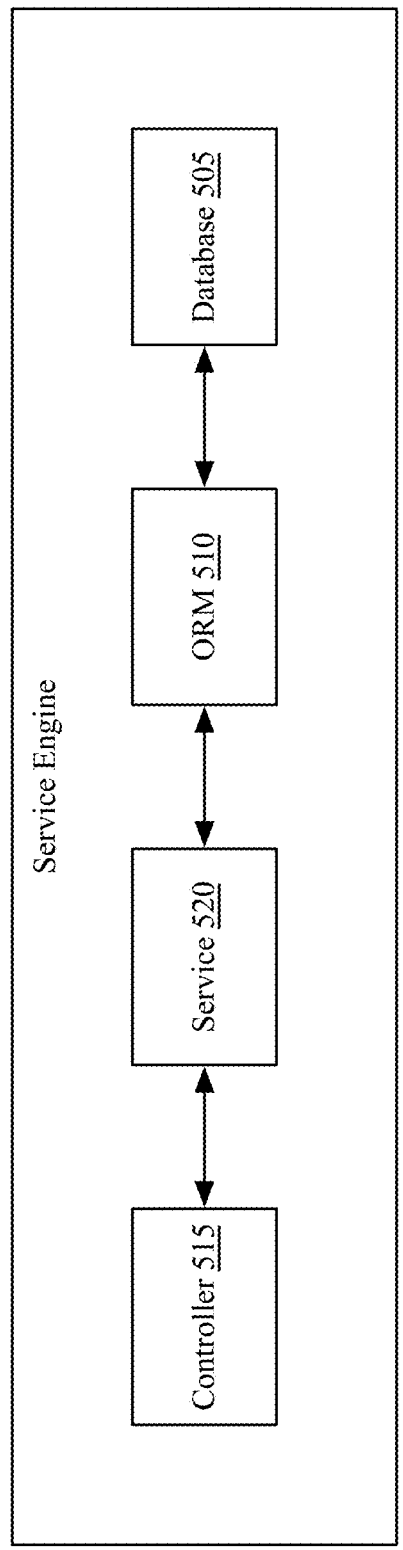
FIG. 5A is a block diagram of the services engines providing the web services of FIG. 1.

Referring now to FIG. 5A, the structure of the engines responsible for the provisioning of data to user interface pages can be implemented in a model-view-controller framework. Within the engine structure, in some embodiments a persistent data store 505 communicates with the ORM 510 via connection to the database server. ORM 510 operating within web application server communicates with a data controller 515 that organizes the data contextually into an object for serving to the user interface based upon transactional requests to persistent data store 505. The transactional requests are organized into object groupings organized by ORM 510. Once the data has been transmitted to the controller 515, the objectified data is formatted into a web browser readable format by services operating on web application servers 520. Once formatting into the appropriate view compositing HTML, CSS, and JavaScript is completed on web application server, the compiled view is transmitted to web browser 303 (see, e.g., FIG. 3) via TCP/IP connection communicating across one or more HTTP/S channels. Once delivered to web browser 303, the user interface can interact with the system via the delivered JavaScript methods, which can provide data transformations on the local web browser 303, or transmit new data requests to web application server for evaluation and response.

Figure 5B:
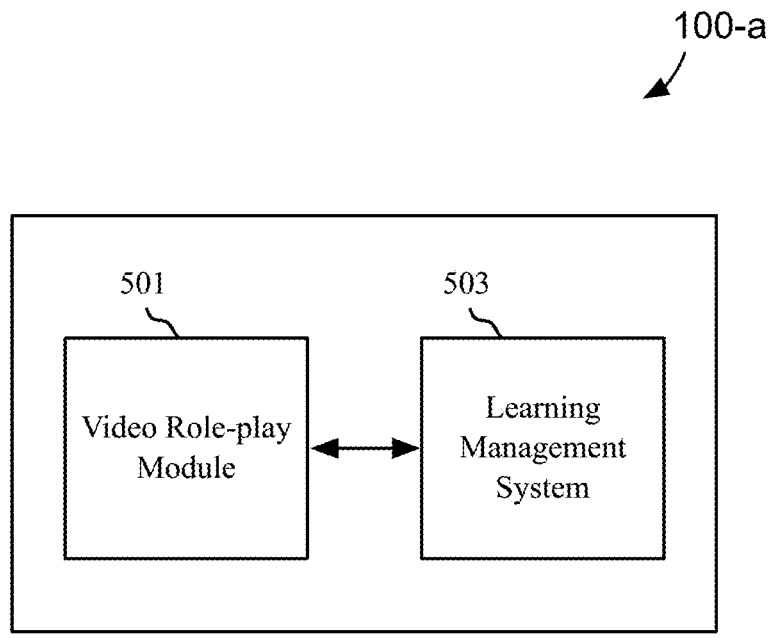
FIG. 5B is a block diagram of the video role-play learning system in the embodiment of FIG. 1.

Referring now to FIG. 5B, a block diagram depicts a video role-play learning system 100-a in accordance with various embodiments. The video role-play learning system 100-a is an example of one or more aspects of the video role-play learning system described with reference to FIG. 1. The video role-play learning system 100-a includes a video role-play module 401 and a learning management system 403. Each of these components can be in communication with the other. The video role-play learning system 100-a can include a services layer that exposes a variety of discreet services accessible to authorized clients and/or services. It is through these services that information can be added to, and retrieved from, the databases found in a persistence layer. The services layer, together with the persistence layer, can, in part, consist of a collection of distributed services and data stores providing the video role-play learning system functionality. Client devices can provide user interfaces to one or more of the functions of the video role-play learning system 100-a services. Such interfaces can include one or more from the group consisting of browser-based interfaces, app-based interfaces, and application-based interfaces. In some embodiments, these client interfaces can include application containers such as html clients, native computer applications, and/or native mobile apps.

Figure 6:
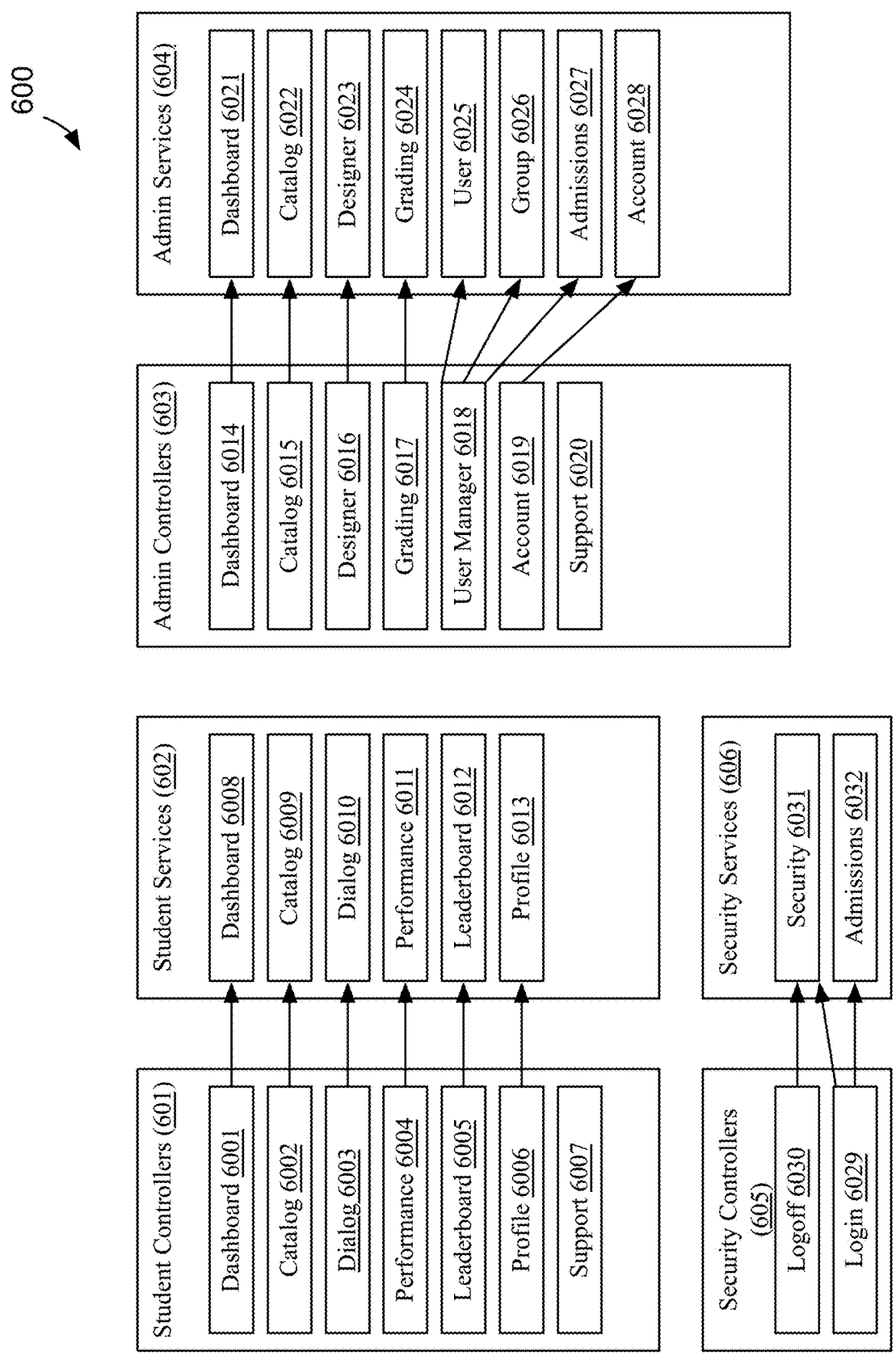
FIG. 6 is a block diagram of various services engines providing the web services of FIG. 1.

Referring now to FIG. 6, the services and controllers of collection 600 can be operated within web application servers 28 and perform transactional support for data and computation requests received from client devices 12 or other server machines 24. In some instances, these transactions can operate in parallel, making it possible for multiple devices to interact with server system at scale.

Within student controllers 601, the Dashboard controller 6001 presents two views, Index and Welcome, which are rendered on the dashboard page presented to the user interface such as via a browser 303 (see, e.g., FIG. 3). The controller draws its data from the Dashboard service 6008 offering two methods to populate dynamic data within the views, namely GetAnnouncement and GetEvent.

Within student controllers 601, the Catalog controller 6002 presents two views, Index and ToggleTopicExpansion, which are rendered on the catalog page presented to the user interface such as via a browser 303. The controller draws its data from the Catalog service 6008 offering two methods to populate dynamic data within the views, namely GetPrograms and ToggleTopicExpansion.

Within student controllers 601, the Dialog controller 6003 presents one view, Index, which is rendered on the dialog page presented to the user interface such as via a browser 303. Additional page elements to add responses sends data back from web browser 303 to the Web Application Server via the dialog service using method AddResponse. The controller draws its data from the Dialog service 6010 offering two methods to populate dynamic data within the views, namely GetDialog and AddResponse.

Within student controllers 601, the Performance controller 6004 presents one view, Index, which is rendered on the performance page presented to the user interface such as via a browser 303. The controller draws data from the Performance service 6011 using methods GetLastTenScores and GetStatistics.

Within student controllers 601, the Leaderboard controller 6005 presents one view, Index, and one action Vote, which is rendered on the leaderboard page presented to the user interface such as via a browser 303. The controller draws data from the Leaderboard service 6012 using method GetResponses posts Votes based on actions in web browser 303 via method Vote.

Within student controllers 601, the Profile controller 6006 presents one view, Index, and three actions UpdatePhoto, SetPassword, and UpdateProfile which are rendered on the profile page presented to the user interface such as via a browser 303. The controller draws data from the Profile service 6013 using methods GetProfile and posts data from actions in web browser 303 back to web application server via methods UpdatePhoto, SetPassword, and UpdateProfile.

Within student controllers 601, the Support controller 6007 presents one view, Index, which is rendered on the support page presented to the user interface such as via a browser 303. No dynamic methods are presented, so the content is rendered statically.

Within admin controllers 603, the Dashboard controller 6014 presents one view, Index, which is rendered on the Dashboard page presented to the user interface such as via a browser 303 and is also populated with data provided by the Dashboard service 6021, providing actions for data input via web browser 303 supporting the AddAnnouncement, UpdateAnnouncement, DeleteAnnouncement, AddEvent, UpdateEvent, and DeleteEvent methods. These methods are in turn provide data to the Dashboard Service 6021 by the AddAnnouncement, UpdateAnnouncement, DeleteAnnouncement, AddEvent, UpdateEvent, and DeleteEvent listeners respectively.

Within admin controllers 603, the Catalog controller 6015 presents one view, Index which is which is rendered on the Catalog page via web browser 303 and is also populated with data provided by the Catalog service 6022, providing actions for data input via web browser 303 supporting the AddProgram, DeleteProgram, RenameProgram, EnableProgram, DisableProgram, SetProgramOrder, AddTopic, DeleteTopic, RenameTopic, SetTopicOrder, AddScenario, Delete Scenario, RenameScenario, EnableScenario, DisableScenario, and SetScenarioOrder methods. These methods in turn provide data to the Catalog Service 6022 by listeners of the same name.

Within admin controllers 603, the Designer controller 6016 presents one view, Index which is which is rendered on the Dialog Designer page via web browser 303 and is also populated with data provided by the Designer service 6023 calling method GetScenario, providing actions for data input via web browser 303 supporting the EnableScenario, DisableScenario, SetIsScenarioHotSeat, UnsetIsScenarioHotSeat, RenameScenario, SetScenarioDescription, SetScenarioDifficulty, SetVideoKey, Notify Students, AddResource, UpdateResource, DeleteResource, SetResourceOrder, AddCriterion, UpdateCriterion, and DeleteCriterion methods. These methods in turn provide data to the Designer Service 6023 by listeners of the same name.

Within admin controllers 603, the Grading controller 6017 presents one view, Index, which is rendered on the Grading web page via web browser 303 and is also populated with data provided by the Grading service 6024 calling methods GetGroupResponses, and GetResponseDetails, providing actions for data input via web browser BB supporting the AddResponseToLeaderboard, RemoveResponseFromLeaderboard, SetFeedback, SetFeedbackVideoKey, SetRatingValue, and SubmitGrade methods. These methods in turn provide data to the Grading Service 6024 by listeners of the same name.

Within admin controllers 603, the User Manager controller 6018 presents one view, Index, which is rendered on the User Manager web page via web browser 303 and is also populated with data provided by the User service 6025, the Group service 6026, and the Admissions service 6027 calling methods GetUsers, GetGroups, and GetAdmissionsRequests, providing actions for user input via web browser 303 supporting the AddUser, AssignUserToGroup, UnassignUserToGroup, SetIsUserAdmin, UnsetIsUserAdmin, AssignUserAsMentorToGroup, UnAssignUserAsMentorToGroup, EnableUser, DisableUser, SetIsUserRegistrar, UnsetIsUserRegistar, ResetUserPassword, AddGroup, RenameGroup, DeleteGroup, AssignProgramToGroup, UnassignProgramToGroup, NotifyStudentsOfProgramAvailability, GrantRequest, and Deny Request methods. These methods in turn provide data to the User service 6025, the Group service 6026, and the Admissions service 6027 by listeners of the same name.

Within admin controllers 603, the Account controller 6019 presents one view, Index, which is rendered on the Account web page via web browser 303 calling method GetAccount and is also populated with data provided by the Account service 6028, providing actions for data input via web browser 303 supporting the SetLogo method. This method provides data to the Account service 6028 by a listener of the same name.

Within security controllers 605, the Login controller 6029 presents one view, Index, which is rendered on the Login web page via web browser 303 and is also populated with data provided by the Security service 6031 and the Admissions service 6032 calling method ShowLogin, providing actions for data input via web browser BB supporting the ValidateUser, LogLogin, LogInvalidAttempt, SetPassword, ResetPassword, and CreateAdmissionsRequest methods. These methods provide data to the Security service 6031 and Admission service 6032 by listeners of the same name.

Figure 7:
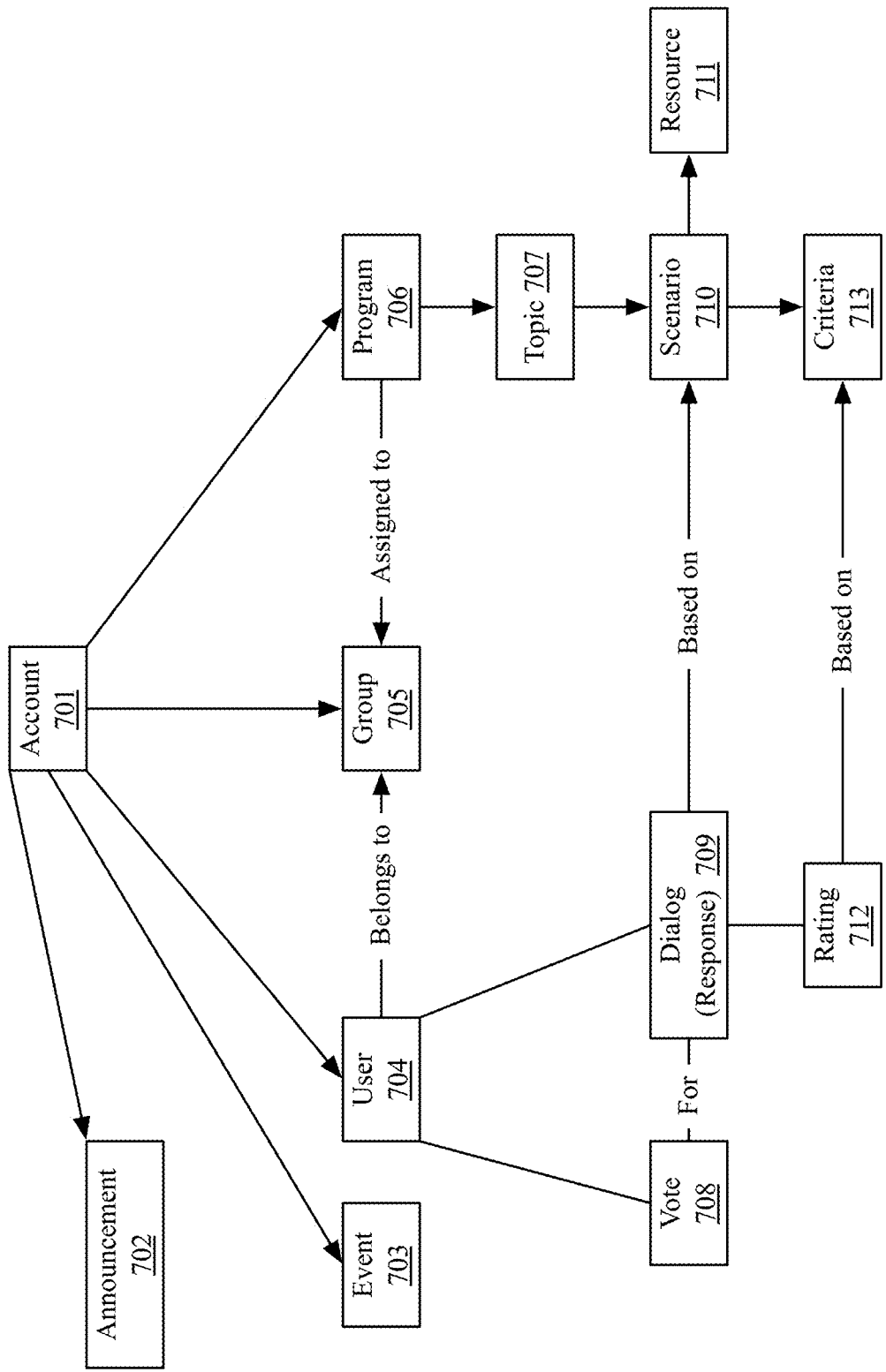
FIG. 7 is an entity relationship diagram representing the relationship among data elements of an embodiment of FIG. 1.
Figure 8A:
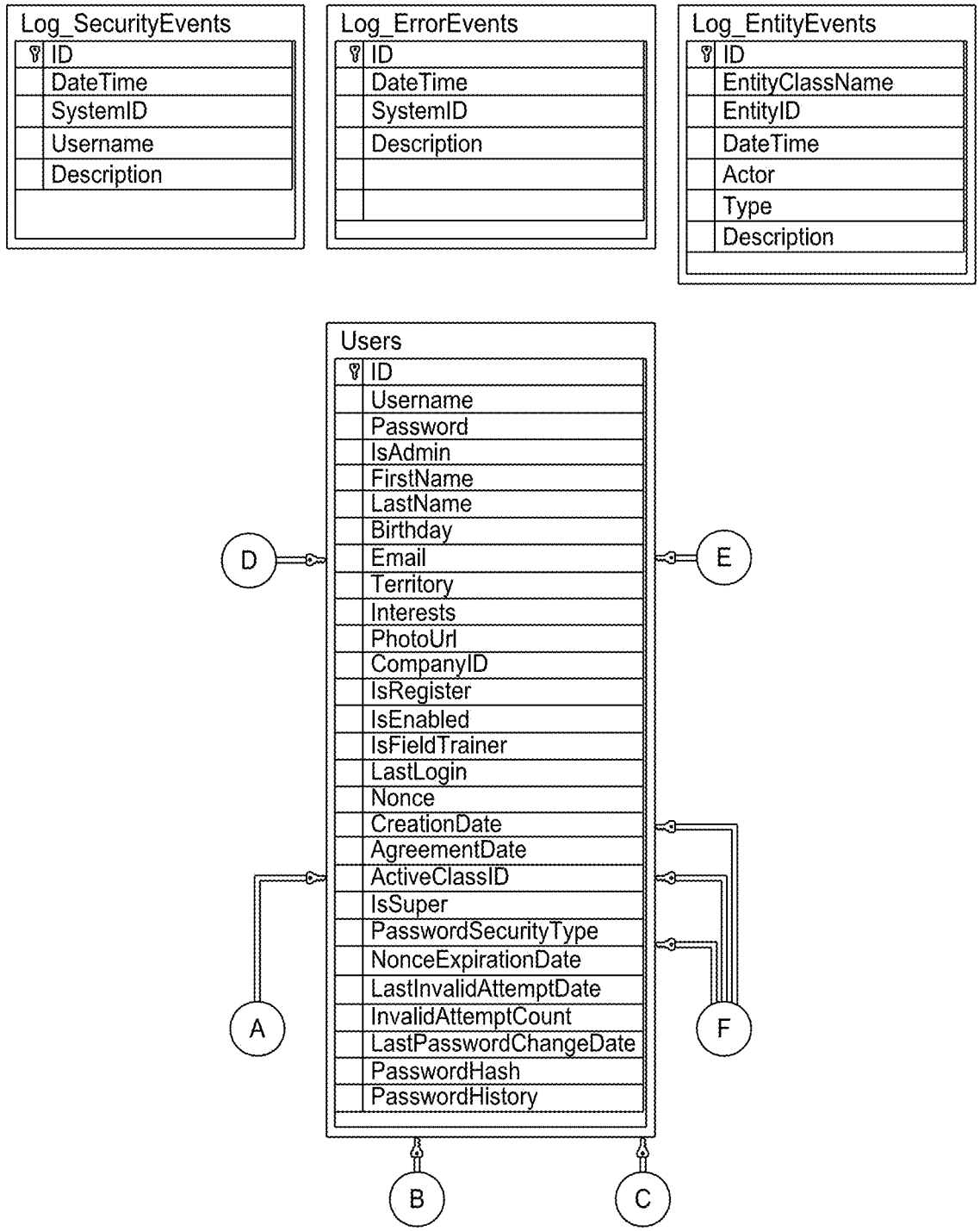
FIG. 8A through FIG. 8E are diagrams of various tables of a persistence layer supporting the services of FIG. 4.
Figure 8B:
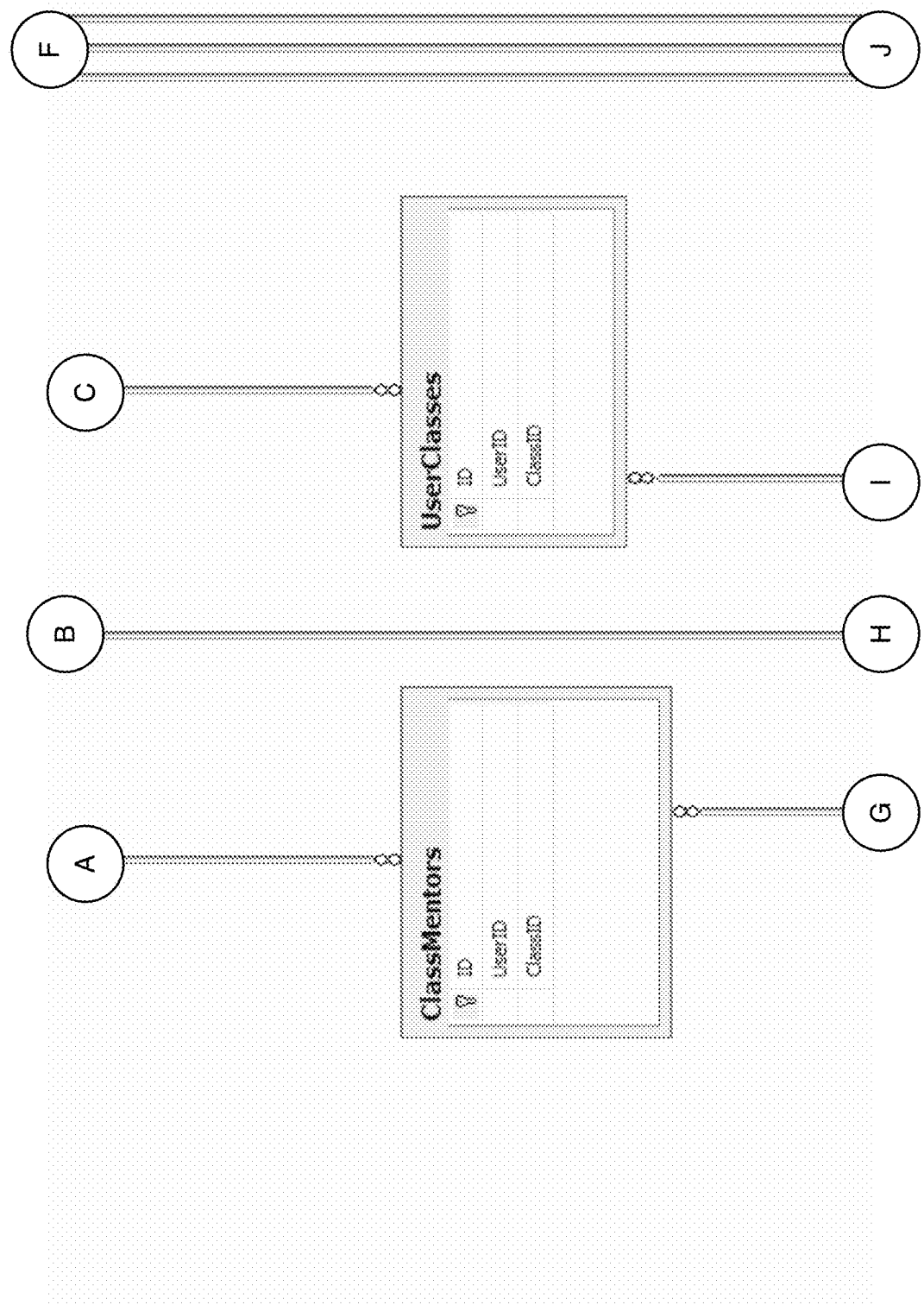
Figure 8C:
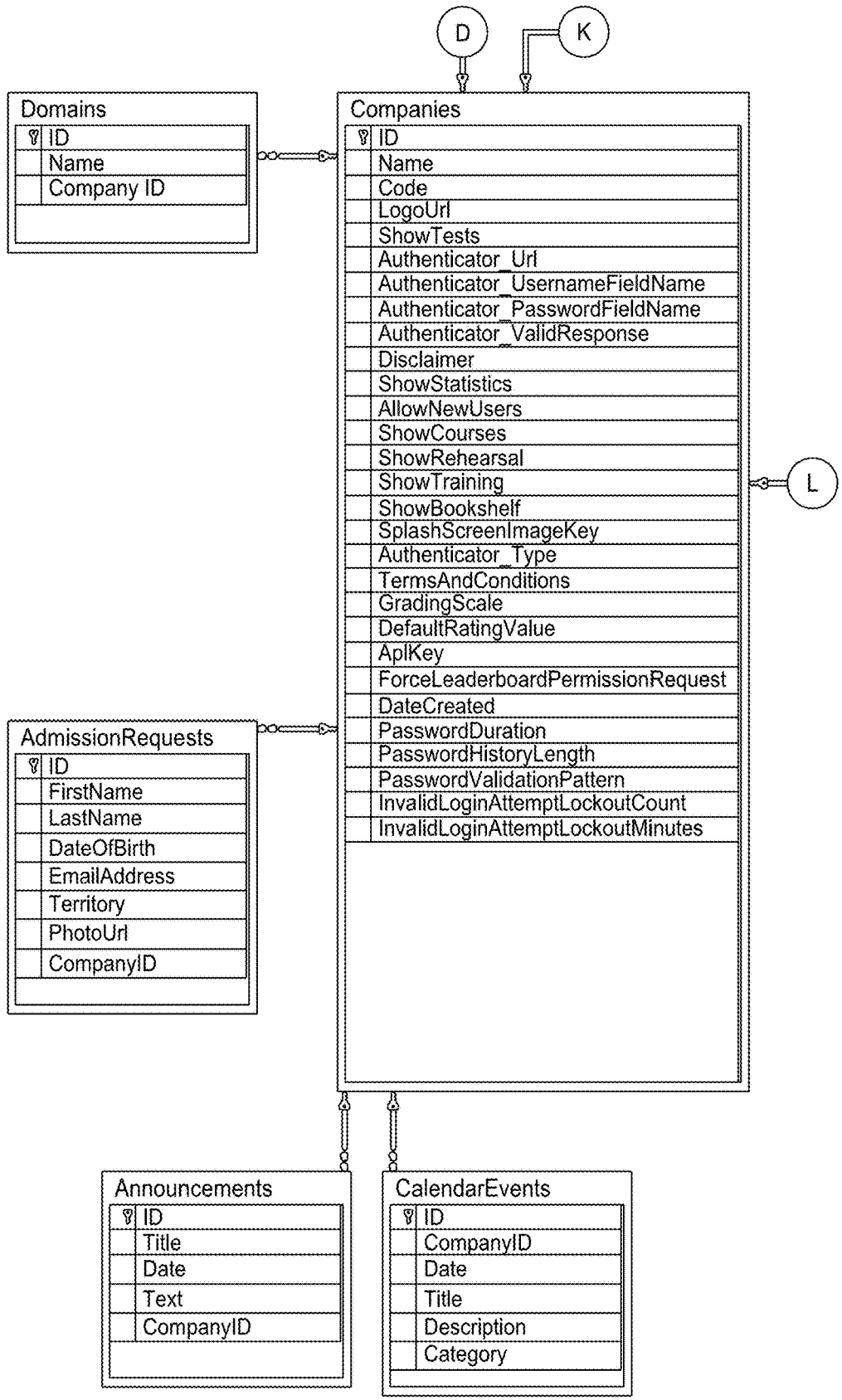
Figure 8D:
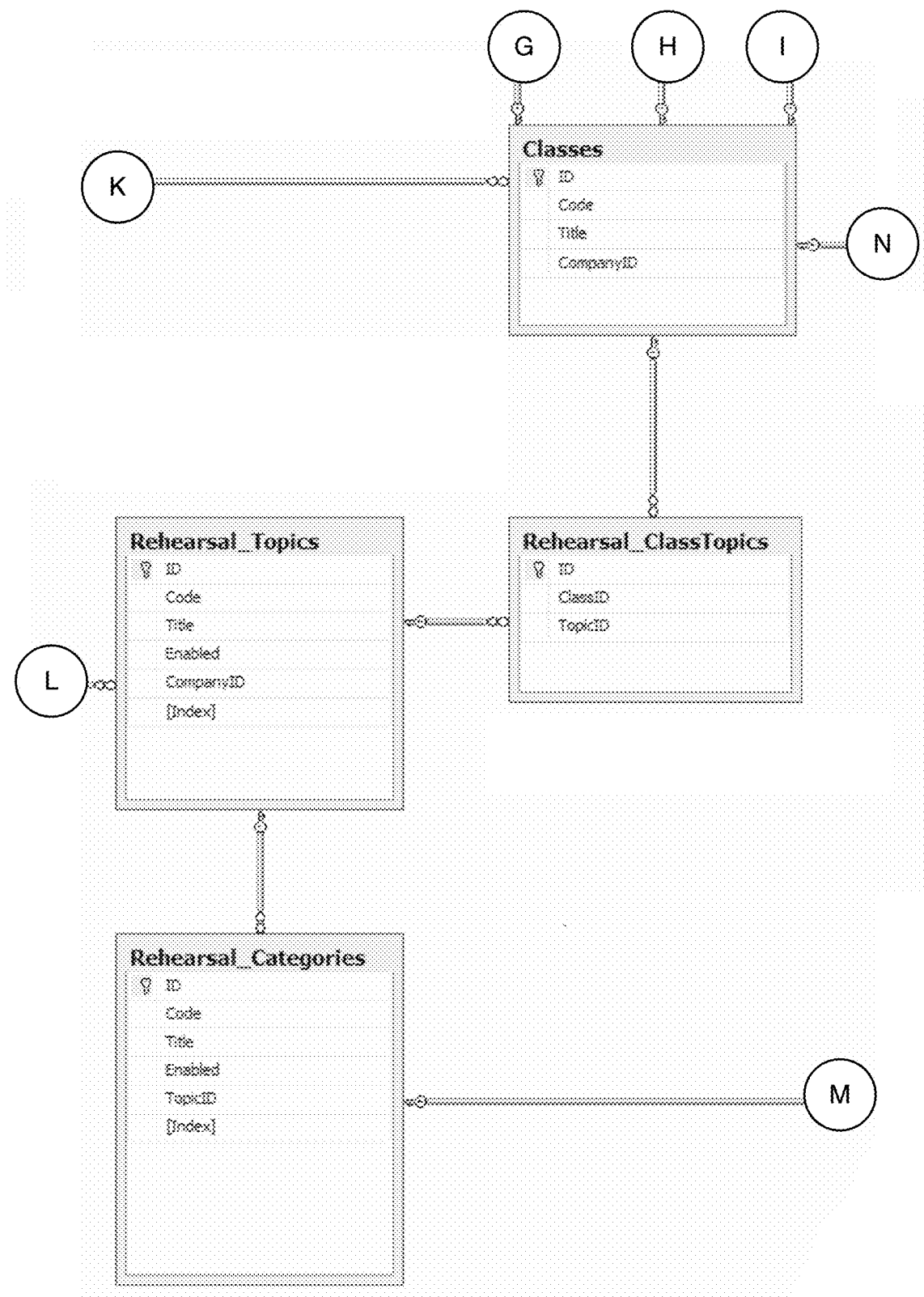
Figure 8E:
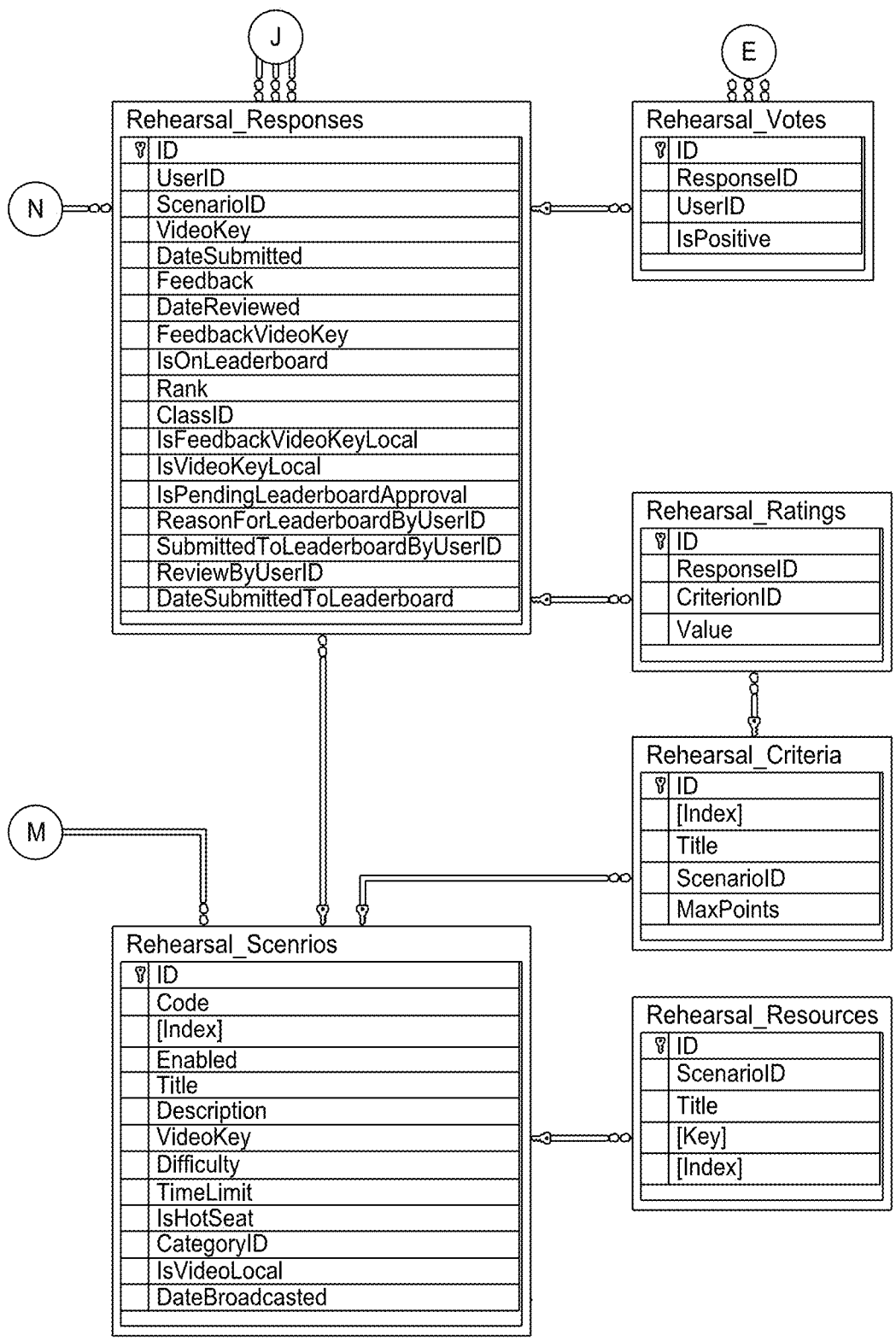

Referring now to FIG. 7, the system ER Layout 700 is an Entity Relationship Diagram (ERD) showing the relationships among data elements within the system 100 (see, e.g., FIG. 1). Account structure 701 maintains a linking table establishing a unique identifier for users identified in structure announcement 702, events 703, user 704, group 705, and program 706. Structure user 704 creates an identifier wherein users belong to groups represented by structure group 705, and can perform actions identified in structure vote 708, and dialog 709. Structure group 705 is a table linking structures to users 704, accounts 701, and programs 706. Structure program 706 identifies the grouping of materials to link group 705 to specific accounts identified in account 701. Topics 707 identifies the topics used in programs, and links to scenarios 710 that link with those topics. In scenarios 710, structure dialog 709 identifies individual instances of scenarios engaged by users, and consumes a listing of resources provided in structure resource 711. The scenario 710 consumes requirements in criteria 713 to provide an evaluation for performance of scenario goals. In structure vote 708, individual dialogs recorded in dialog 709 are recorded. Ratings of roleplay performances recorded in dialog 709 as provided by mentors are recorded in structure rating 712.

Referring now to FIG. 8A through FIG. 8E, a relational data model 800 represents the table relationships for the various tables supporting the various services of the of the extended package collaboration system. The set of tables can include, but are not limited to:

| Table Name | Description |
| --- | --- |
| Log_SecurityEvents | Records security events that occur in the system. |
| Log_ErrorEvents | Records errors that have occurred in the system. |
| Log_EntityEvents | Collects a log of all changes made to entities. |
| Users | List of users and associated user information. |
| ClassMentors | The list of groups for which a user is a mentor. |
| UserClasses | The list of groups to which the user is assigned. |
| Domains | The list of web addresses by which the account can be accessed. |
| Companies | The list of accounts in the system. |
| AdmissionRequests | The list of requests that non-users have made to gain access to the system. |
| Announcements | The announcements listed on the dashboard. |
| CalendarEvents | The events listed on the dashboard's calendar. |
| Classes | The groups to which a user can belong. |
| Rehearsal_Topics | The programs into which topics are grouped. |
| Rehearsal_ClassTopics | The list of programs assigned to a group. |
| Rehearsal_Categories | The topics into which scenarios are grouped. |
| Rehearsal_Responses | The responses students have made to scenarios. |
| Rehearsal_Votes | The votes cast for a particular response. |
| Rehearsal_Ratings | The scores assigned by mentors to a response for specific criteria. |
| Rehearsal_Criteria | The criteria used to score responses. |
| Rehearsal_Scenarios | A scenario to which a student responds. |
| Rehearsal_Resources | Files related to a scenario. |

In some instances, the set of tables includes attributes such as:

| Table Name | Attributes |
|---|---|
| Log_SecurityEvents | DateTime: The date and time the event occurred. SystemId: The ID of the account where the event occurred. Username: The username of the user for which the event occurred. Description: A description of the event. |
| Log_ErrorEvents | DateTime: The date and time the error occurred. SystemID: The ID of the account in which the error occurred. Description: A description of the error. |
| Log_EntityEvents | EntityClassName: The name, including namespace of the class of the entity that was changed. EntityId: The GUID of the entity changed. DateTiime: The date and time the entity was modified. Actor: The username of the person who made the change. Type: The type of change (e.g. AddChild, RemoveChild, Create, Edit Delete) Description: The description of the change that was made. |
| Users | Username: The username for the user. IsAdmin: Designation of the user as an administrator. FirstName: The user's first name. LastName: The user's last name. Birthday: The user's birthday. Email: The user's email. Territory: User associated region. Interests: A list of interests or previous experience. PhotoURL: The key of the user's photo. CompanyId: The account to which the user belongs. IsRegistrar: Designation of the user as registrar for receiving admission request notifications. IsEnabled: Designation whether the user is allowed to access and use the system. LastLogin: When the user last logged into the system. Nonce: A one-time use key used for SSO. CreationDate: When the user was created. AgreementDate: When the user agreed to the account terms and conditions. ActiveClassID: The ID of the class currently active for the user in the system. PasswordSecurityType: The type of security used to secure the user's password (e.g., basic, hash1000, etc.) NonceExpirationDate: When the nonce is no longer valid. LastInvalidAttemptDate: When the last invalid attempt to access the system was recorded. InvalidAttemptCount: The number of times in a row the user failed to access the system. LastPasswordChangeDate: When the user last changed their password. PasswordHash: The hash of the user's password. PasswordHistory: A collection of hashes of previous passwords. |
| ClassMentors | UserID: The user's ID. ClassId: The class' ID. |
| UserClasses | UserID: The user's ID. ClassId: The class' ID. |
| Domains | Name: The web address. CompanyID: The account accessed by the web address. |
| Companies | Name: The name of the account. Code: The unique code of the account. LogoURL: The key of the account's logo in the file store. Authenticator_Url: The URL to use for single sign on. Authenticator_UernameFieldName: The field that should be posted for username in post-based single sign on. Authenticator_PasswordFieldName: The field that should be posted for password in post-based single sign on. Authenticator_ValidResposne: The response from the authenticator that indicates a valid sign on. Disclaimer: Text to show on the login page. AllowNewUsers: Designation that allows new users to be added to the system. SpashScreenImageKey: The image to use as a background on the login screen. Authenticator_Type: The type of single sign on used (e.g., POST, ADFS, etc.) TermsAndConditions: The terms to which the user must agree on first sign in. GradingScale: The default MaxPoints for new criteria. |

| Table Name | Attributes |
|---|---|
| | DefaultRatingValue: The default score for newly crated ratings. |
| | ApiKey: The key used when authenticating against the API. |
| | ForceLeaderboardPermissionRequest: Designation removing the permission selection when submitting to the leaderboard. |
| | DateCreated: The date the account was created. |
| | PasswordDuration: How long passwords are valid before requiring a change. |
| | PasswordHistoryLength: How many previous passwords to remember and not allow reuse. |
| | PasswordValidationPattern: The regular expression against which new passwords are validated. |
| | InvalidLoginAttemptLockoutCount: The number of invalid attempts after which a login is prevented. |
| | InvalidLoginAttemptLockoutMinute: The number of minutes after a lockout that login is restored. |
| AdmissionRequests | FirstName: The person's first name. |
| | LastName: The person's last name. |
| | DateOfBirth: The person's birthday. |
| | EmailAdress: The person's email address. |
| | Territory: A regions associated with the person. |
| | PhotoURL: The key of the person's photo in the file store. |
| | CompanyID: The account to which the person requested access. |
| Announcements | Title: The title of the announcement. |
| | Date: When the announcement was broadcast. |
| | Text: Announcement content. |
| | Company ID: The ID of the account for which the announcement was made. |
| CalendarEvents | CompanyID: The ID of the account for which the event was created. |
| | Date: The date the event occurs. |
| | Title: The name of the event. |
| | Descriptions: A description of the event. |
| | Category: The category of the event (e.g. 0, 1, 3). |
| Classes | Code: The unique code for the group. |
| | Title: The title of the group. |
| | CompanyID: The account to which the group belongs. |
| Rehearsal_Topics | Code: The unique code for the program. |
| | Title: The title of the program. |
| | Enabled: Designation whether the program should be displayed to students. |
| | CompanyID: The account to which the program belongs. |
| | Index: The order in which the program should be displayed. |
| Rehearsal_ClassTopics | ClassID: The group to which the program is assigned. |
| | TopicID: The program assigned. |
| Rehearsal_Categories | Code: The unique code for the topic. |
| | Title: The title of the topic. |
| | Enabled: Designation whether the topic should be displayed to students. |
| | TopicID: The program to which the topic belongs. |
| | Index: The order in which the topic should be displayed. |
| Rehearsal_Responses | UserID: The student who made the response. |
| | ScenarioID: The scenario responded to. |
| | VideoKey: The key of the video in either the filestore or CameraTag. |
| | DateSubmitted: The date the video was recorded. |
| | Feedback: Text feedback from a mentor. |
| | DateReviewed: The date the response was reviewed by a mentor. |
| | FeedbackVideoKey: The key of the mentor's video response in either the file store or CameraTag. |
| | IsOnLeaderboard: Designation whether the response was submitted to Leaderboard. |
| | Rank: The total value of votes made by users on the Leaderboard. |
| | ClassID: The group for which the response was made. |
| | IsFeedbackVideoKeyLocal: Designation whether the feedback video is stored in the file store or CameraTag. |
| | IsPendingLeaderboardApproval: Designation whether the student has been prompted for authorization to post the response to Leaderboard. |

| Table Name | Attributes |
|---|---|
| | ReasonForLeaderboardSubmission: The reason entered by the mentor when submitting to the Leaderboard.<br>SubmittedToLeaderboardByUserID: The mentor who submitted the response to the Leaderboard.<br>ReviewedByUserID: The mentor who graded the response.<br>DateSubmittedToLeaderboard: The date the response was submitted to Leaderboard. |
| Rehearsal_Votes | ResposneID: The resopnse's ID<br>UserID: The ID of the user who voted.<br>IsPostive: Designation that the vote was positive. |
| Rehearsal_Ratings | ResponseID: The response that was graded.<br>CriterionID: The criterion assigned a score.<br>Value: The score assigned. |
| Rehearsal_Criteria | Index: The order in which the criterion is displayed.<br>Title: The title of the criterion.<br>ScenarioID: Th scenario to which the criterion is related.<br>MaxPoints: The most points possible for the criterion. |
| Rehearsal_Scenarios | Code: the unique code of the scenario.<br>Index: The order in which the scenario is displayed with its category.<br>Enabled: Designation whether the scenario is visible to students.<br>Title: The title of the scenario.<br>Descriptions: The description of the scenario that sets up the video.<br>VideoKey: The key of the video in either the file store or CameraTag.<br>Difficulty: The relative difficulty of the scenario (e.g., 0, 1, 2).<br>TimeLimit: Maximum time allowed for a video reponse.<br>IsHotSeat: Designation whether a scenario is a Hot Seat scenario.<br>CategoryID: The ID of the category to which the scenario belongs.<br>IsVideoLocal: Designation whether the video saved to the file store or to CameraTag.<br>DateBroadcasted: The date a notification of the scenario's availability was sent. |
| Rehearsal_Resources | ScenarioID: The scenario to which the resource is related.<br>Title: The title of the resource.<br>Key: The key of the file in the file store.<br>Index: The order in which the resource is displayed. |

Figure 9:
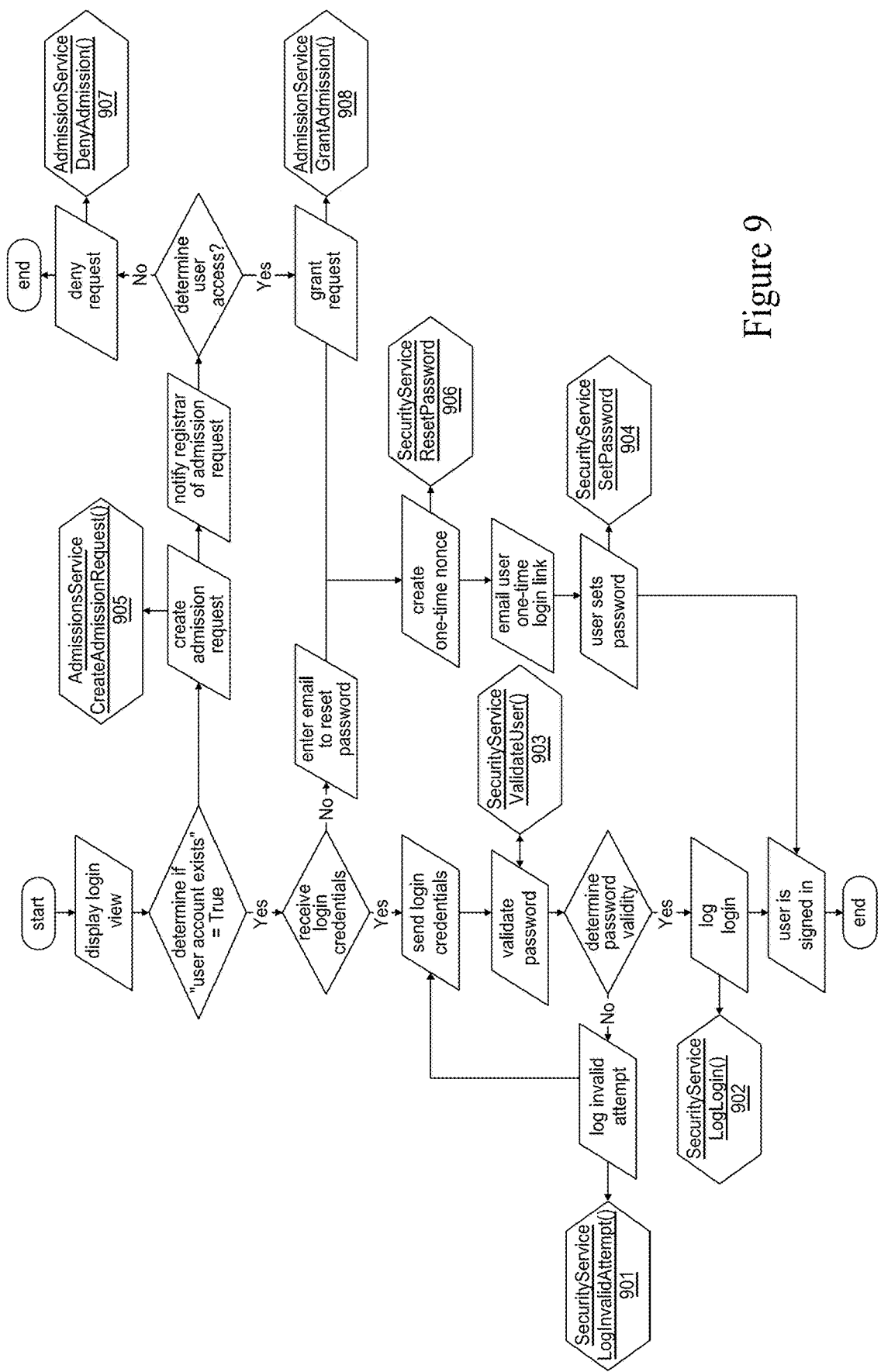
FIG. 9 is a flow diagram of the security process of the video role-play learning system of FIG. 1.

Referring now to FIG. 9, authentication and authorization of users to access privileged parts of the systems can be based upon access class and callouts to the Security Service 6031 and Admissions Service 6032 (see, e.g., FIG. 6). Login page 424 (see, e.g., FIG. 4) provides a user interface that communicates with via security service 6031 and admissions service 6032 to collect credentials from the user, whereby those credentials are authenticated by a call to SecurityServiceValidateUser( ) 903. On failure to provide appropriate credentials, method SecurityServiceLogInInvalidAttempt( ) 901 is invoked to record the failed login. On successful login, method SecurityServiceLogLogin( ) 902 is invoked to provide tokenized access to resources requiring authentication. If the user is a valid user, but is seeking admission to a particular class, process AdmissionServiceCreateAdmissionRequest( ) 905 collects this from the user which is then authorized via invoking method AdmissionServiceDenyAdmission( ) 907 to deny or AdmissionServiceGrantAdmission( ) 908 to confirm admission in the Admissions Service 6032. If a password is not available, process SecurityServicePasswordReset( ) 906 is invoked to force a system-wide password reset which is then recorded by process SecurityServiceSetPassword( ) 904.

Figure 10:
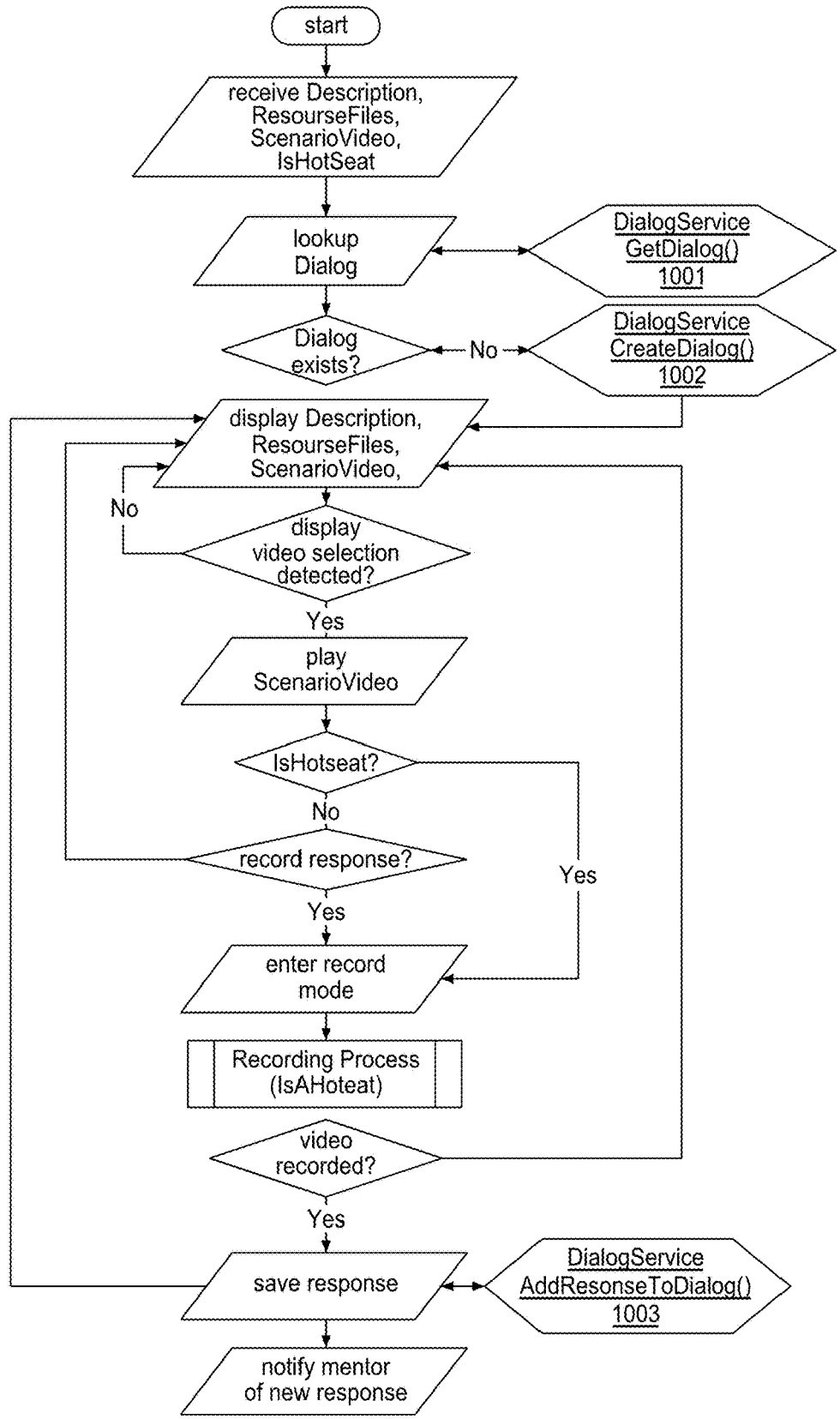
FIG. 10 is a flow diagram of the role-play response process of the video role-play learning system of FIG. 1.

Referring now to FIG. 10, the client interface displays dialog page 412 (see, e.g., FIG. 4), which retrieves the interface and data specific to an enrollment via method DialogServiceGetDialog( ) 1001, interacting with Dialog service 6010 (see, e.g., FIG. 6), wherein should the role-play exist, responses are received and processed. If the role-play does not exist, the interface is directed to prompt for recording of a response to the scenario via video recording process DialogServiceCreateDialog( ) 1002, whereupon in completing the recording process of the flow, the video is recorded via communication in 302 to persistent storage by invoking method DialogServiceAddResponse( ) 1003.

Figure 11:
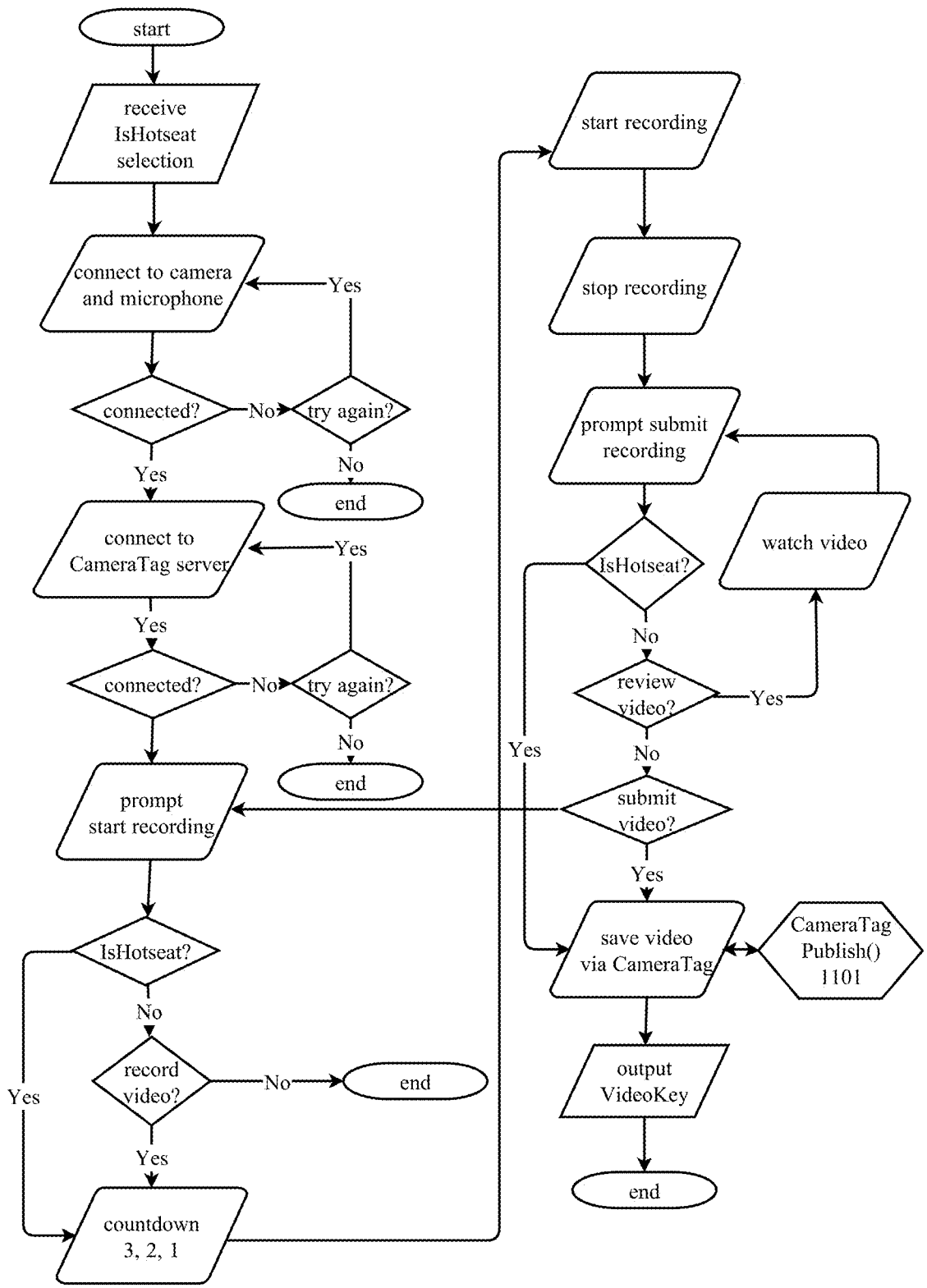
FIG. 11 is a flow diagram of the role-play recording process of the video role-play learning system of FIG. 1.

Referring now to FIG. 11, the process of recording is driven by interaction with the user interface displayed in the web browser 303 via page view 306 and the media recording service 302 (see, e.g., FIG. 3). Within web browser 303, process 1101 is invoked, enabling storage of video content and retrieval for grading.

Figure 12A:
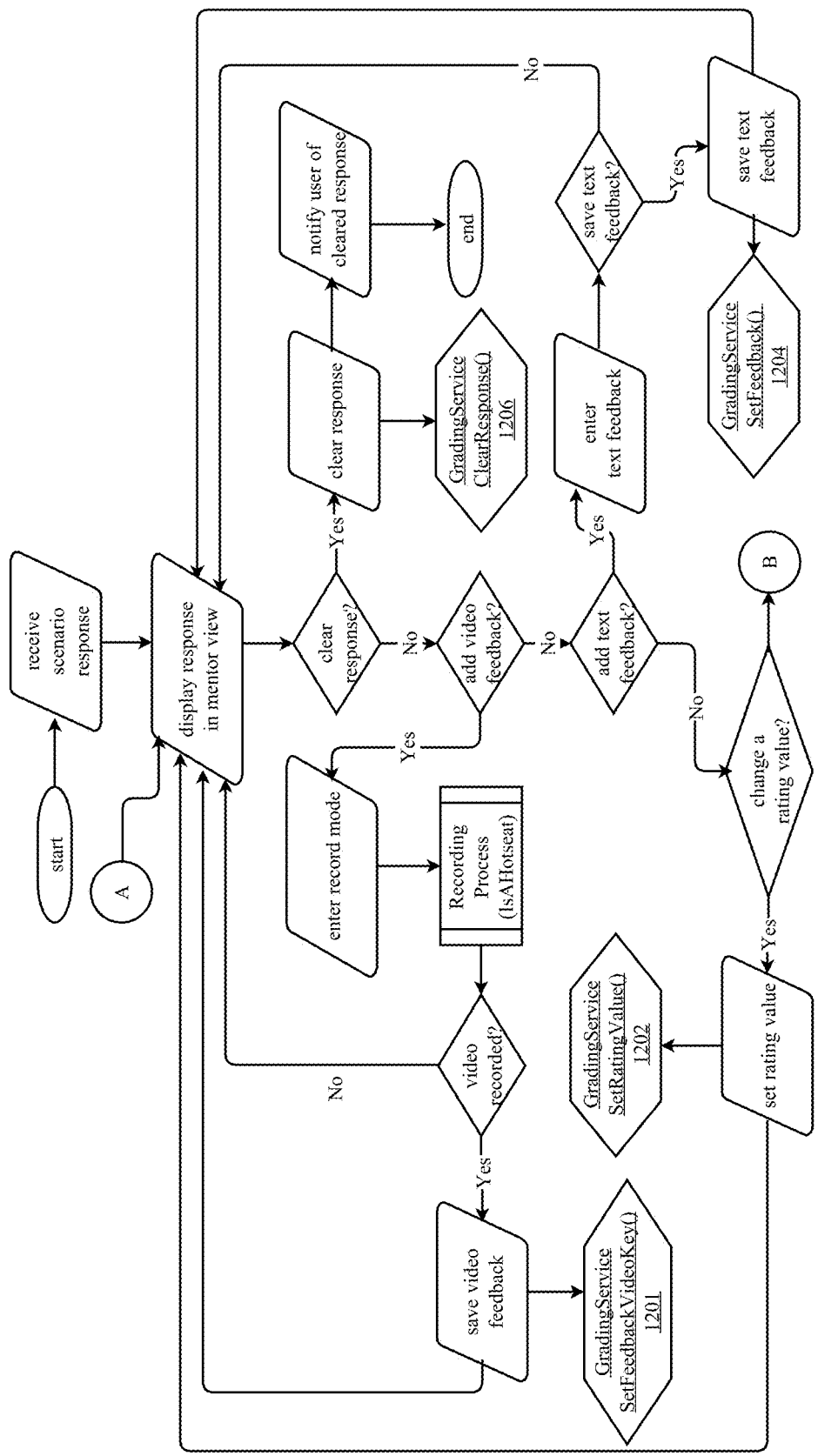
FIGS. 12A and 12B are flow diagrams of the grading process of the video role-play learning system of FIG. 1.
Figure 12B:
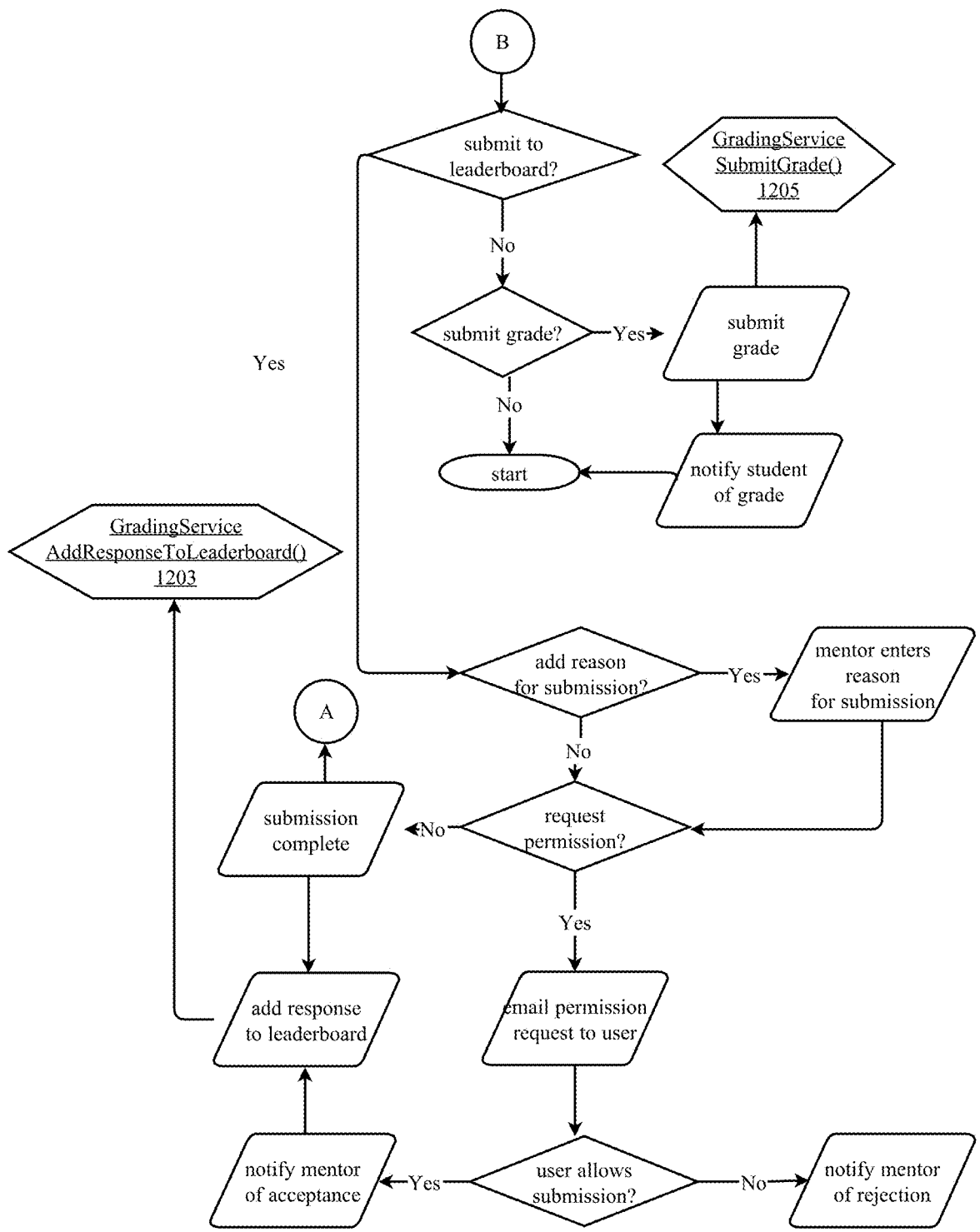

Referring to FIG. 12A and FIG. 12B, the process of grading student responses as supported by the Grading service 6024 (see, e.g., FIG. 6) is displayed via the mentor interface via Grading page 420 (see, e.g., FIG. 4). In process GradingServiceSetFeedbackVideoKey( ) 1201, the video feedback identifier of the mentor's response is recorded, with ratings for the grade set in process GradingServiceSetRatingValue( ) 1202, and publication to the leaderboard handled in process GradingServiceAddResponseToLeaderboard( ) 1203. Textual feedback specific to the grade can be added via GradingServiceSetFeedback( ) 1204, and the grade finally submitted via process GradingServiceSubmitGrade( ) 1205. If an error is made in the video recording of the student's response, the response can be cleared via process GradingServiceClearResponse( ) 1206.

Figure 13:
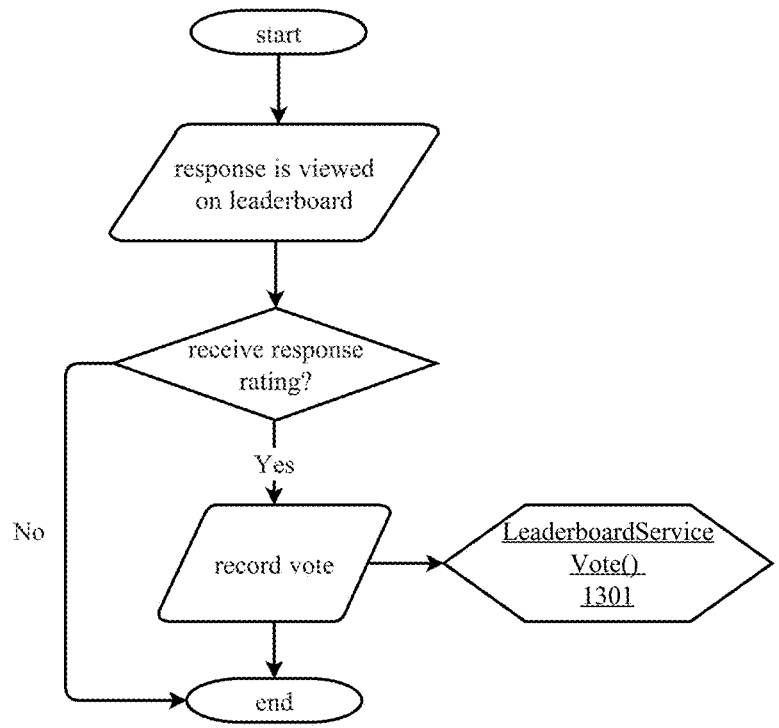
FIG. 13 is a flow diagram showing the leaderboard process of the invention.

Referring now to FIG. 13, authenticated sessions can view the leaderboard pages 414 (see, e.g., FIG. 4), and from which data is displayed dynamically via query of leaderboard service 6012 (see, e.g., FIG. 6). Sessions can submit a vote on the role-play responses. In process LeaderboardServiceVote( ) 1301, the leaderboard service 6012 method is invoked to record a vote of a particular role-play submission.

Figure 14:
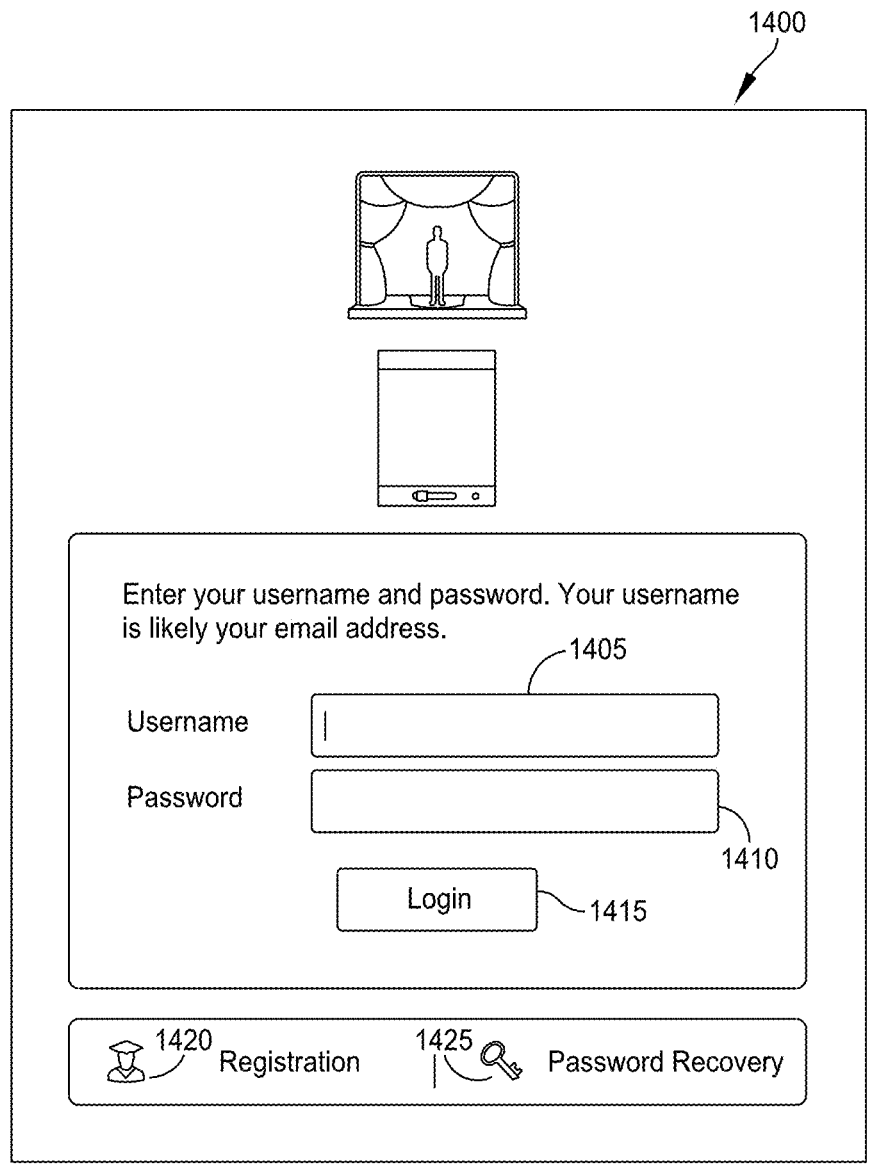
FIG. 14 is a screen capture of a client device of FIG. 1 displaying a login view.

Referring now to FIG. 14, an embodiment of the present system commences with a login view 1400. The login view includes edit controls for receiving login credentials, such as username 1405 and password 1410. Upon receiving the credential data and detecting selection of Login button 1415, the client device 12 can send the credential to a remote server 24 for validation in accordance with the security flow of FIG. 9. In addition, one or more button controls can be provided allowing for direct access to features such as, for example, registration 1420 or password recovery 1425.

Figure 15:
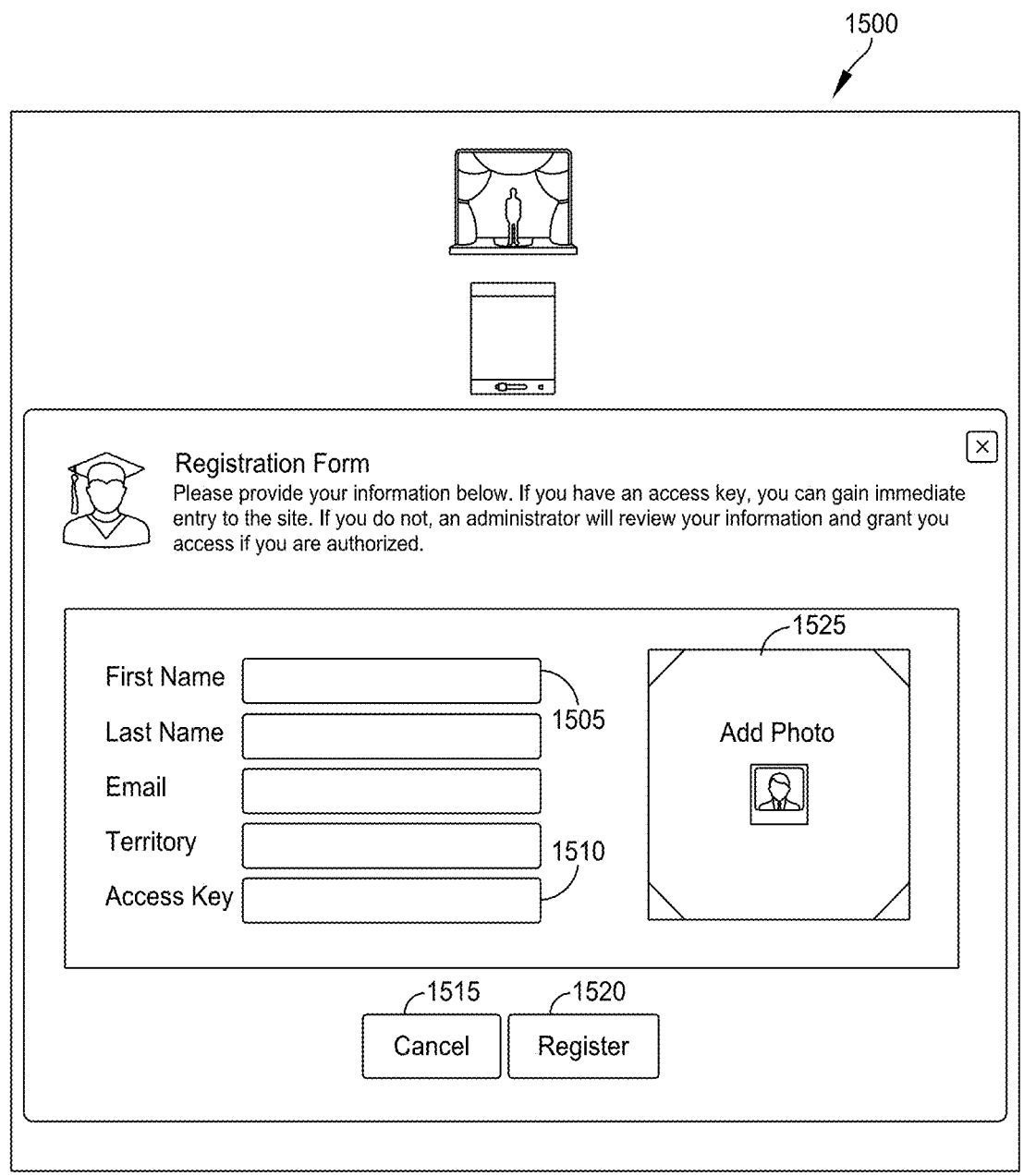
FIG. 15 is a screen capture of a client device of FIG. 1 displaying a registration view.

Referring now to FIG. 15, detection of the button press event associated with the registration button 1420 generates the registration view 1500. The registration view can include edit controls for receiving biographical information 1505 such as, for example, name, email, and territory. In addition, edit controls for receiving authorization information 1510 such as, for example, an access key can be provided. In some instances, controls for uploading photographs 1525 or other media are included. Buttons for cancelling registration 1515 and submitting registration 1520 allow for exiting of the view.

Figure 16:
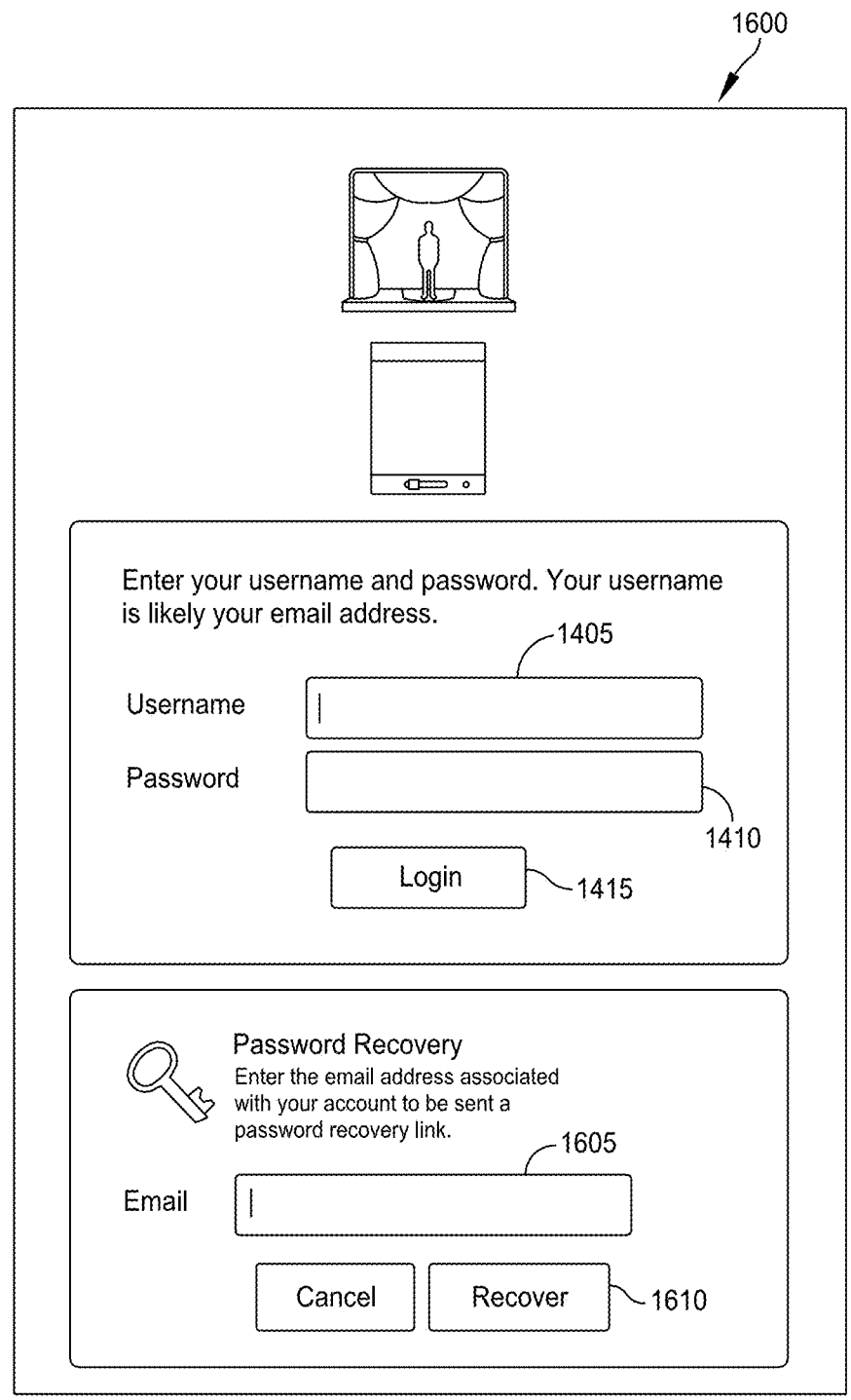
FIG. 16 is a screen capture of a client device of FIG. 1 displaying a password recovery view.

Referring now to FIG. 16, detection of the button press event associated with the password recovery button 1425 generates the password recovery view 1600. The password recovery view can include additional edit controls for receiving the user's email address for purposes of transmitting instruction for recovering or resetting the user's password. Buttons for cancelling recovery 1605 and submitting the recovery request 1610 allow for exiting of the view.

Figure 17:
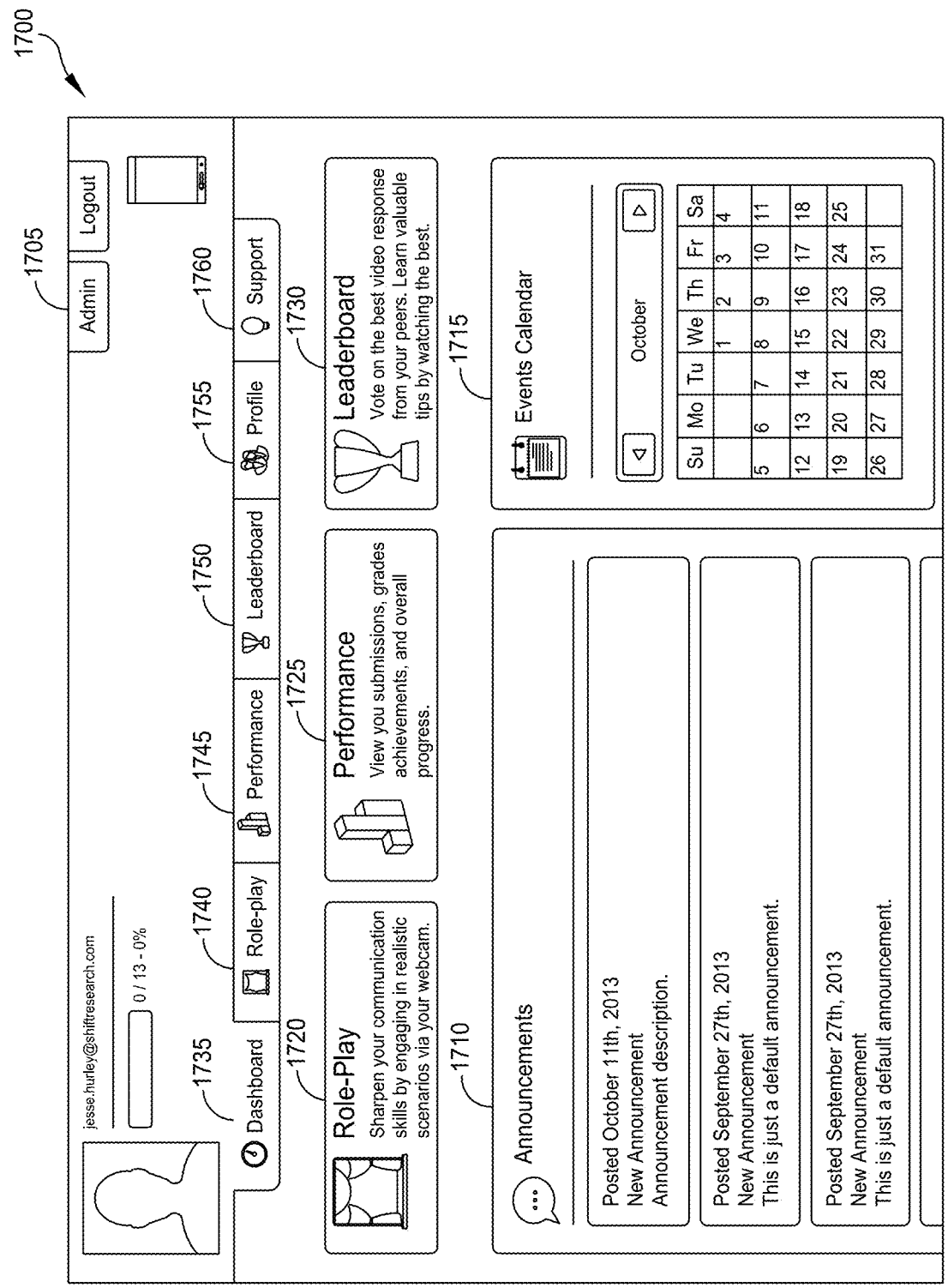
FIG. 17 is a screen capture of a client device of FIG. 1 displaying a student home view.

Referring now to FIG. 17, in some embodiments, successful validation of credential allows session access to a home view 1700. This view 1700 provides an overview of various aspects of data in the video role-play learning system, convenient access to various student features, and a control for switching to an administrative mode 1705. Detection of the click event associated with the admin button 1705 triggers a transition to an administrative mode, providing access to one or more administrative features. A tab control displays a series of navigation tabs such as, for example, a Dashboard tab 1735, a Role-plays tab 1740, a Performance tab 1745, a Leaderboard tab 1750, a Profile tab 1755, and a Support tab 1760. Various buttons provide direct access student features, including Role-play Button 1720, a Performance button 1725, and a Leaderboard button 1730.

In some embodiments, one or more services engines provides the display with information on items of interest such as, for example, new role-plays, new product information, and general company information. This information is displayed in an announcements container window 1710, view object, or other user interface display control. In addition, a calendaring module can provide information on date associated information such as, for example, due dates, when new role plays will be added, company meetings, role play events, and the like. This information is displayed in an events calendar widget 1715 or other user interface calendaring control.

Figure 18:
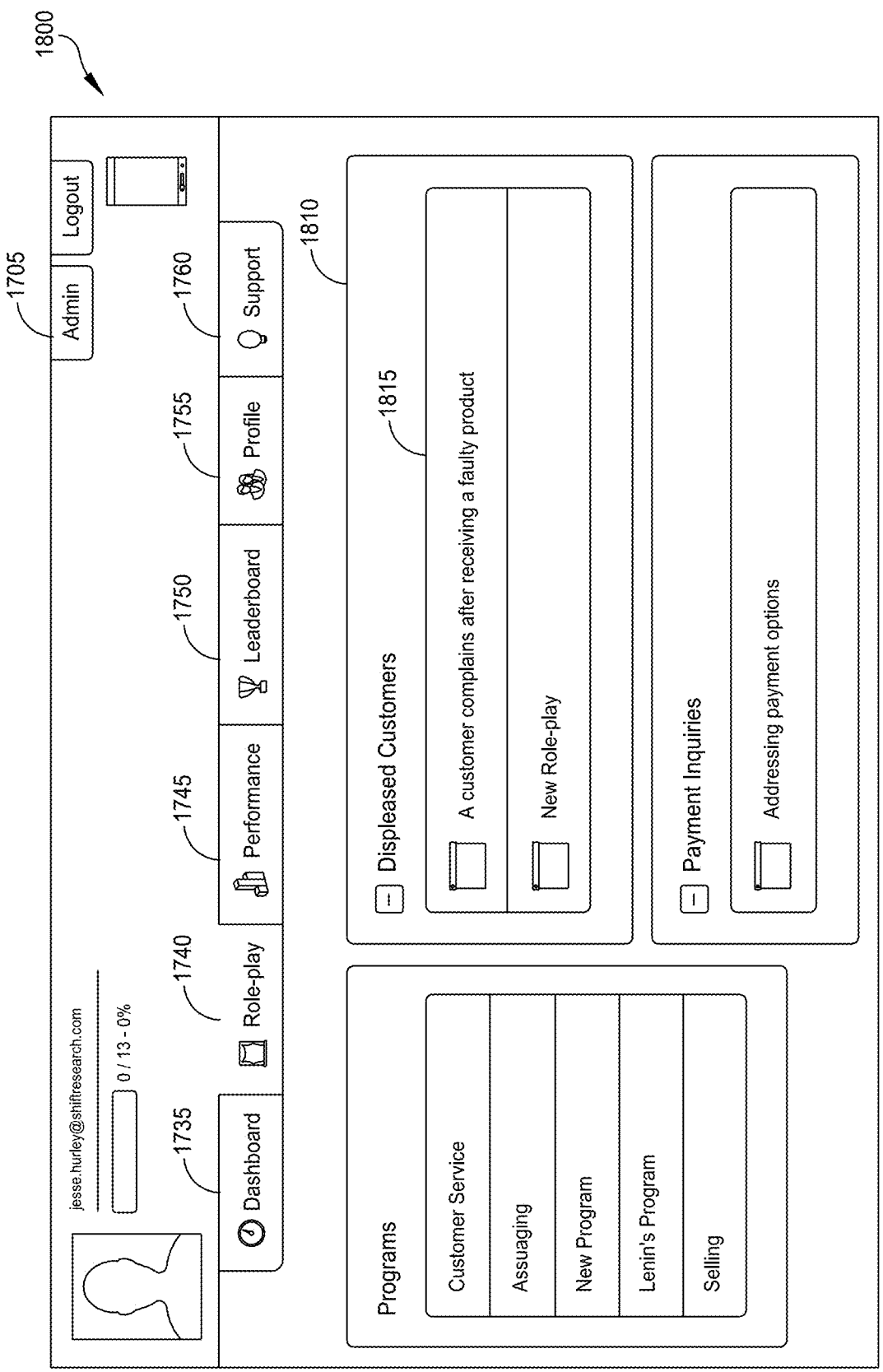
FIG. 18 is a screen capture of a client device of FIG. 1 displaying a student role-play view.

Referring now to FIG. 18, detection of the click event associated with the Role-play tab displays the role-play selection view 1800. In some instances, a selection list control 1805 displays multiple programs. The selection of a program displays role-plays in a role-play selection list control 1810 that are associated with the selected program. Selection list items 1815 include indicia of difficulty (e.g., green icons for easy, yellow for intermediate difficulty, orange for challenging, and red for high difficulty) such as icon color, submission status, submission grade, assigned achievement awards, hotseat status, and the like.

Figure 19:
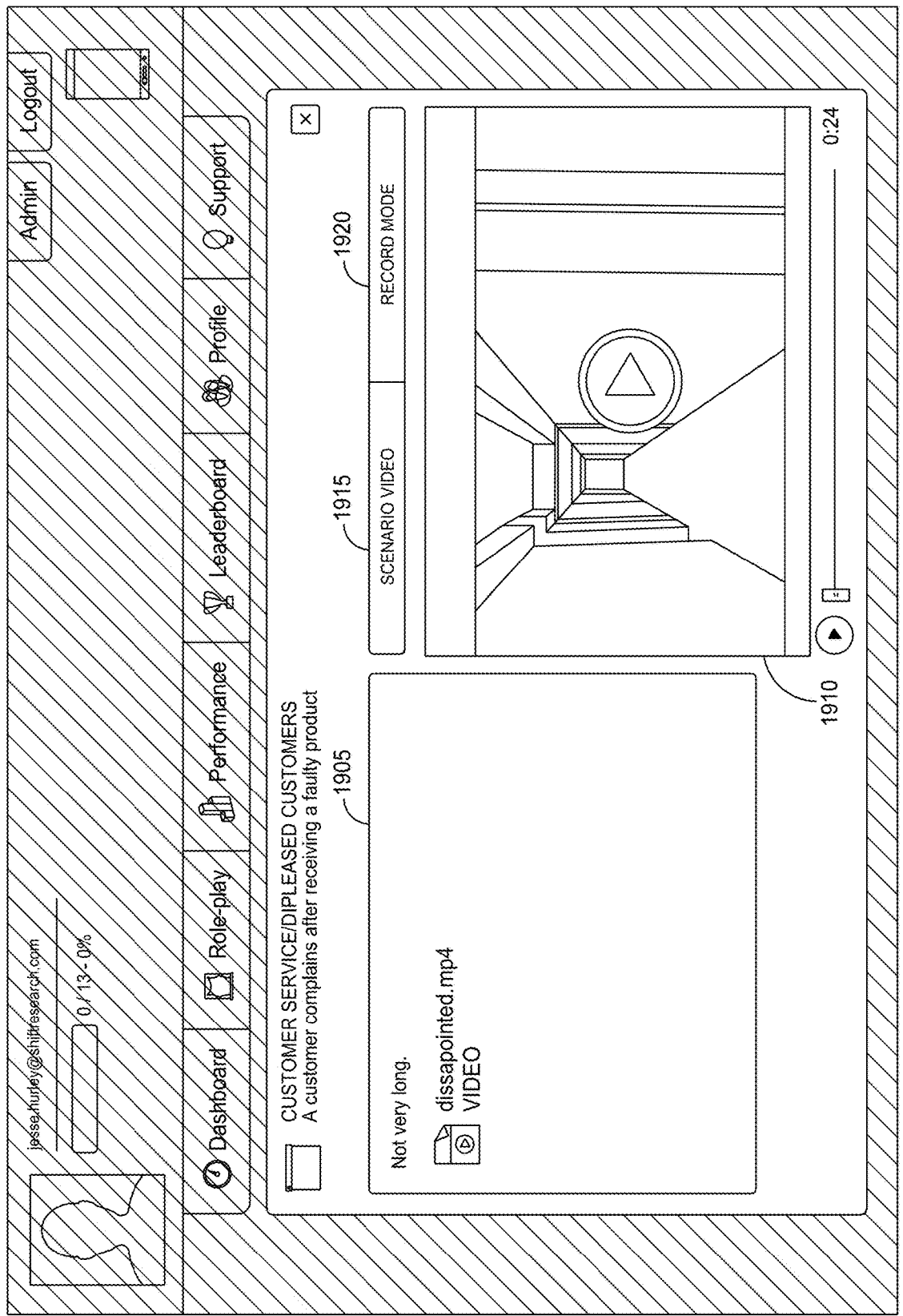
FIG. 19 is a screen capture of a client device of FIG. 1 displaying a student scenario view.
Figure 20:
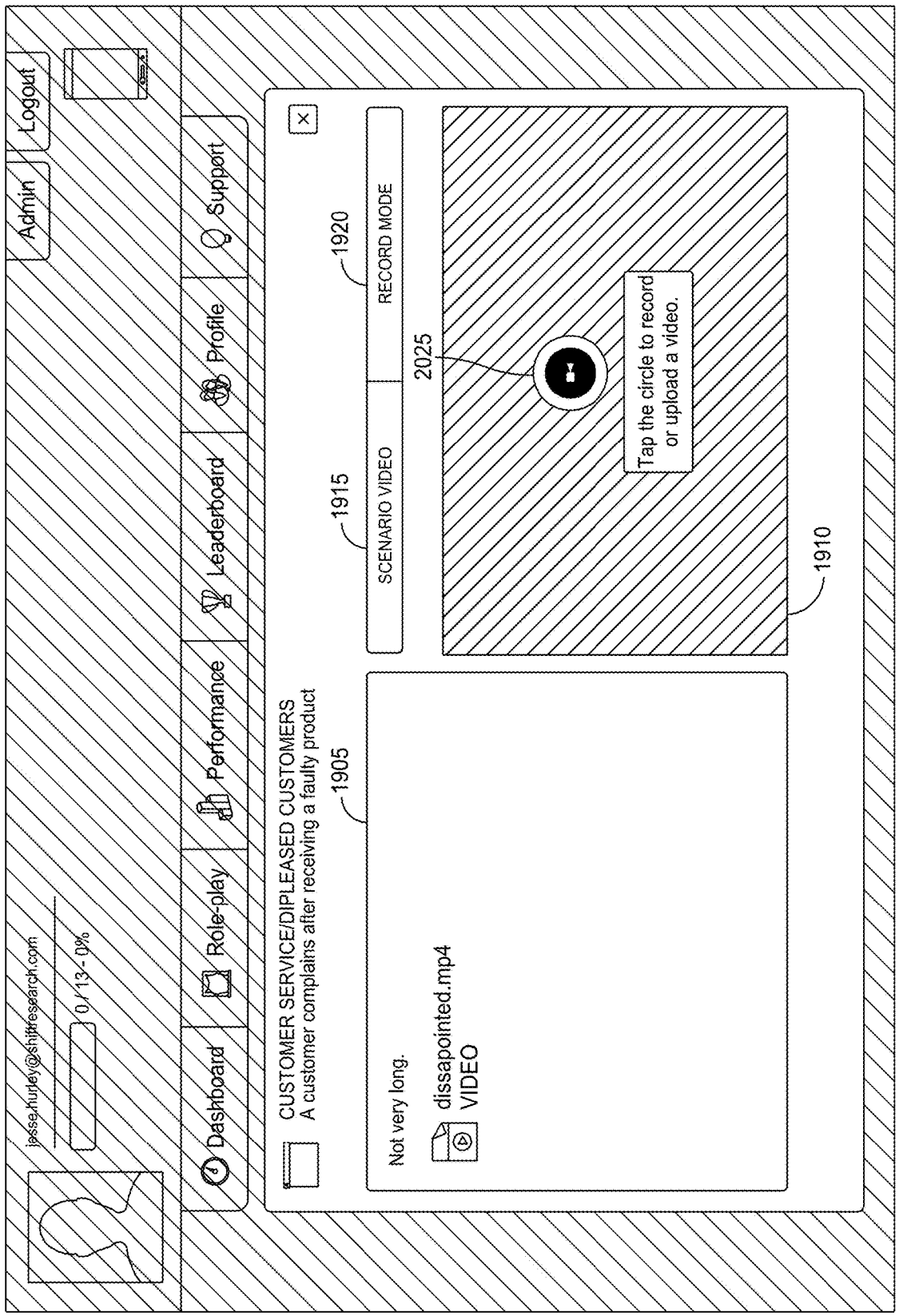
FIG. 20 is a screen capture of a client device of FIG. 1 displaying a student recording view.

Referring now to FIG. 19 and FIG. 20, detection of the selection event associated with a role-play selection item in the role-play selection list 1810 (see, e.g., FIG. 18) displays a text display control 1905 with a scenario description and video playback control 1910 for display of the role-play scenario and recorded response. Detection of the click event associated with the Scenario Video button 1915 configures the video playback control 1910 for playback of the scenario video. Detection of the click event associated with the Record Mode button 1920 configures the video playback control 1910 for recording of the video response to the scenario video. Detection of the click event associated with Record button 2025 can initiate recording of a student response recording. Completion of the recording can trigger display of a delete recording button (not shown) and upload response button 2025. Detection of the click event associated with the delete recording button deletes the current student response recording, allowing for recording of a new response prior to submission. Detection of the click event associated with the upload response button 2025 submits the recording to the evaluator for grading.

Figure 21:
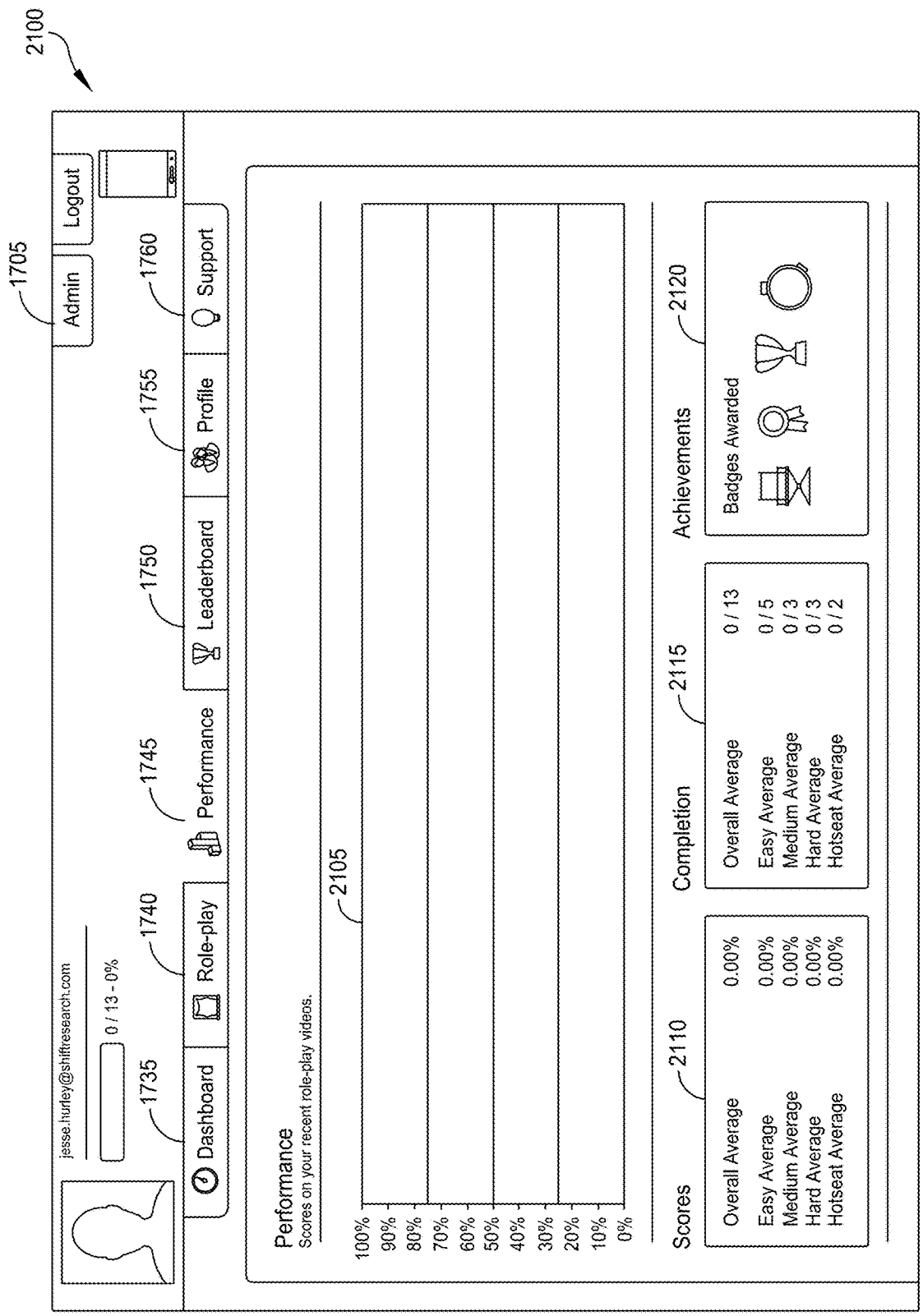
FIG. 21 is a screen capture of a client device of FIG. 1 displaying a student performance view.

In some embodiments, a performance service obtains raw performance data relating to the performance of one or more role play participants, stores the performance data in the performance database, analyzes the raw performance data, and/or provides derived performance data for display. Referring now to FIG. 21, the display module displays performance data in a graph control, table control 2105, and the like. For example, most recent scores are plotted in a line graph control, average scores and completion ratios are organized by category and displayed in table controls 2110, 2115, and achievements are awarded and displayed 2120 including, for example, badge icons. Achievements can include, for example, a hotseat badge when a hotseat role play is completed with a grade above a pre-defined threshold, a blue ribbon badge when a role play is completed with a perfect score, a trophy badge when a video response is submitted to the leaderboard, a veteran's medal badge when a defined number of video role plays are completed, and the like.

Figure 22A:
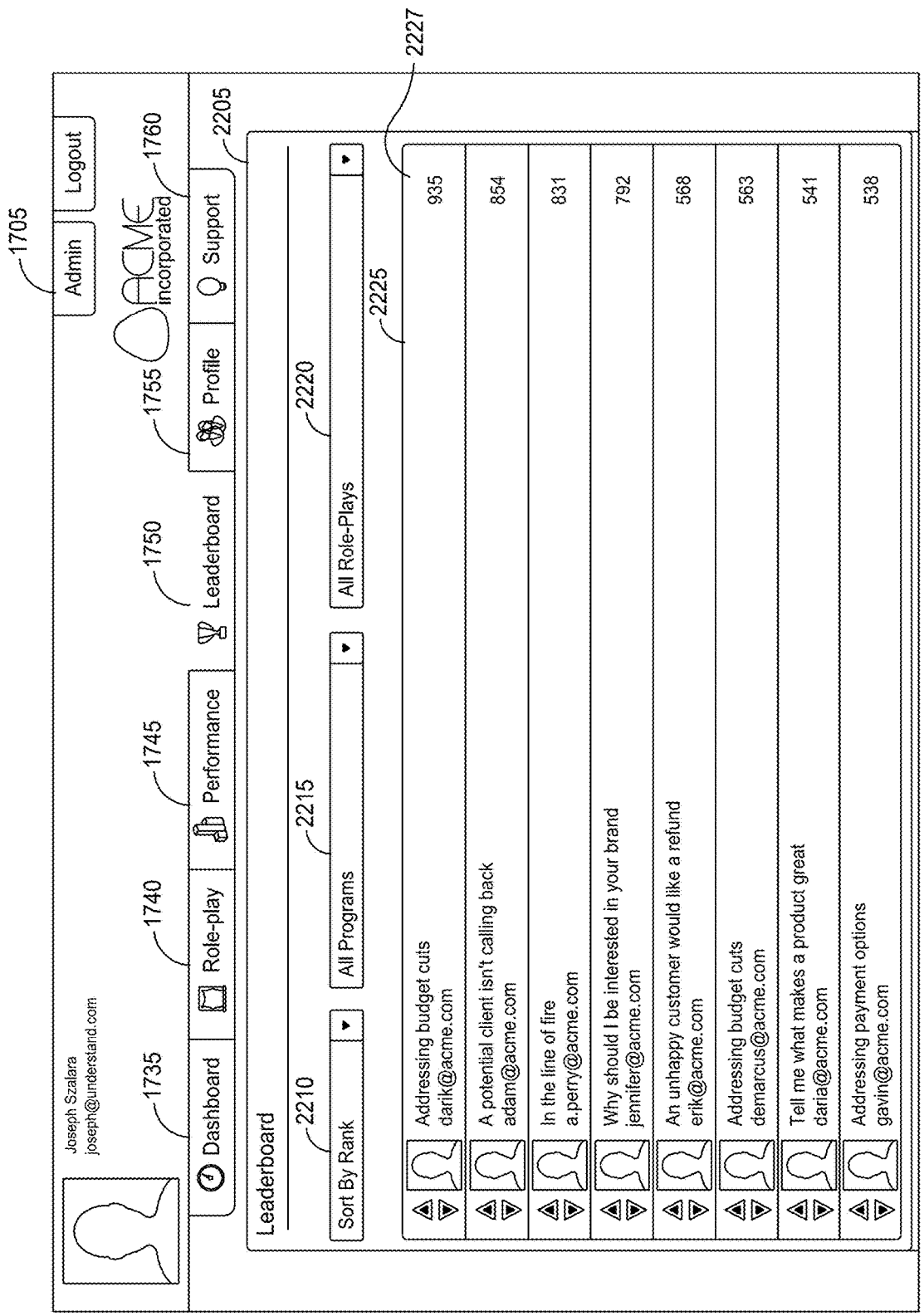
FIG. 22A is a screen capture of a client device of FIG. 1 displaying a student leaderboard view.
Figure 22B:
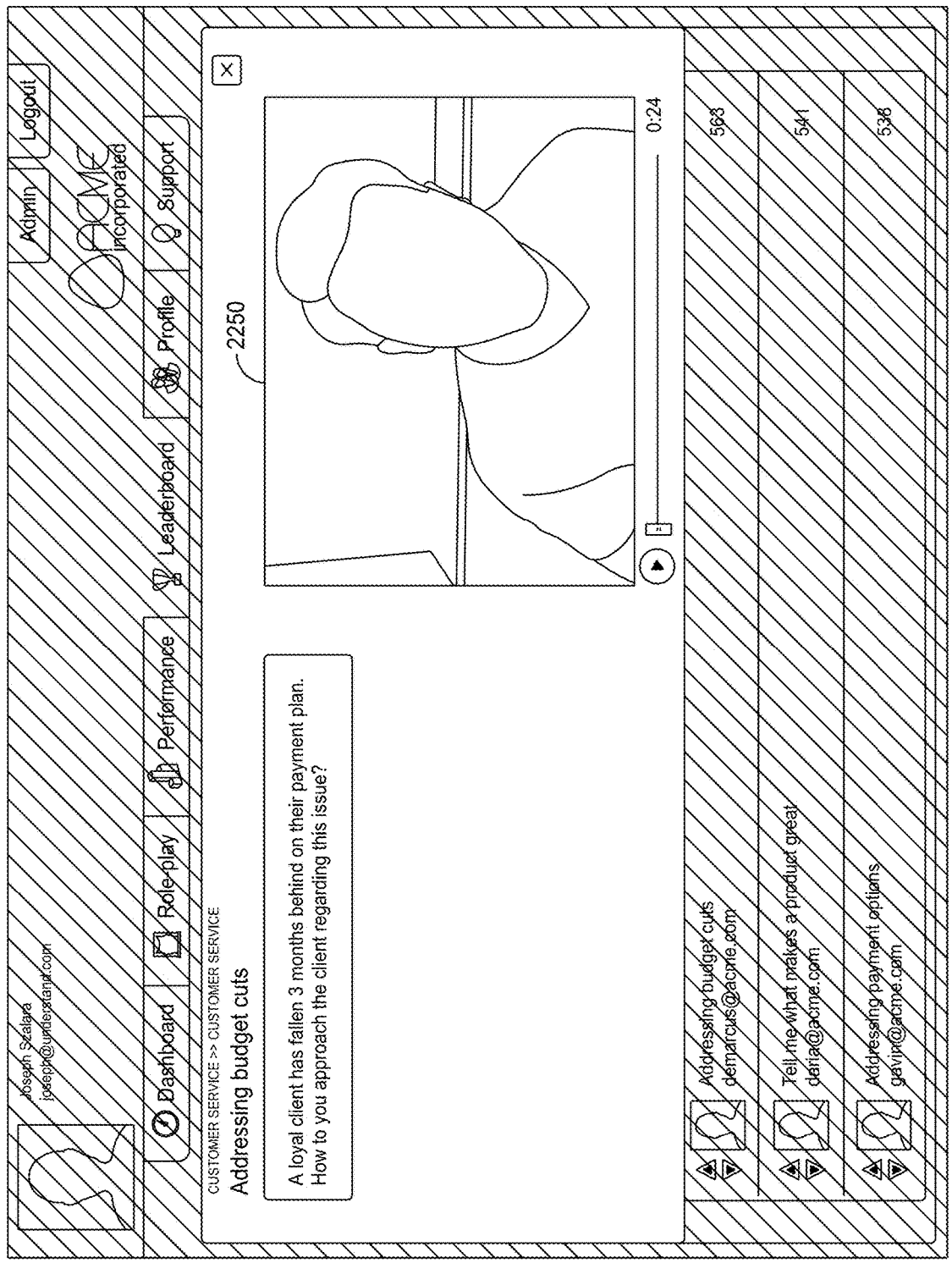
FIG. 22B is a screen capture of a client device of FIG. 1 displaying a leaderboard response selected from the leaderboard view of FIG. 22A.

With reference now to FIG. 22A and FIG. 22B, in some embodiments, a leaderboard service 6012 (see, e.g., FIG. 6) identifies the highest rated video response. The service 6012 generates a selection list of leaderboard video responses 2225 with their associated rating 2227. Selection of filter parameters in filter drop list controls 2210, 2215, 2220 trigger filtered display of leaderboard video responses. Filter drop list controls can include filters for rank 2210, programs 2215, scenarios 2220, and the like. Inclusion in the leaderboard display can be determined, at least in part, by administrative selection of the response, user rating of the response, or both. Detecting a selection event for a response item initiates playback of the recorded response in a video display container 2250.

Figure 23:
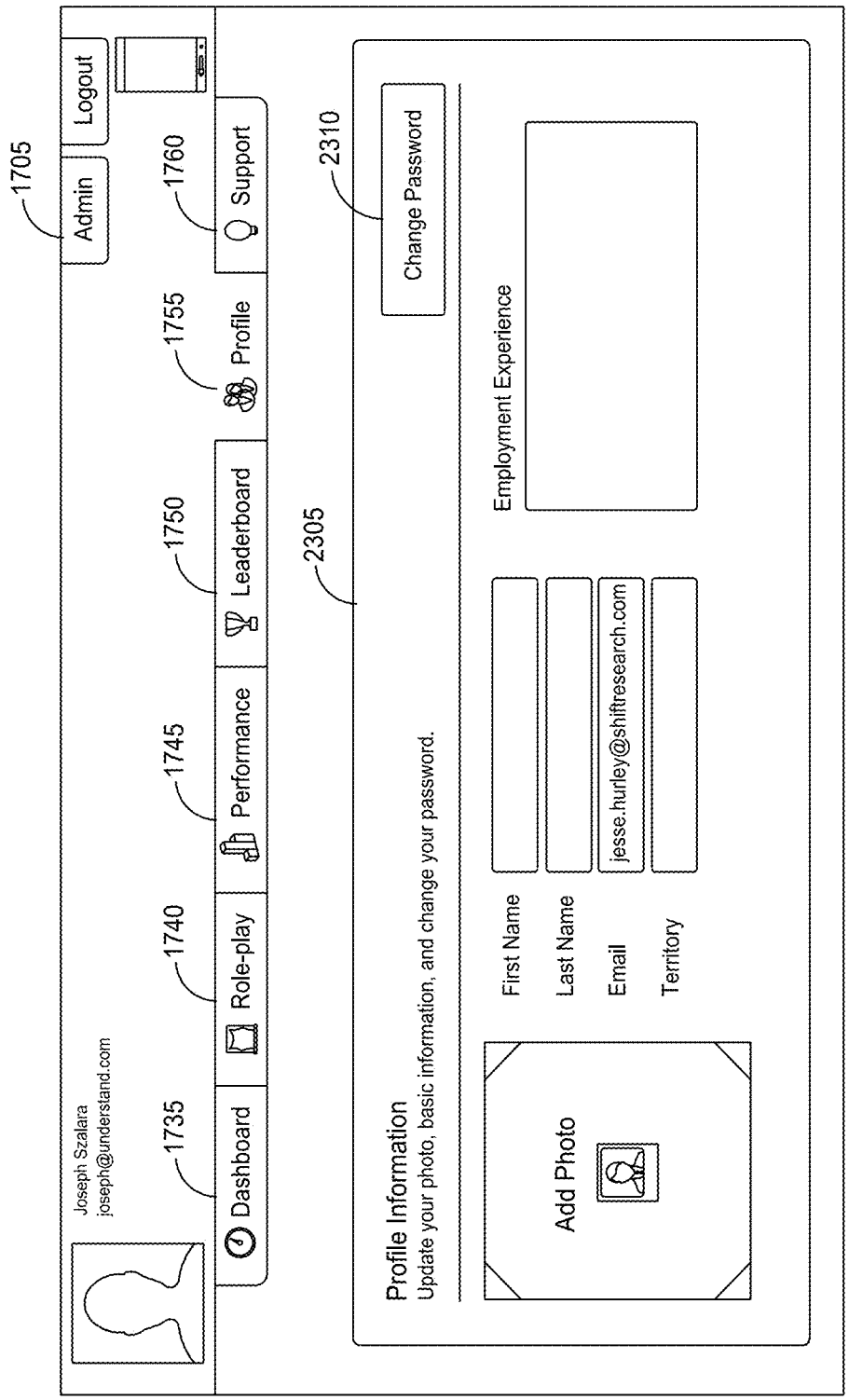
FIG. 23 is a screen capture of a client device of FIG. 1 displaying a student profile view.

Referring now to FIG. 23, detection of the click event associated with the profile tab 1755 triggers display of an editable profile container 2305. Edit controls for biographical data and employment experience are included. Detection of the click event associated with the Change Password button 2310 displays the change password interface (not shown).

Figure 24:
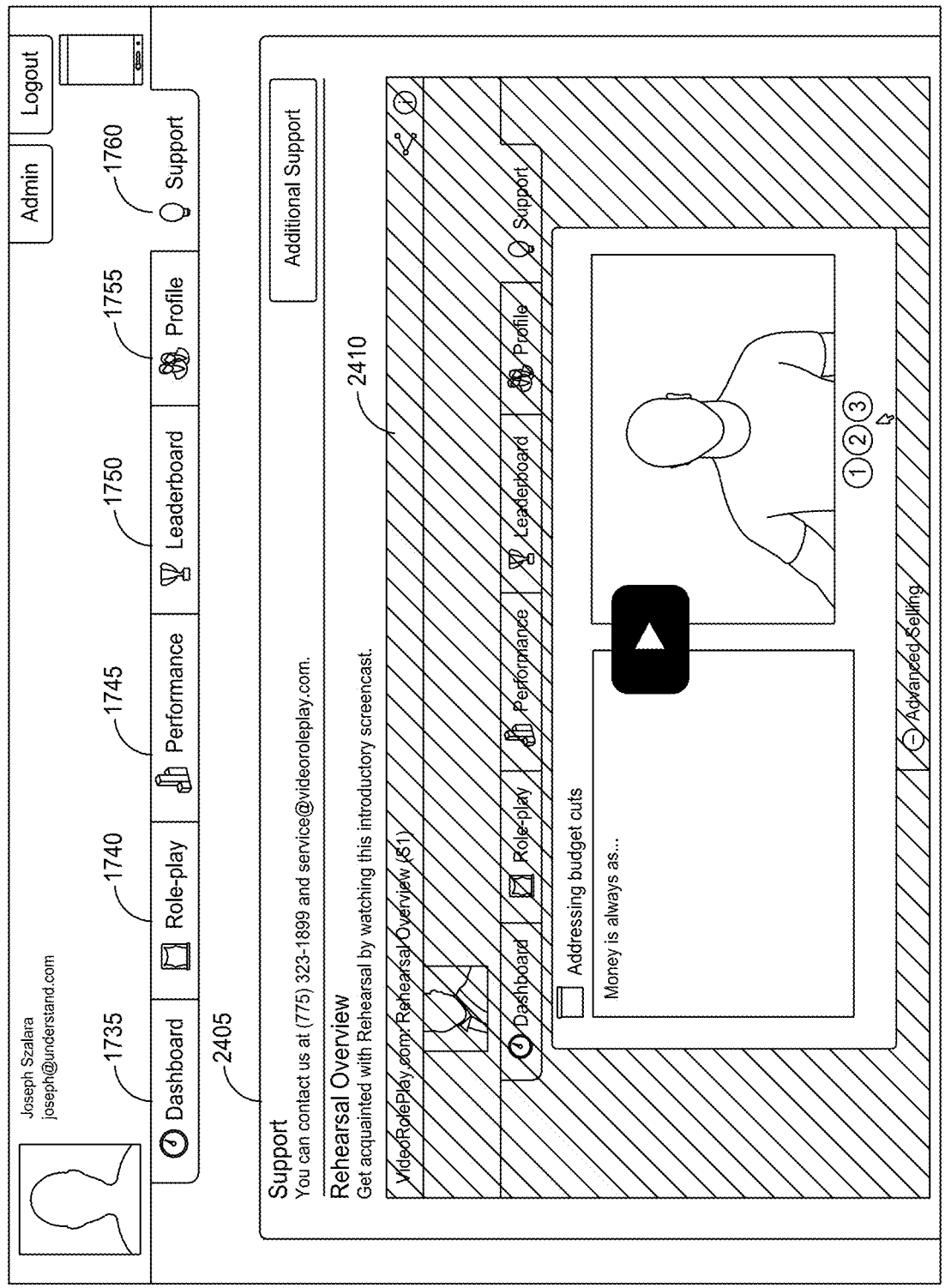
FIG. 24 is a screen capture of a client device of FIG. 1 displaying a student support view.

Referring now to FIG. 24, detection of the click event associated with the Support tab 1760 displays the support view 2400. A support container 2405 includes a video playback control 2410 displaying one or more support videos.

Figure 25:
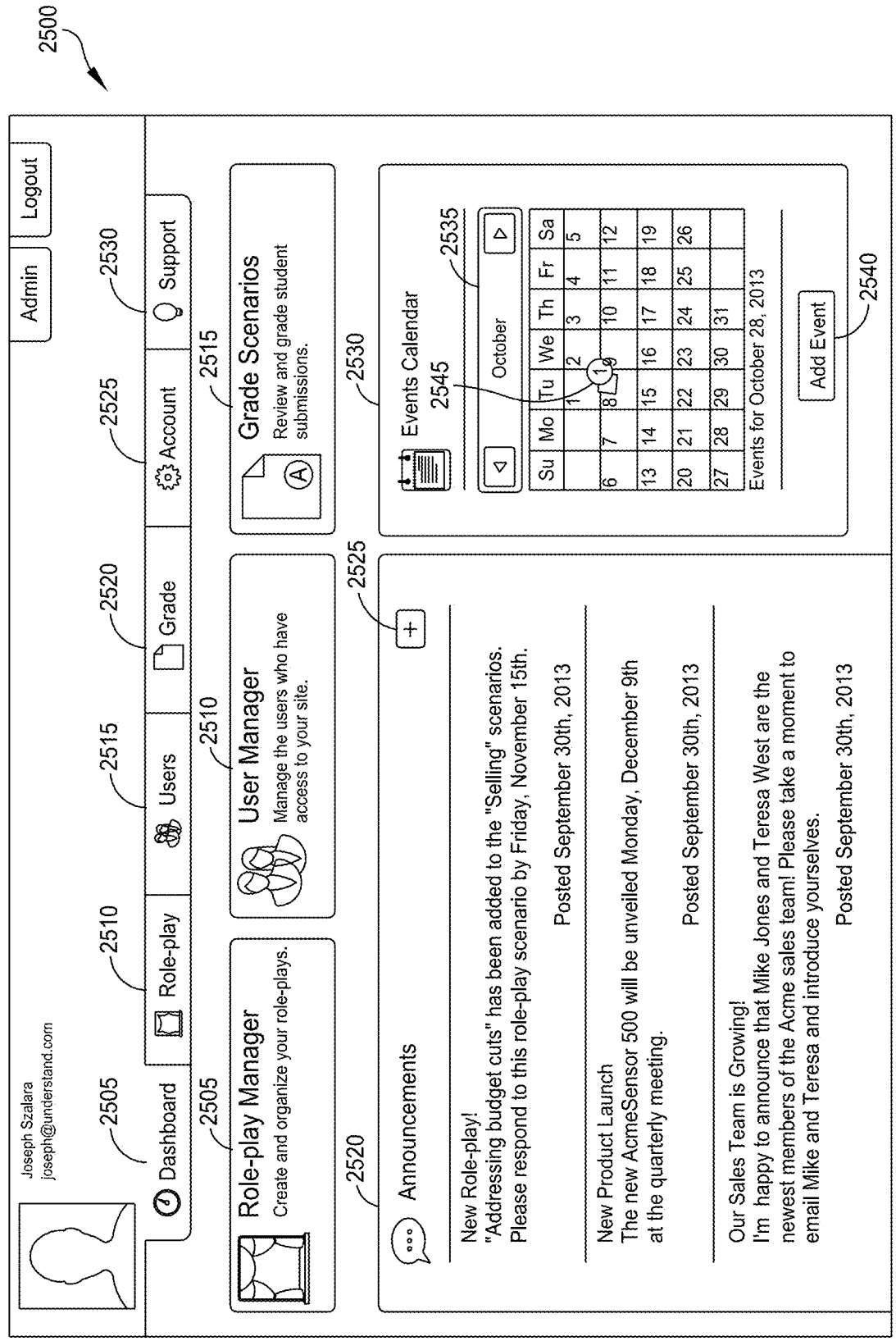
FIG. 25 is a screen capture of a client device of FIG. 1 displaying an admin home view.

Referring now to FIG. 25, an admin interface tab control displays a series of navigation tabs such as, for example, a Dashboard tab 2505, a Role-plays tab 2510, a Users tab 2515, a Grade tab 2520, an Accounts tab 2525, and a Support tab 2530. Detection of the click event associated with the Dashboard tab control 2505 displays an administrative dashboard view 2500. The dashboard includes controls 2505, 2510, 2515 to directly access administrative features such as role-play management, user management, and grading of scenarios. An announcement section 2520 displays entered announcements, and detection of the click event associated with the add announcements button 2525 displays the editable add announcement control (not shown). An events calendar section 2530 includes a calendar control 2535 allowing the selection of dates for adding new events. The calendar control includes icons 2545 indicative of existing events. Detection of the click event associated with these icons displays an event edit dialog, allowing the event to be edited and/or deleted. Detection of the click event associated with the Add Event button 2540 displays the event edit dialog (not shown).

Figure 26:
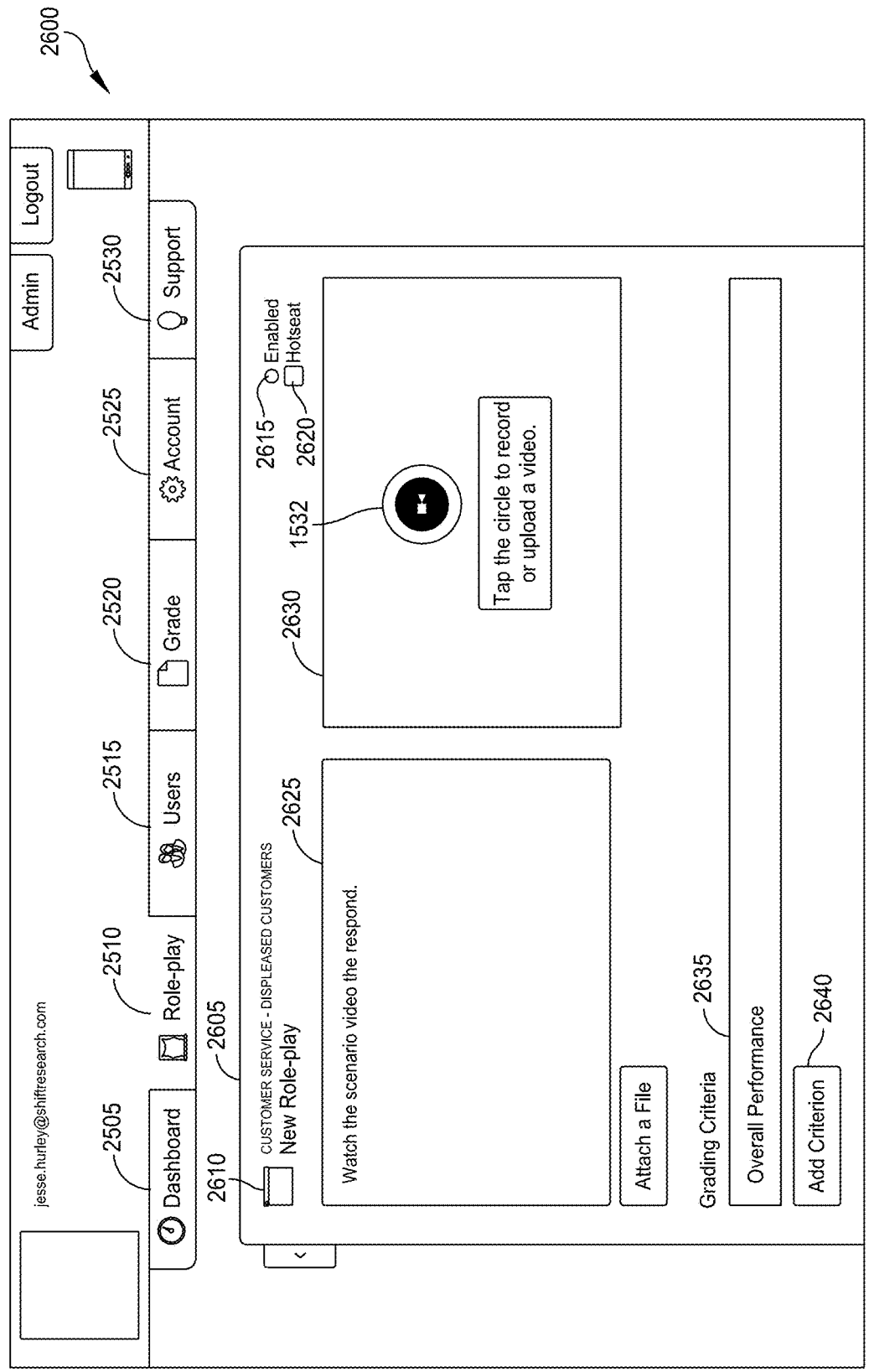
FIG. 26 is a screen capture of a client device of FIG. 1 displaying an admin role-play designer view.

Detection of the selection event associated with the Add Role-play button (not shown) triggers display of a role-play edit interface 2600. Referring now to FIG. 26, a role-play creation container 2605 includes a variety of user interface controls for role-play content creation. For example, an edit control 2625 can allow for the addition of descriptive content such as text or images. In some instances, the edit control includes rich text editing capabilities. Detection of the selection event associated with a toggle control 2610 can toggle across available difficulty levels. Detection of the record video button 2632 selection event initiates a record scenario video session. Detection of the upload video button 2634 selection event triggers display of a file system browsing control (not shown) for selection of an existing video. A list of associated grading criteria 2635 can be displayed. Detection of the click event associated with the Add Criterion button triggers the display of an edit box for the creation of new grading criteria. Detection of the selection event associated with selecting a grading criteria list item displays a delete button and an editable criterion title control (not shown). Detection of the click event associated with the enable role-play button 2615 toggles the enablement state for the role-play. In some instances, role-play scenarios can be designated as hotseat role-plays. Designating a role-play as a hotseat role-play can allow limited number of viewings and responses, such as a single viewing, a single response attempt, or both. Detection of the selection event associated with the Hotseat check box 2620 toggles the hotseat designation for the role-play.

Figure 27:
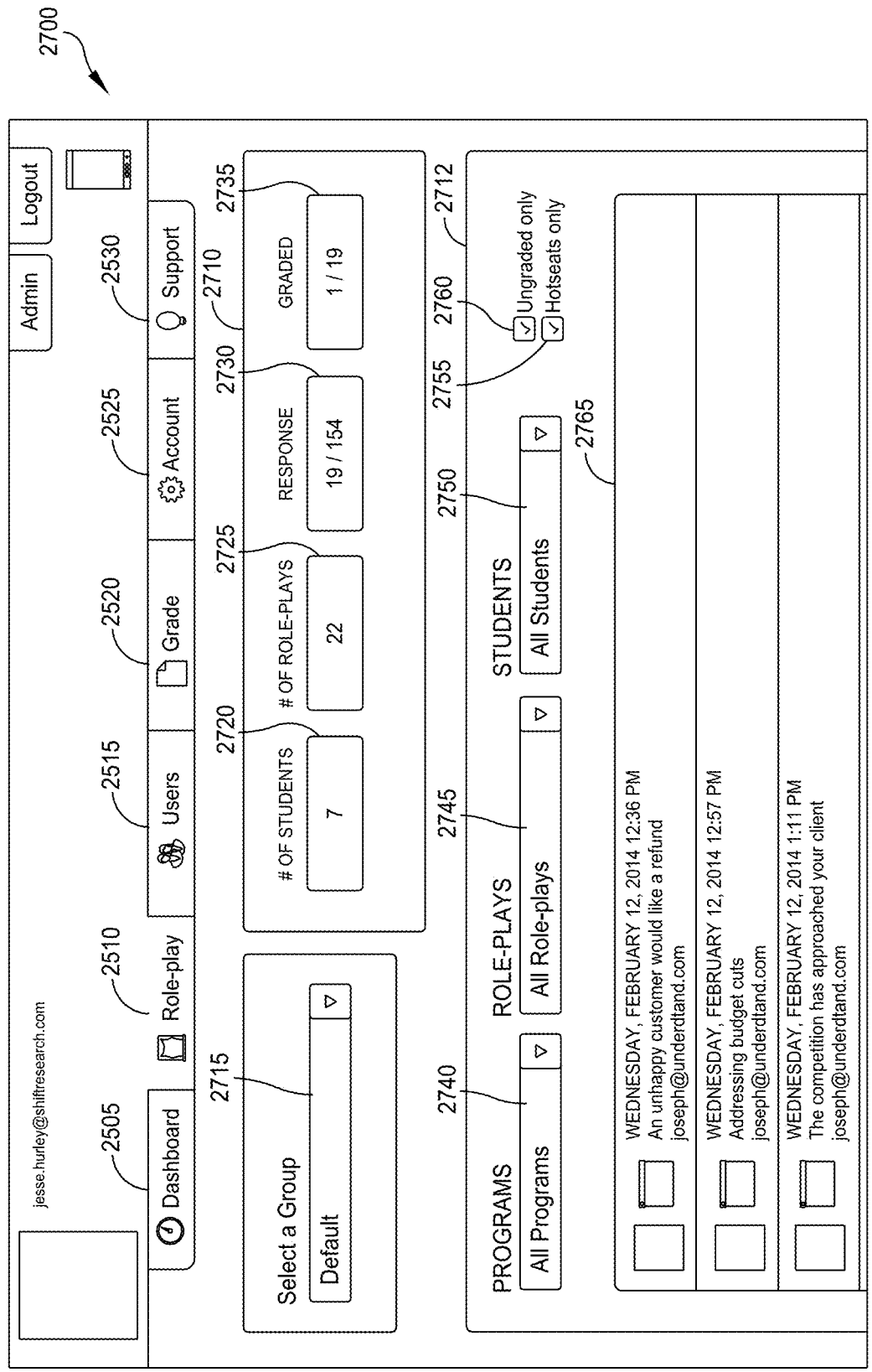
FIG. 27 is a screen capture of a client device of FIG. 1 displaying an admin grading view.

Referring now to FIG. 27, detection of the click event associated with the Grade tab 2520 displays the grade management view 2700 that includes a class selection control 2715, a class statistics section 2710, and a list view containing a list of associated video responses 2712. Selection of a class in the class selection control 2715 triggers display of the associated class statistics in a statistics display section 2710. Statistics can include, for example, the number of students in the class 2720, the number of scenarios available in the class 2725, the response ratio 2730, ratio of graded responses 2735, and the like. Selection of filter parameters in filter drop list controls 2740, 2745, 2750 and checkboxes 2760, 2755 trigger filtered display of video responses for the selected class 2765. Filter drop list controls can include filters for topics 2740, scenarios 2745, students 2750, and the like. Detection of the selection event associated with an Ungraded only checkbox 2760 displays only those video response where a grade has not yet been assigned. Detection of the selection event associated with the Hotseat only checkbox 2755 displays only those video responses where the scenario is designated as a Hotseat.

Figure 28:
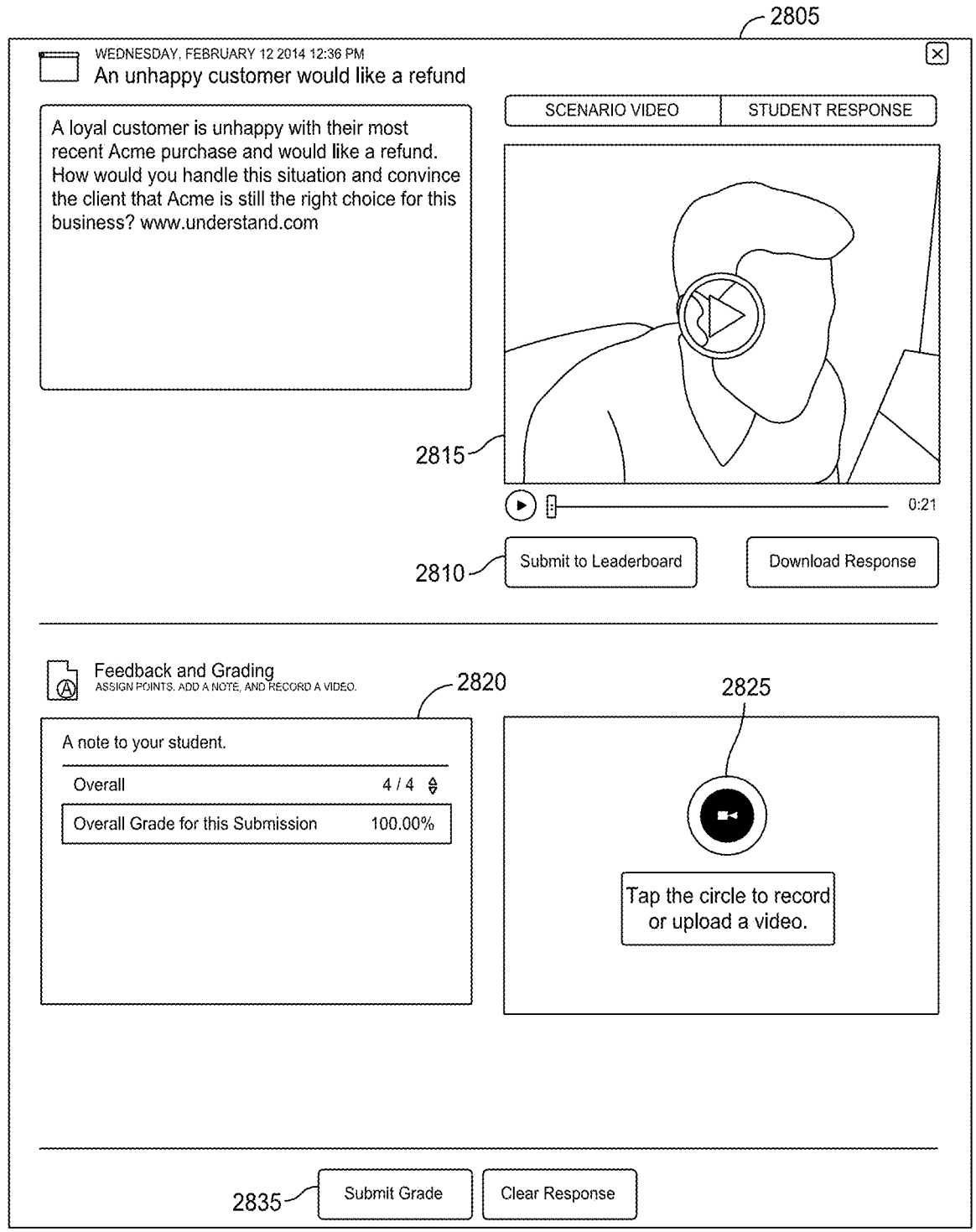
FIG. 28 is a screen capture of a client device of FIG. 1 displaying an admin grading action view.

Referring now to FIG. 28, detection of the click event associated with the selection of a video response in the list view containing a list of video responses 2712 (see, e.g., FIG. 27), triggers the display of the grading view 1705 for the associated video response. A video playback control 2815 displays the video response for review by an evaluator. Detection of the click event associated with the Submit To Leaderboard button 2810 designates the video for display on the video response leader board (see, e.g., FIG. 22A). Detection of the click event associated with the feedback and grading control 2820 changes the control state to an edit mode allowing for input of narrative text feedback, grading, or both. Detection of the record video button 2825 selection event initiates a record feedback video session. Detection of the upload video button 1725 selection event triggers display of a file system browsing control (not shown) for selection of an existing feedback video. Detection of the click event associated with the Submit Grade button 2835 commits the grade for display in the student view mode and for inclusion in grade statistics, performance statistics, achievement determinations, and the like.

Figure 29:
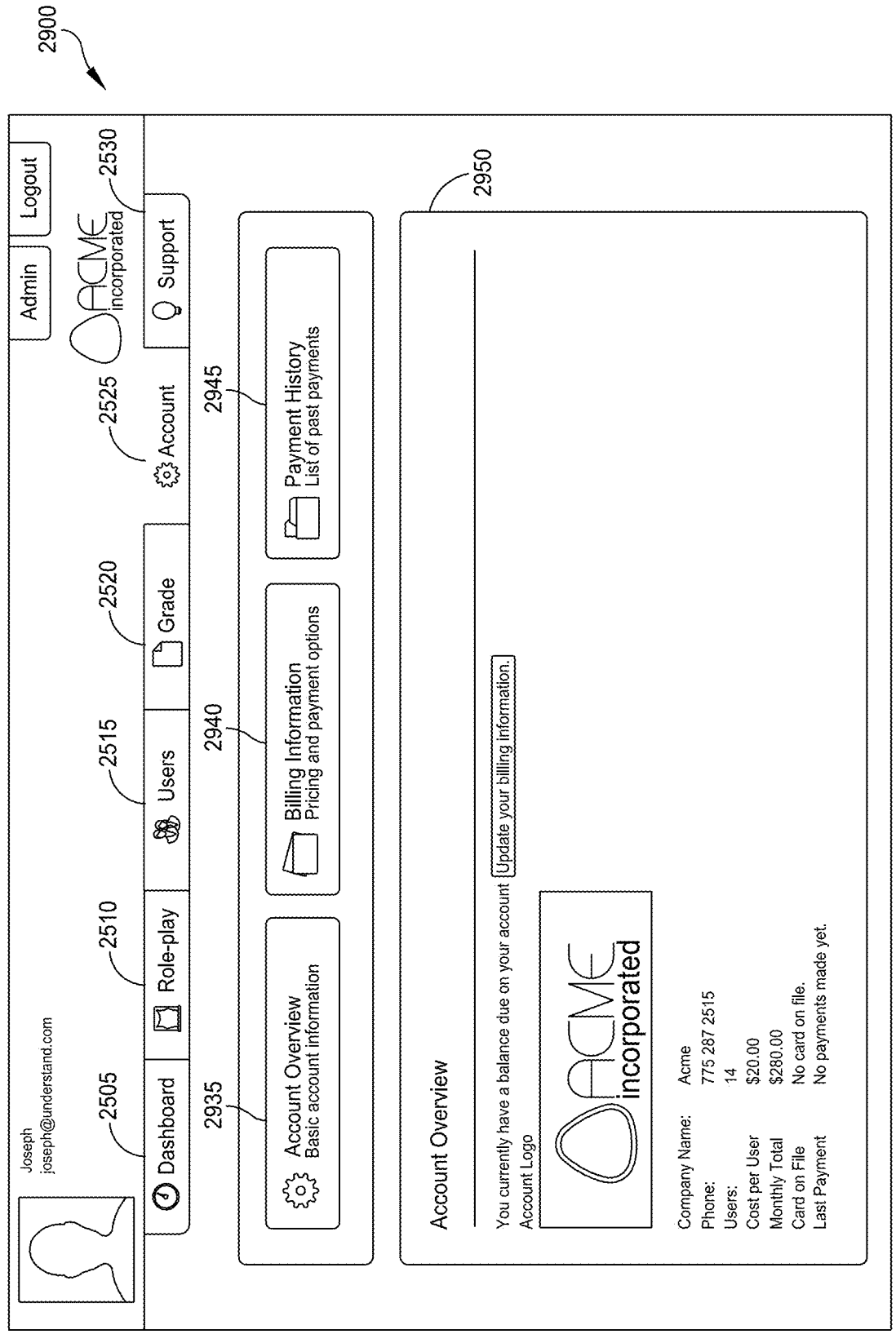
FIG. 29 is a screen capture of a client device of displaying an admin account view.

Referring now to FIG. 29, detection of the click event associated with the Accounts tab 2525 triggers display of an Accounts Overview button 2935, a Billing Information button 2940, and a Payment History button 2945. In addition, an Accounts Overview table is displayed 2950 that can include information such as company logo, company name, phone number, cost per user, monthly totals, whether a credit card is on file, when last payment was received, and the like.

Figure 30:
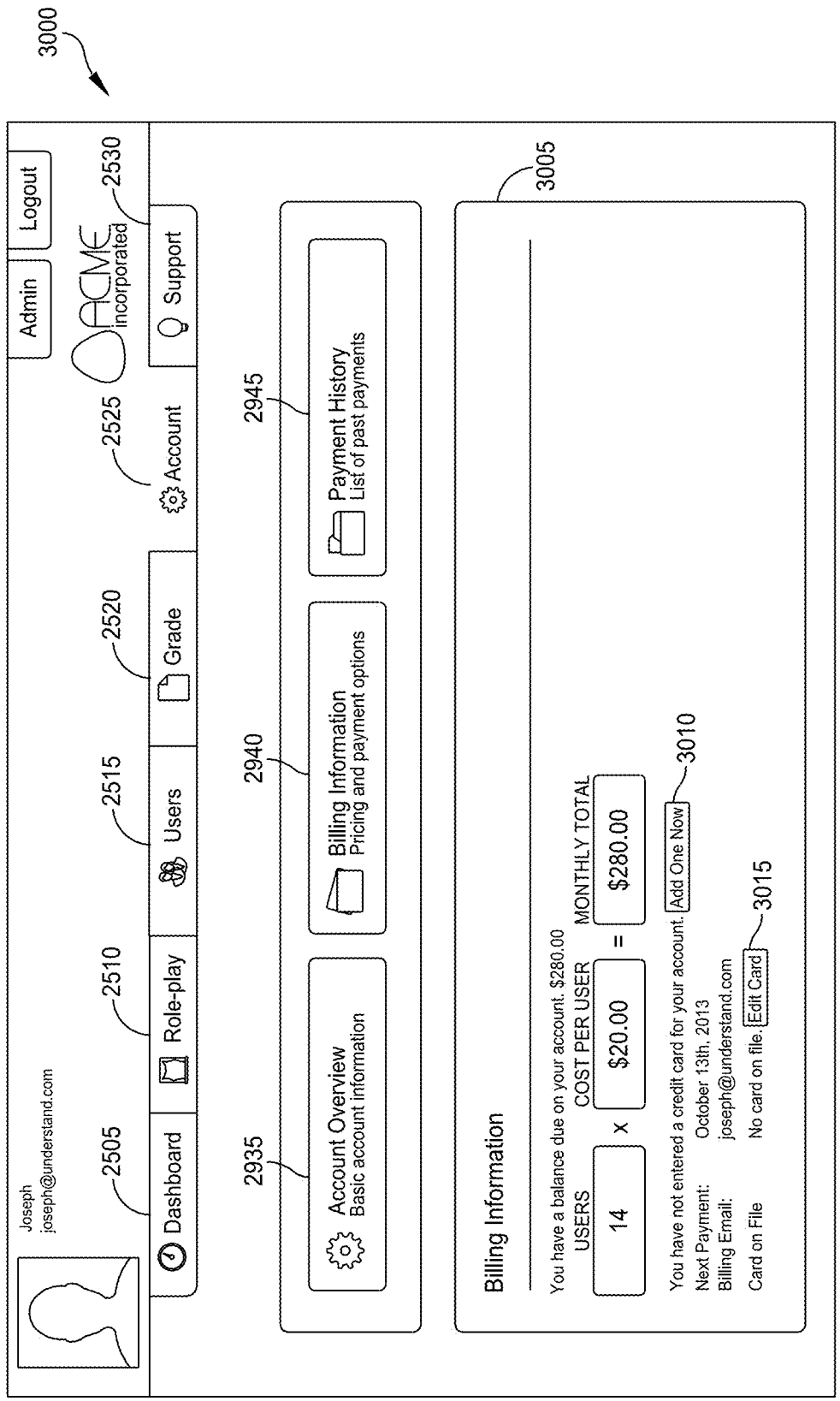
FIG. 30 is a screen capture of a client device of FIG. 1 displaying a billing information view.
Figure 31:
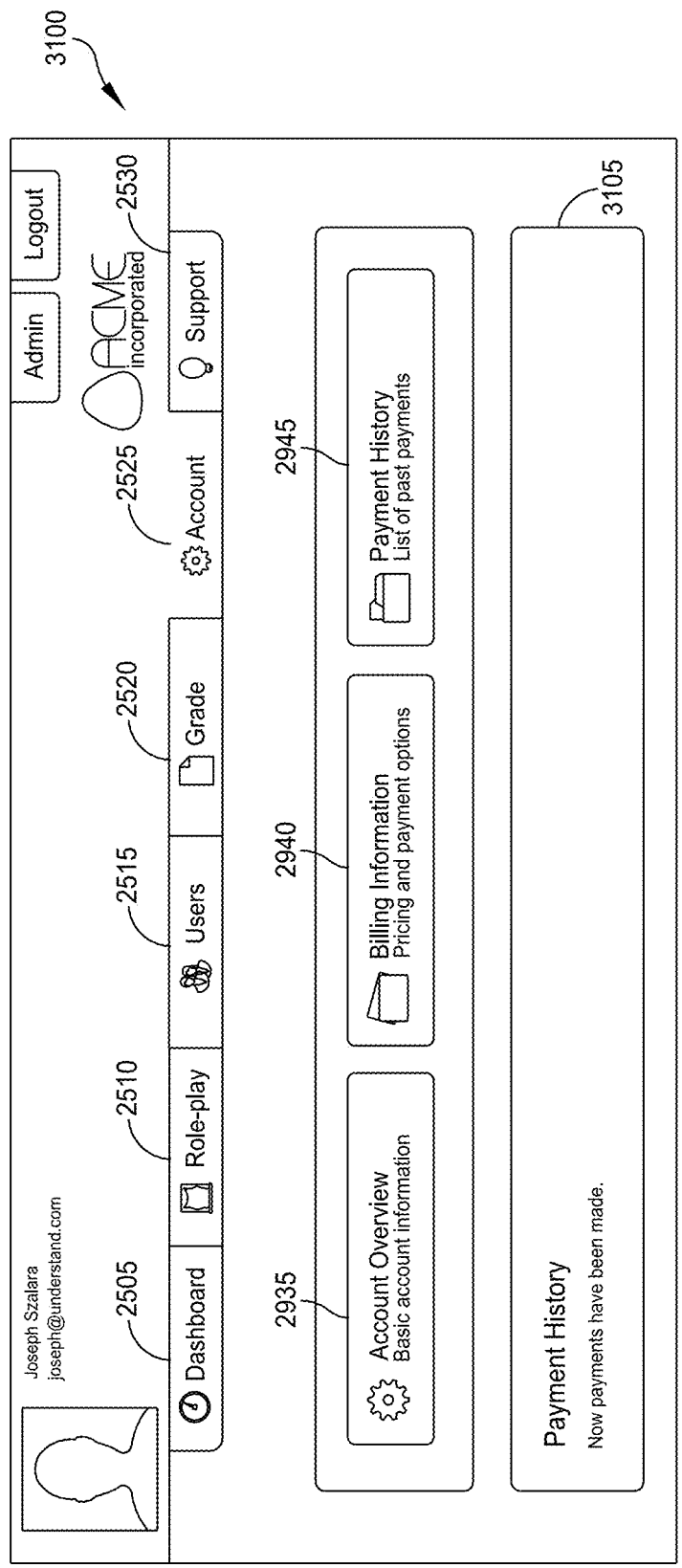
FIG. 31 is a screen capture of a client device of FIG. 1 displaying a payment history view.

Referring now to FIG. 30 and FIG. 31, detection of the click event associated with the Billing Information button 2940 displays a billing information view 3000 that includes billing information 3005 such as the number of users, the cost per user, the yearly total, when the next payment is due, the billing contact email, whether there is a credit card on file, and the like. Detection of the click event associated with an Add One Now button 3010 displays an editable interface (not shown) for entering credit card information. Detection of the click event associated with the Edit Card button 3015 displays an editable interface (not shown) for entering credit card information. Detection of the click event associated with the Payment History button displays a payment history view 3100 that can include payment history information 3105.

Figure 32A:
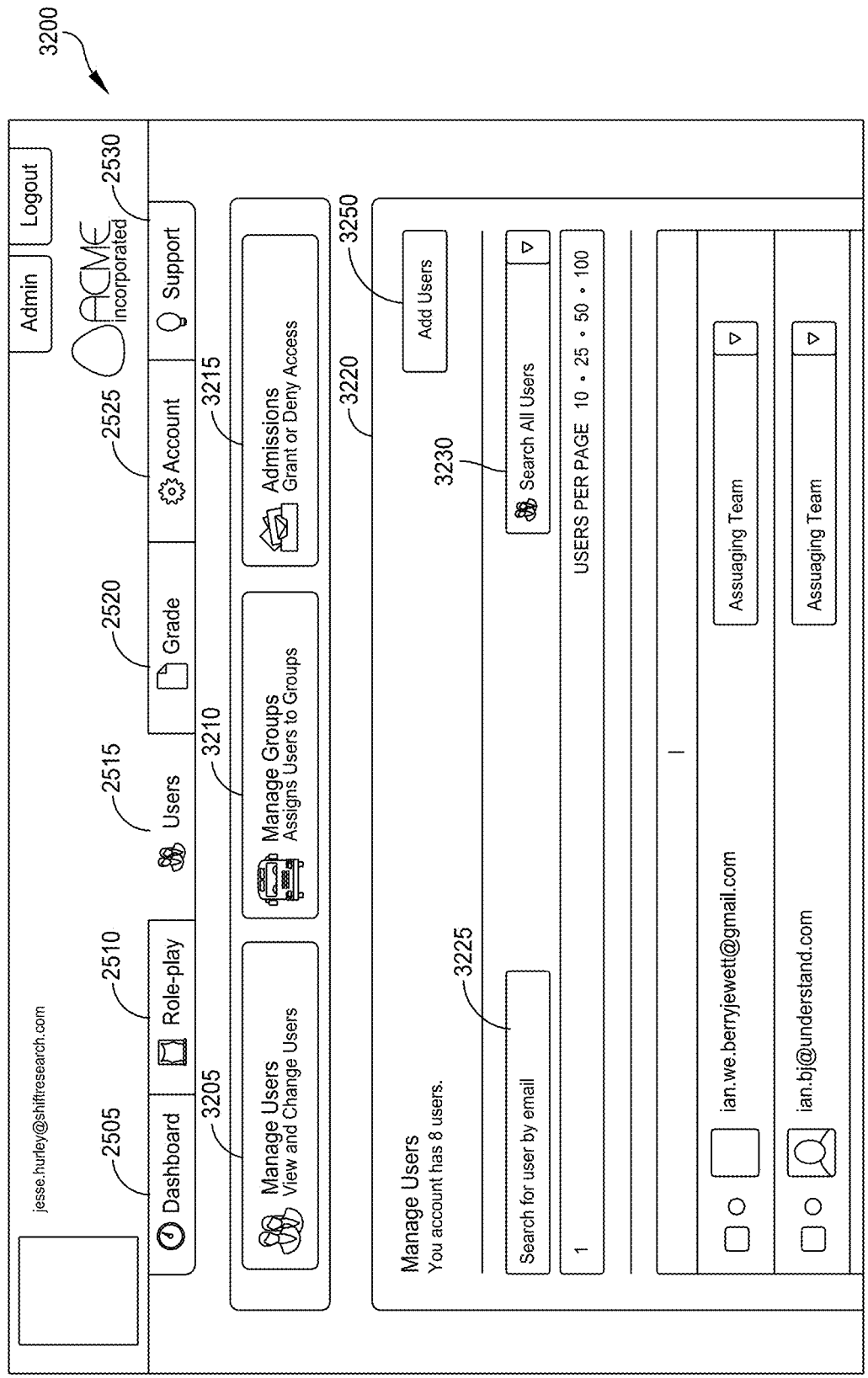
FIG. 32A is a screen capture of a client device of FIG. 1 displaying an admin users view.
Figure 32B:
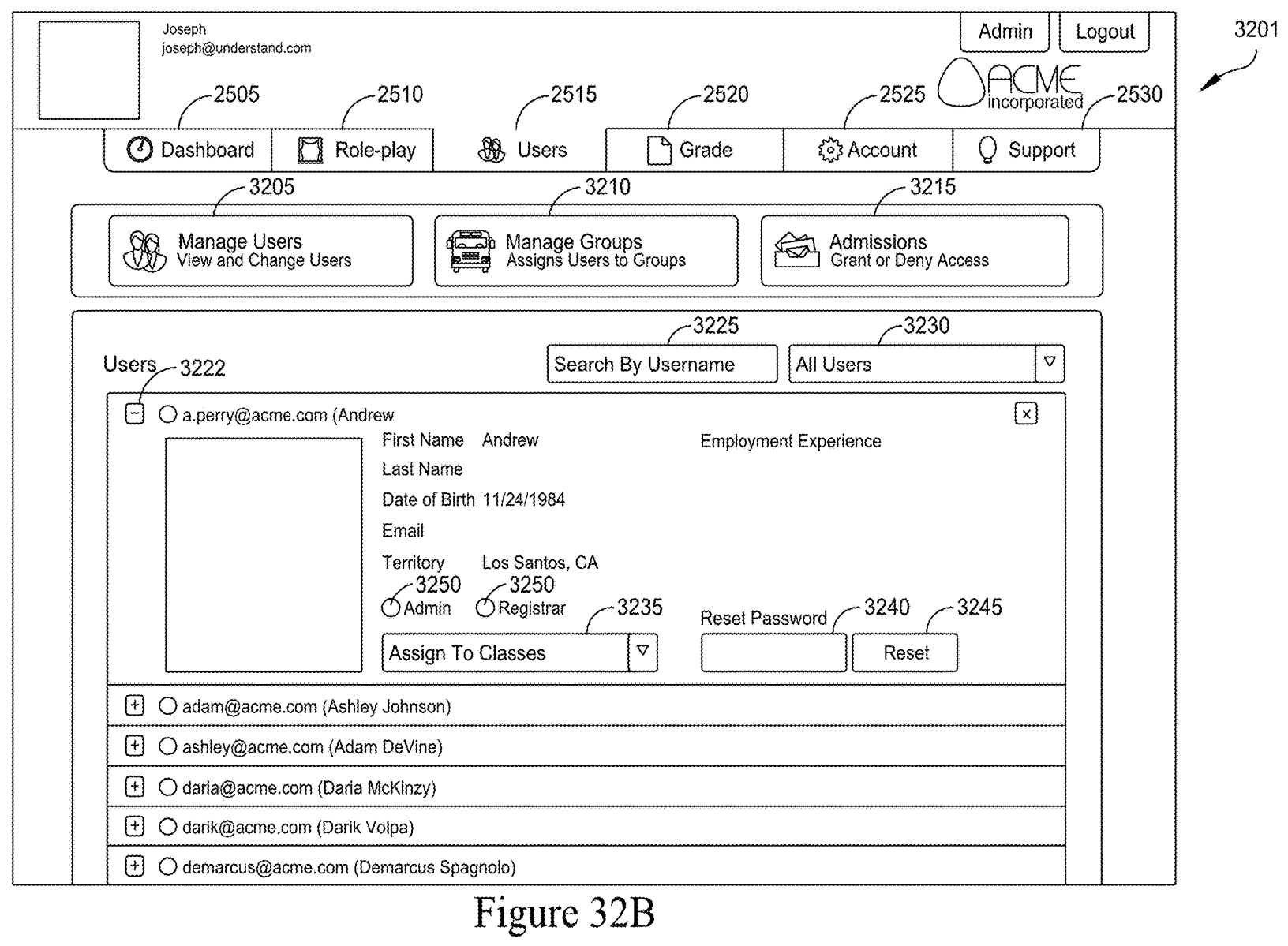

Referring now to FIG. 32A and FIG. 32B, detection of the click event associated with the Users tab control 2515 displays the user management view 3200, including a Manage Users button 3205 providing direct access to user management features, a Manage Groups button 3210 providing direct access to class management features, an Admissions button 3215 providing direct access to admission request management features, and a user details section 1020. The user details section 3220 includes a list of users.

Detection of the click event associated with a user list item expands to display information including biographical information and associated controls 3201. Detection of a selection event associated with a user roles assignment radio button 3250, 3235 toggles the roles and privileges for that user such as, for example the ability for a user to access the administrative module and the ability of the user to accept and reject registration requests. Selection of one or more items in an Assign to Classes drop list 3235 assigns a user to one or more classes such that associated video role-plays are available to the user. Entering a valid password string in the reset password edit box 3240 combined with detection of the click event associated with the Reset button 3245 resets the associated user's password.

Figure 33:
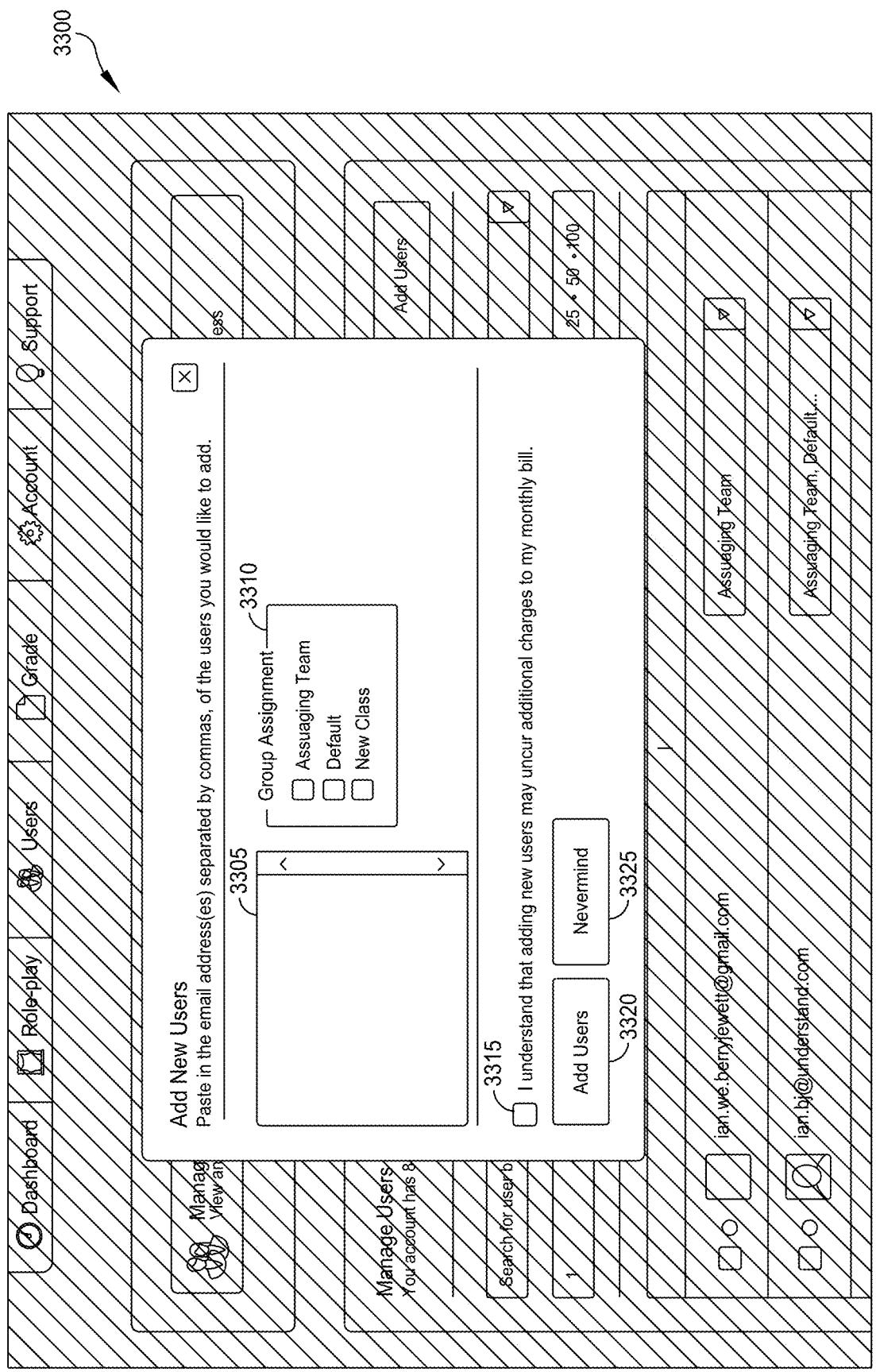
FIG. 33 is a screen capture of a client device of FIG. 1 displaying an admin add user dialog view.

Referring now to FIG. 33, detection of the click event associated with the Add User button 3250 (see, e.g., FIG. 32A) displays the add user view 3300. The view can include controls for browsing and selecting users 3305, assigning groups 3310, and authorization of related charges 3315. Button controls for confirming the add event 3320 or cancelling the add event 3325 can provide methods for exiting the view 3300.

Figure 34:
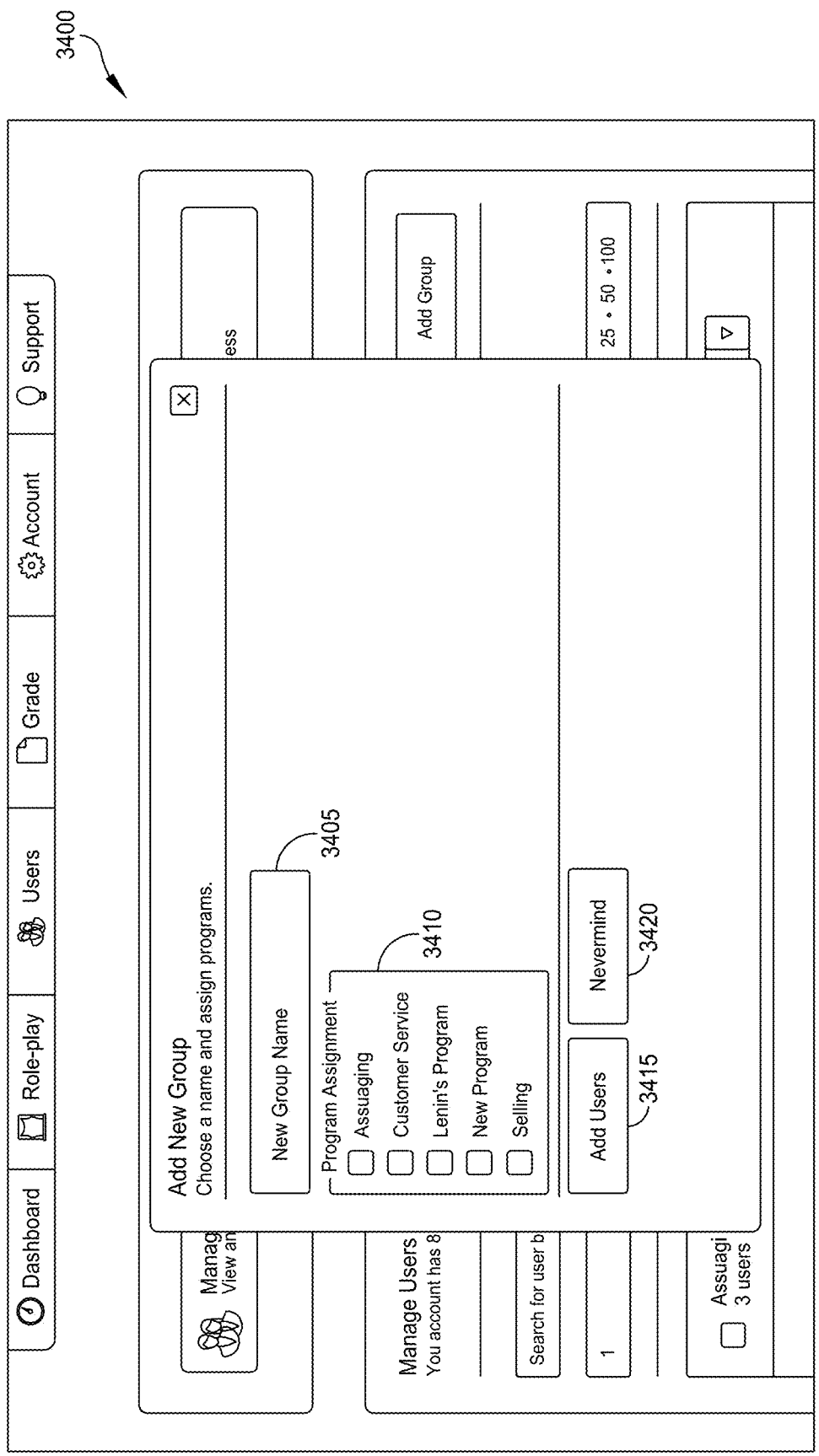
FIG. 34 is a screen capture of a client device of FIG. 1 displaying an admin add group dialog view.

Referring now to FIG. 34, detection of the click event associated with the Add Group button (Not Shown) displays the add group view 3400. The view can include controls for naming the new group 3405 and assigning programs 3410. Button controls for confirming the add group 3420 or cancelling the add group event 3425 can provide methods for exiting the view 3400.

Figure 35:
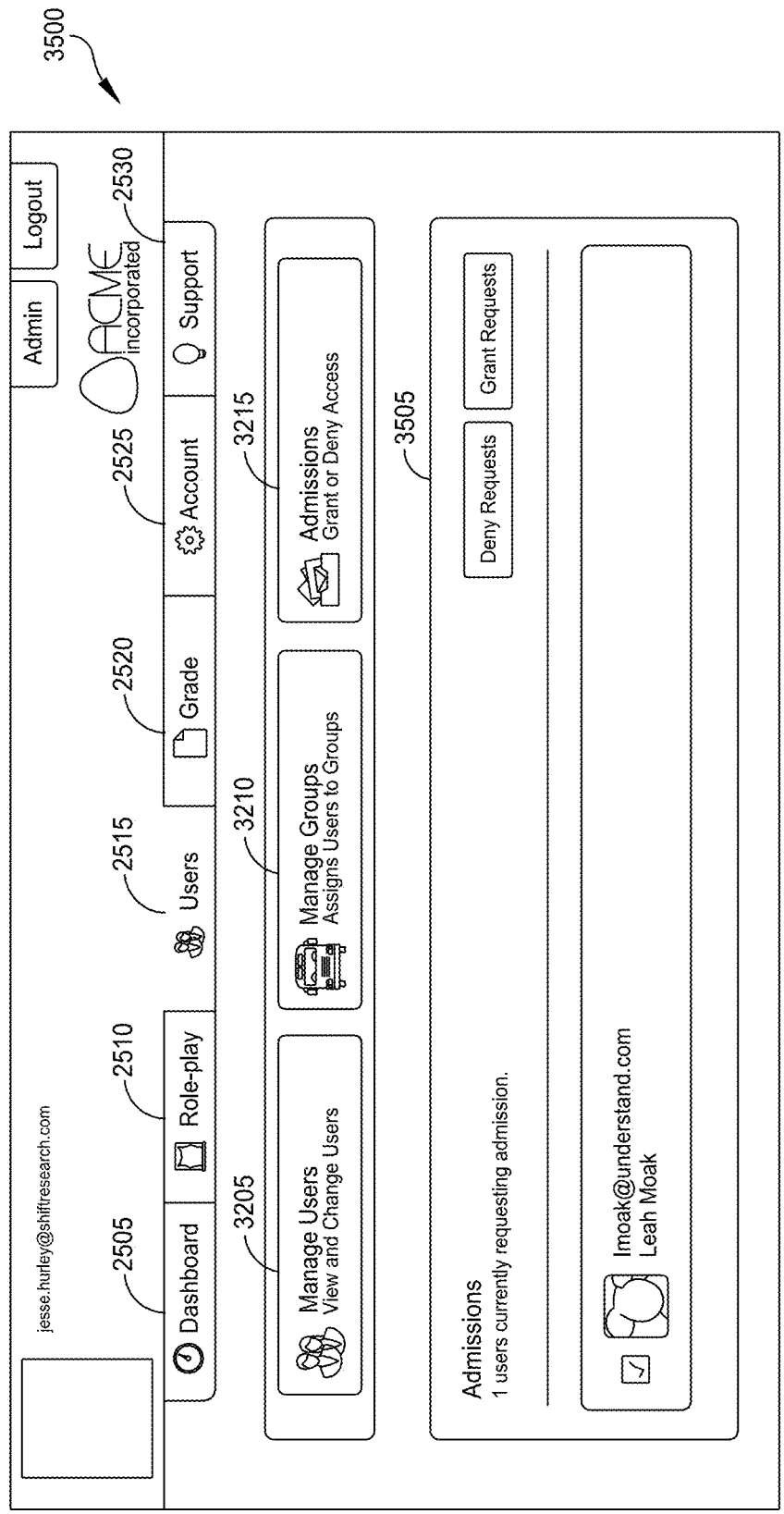
FIG. 35 is a screen capture of a client device of FIG. 1 displaying an admin admissions view.
Figure 36:
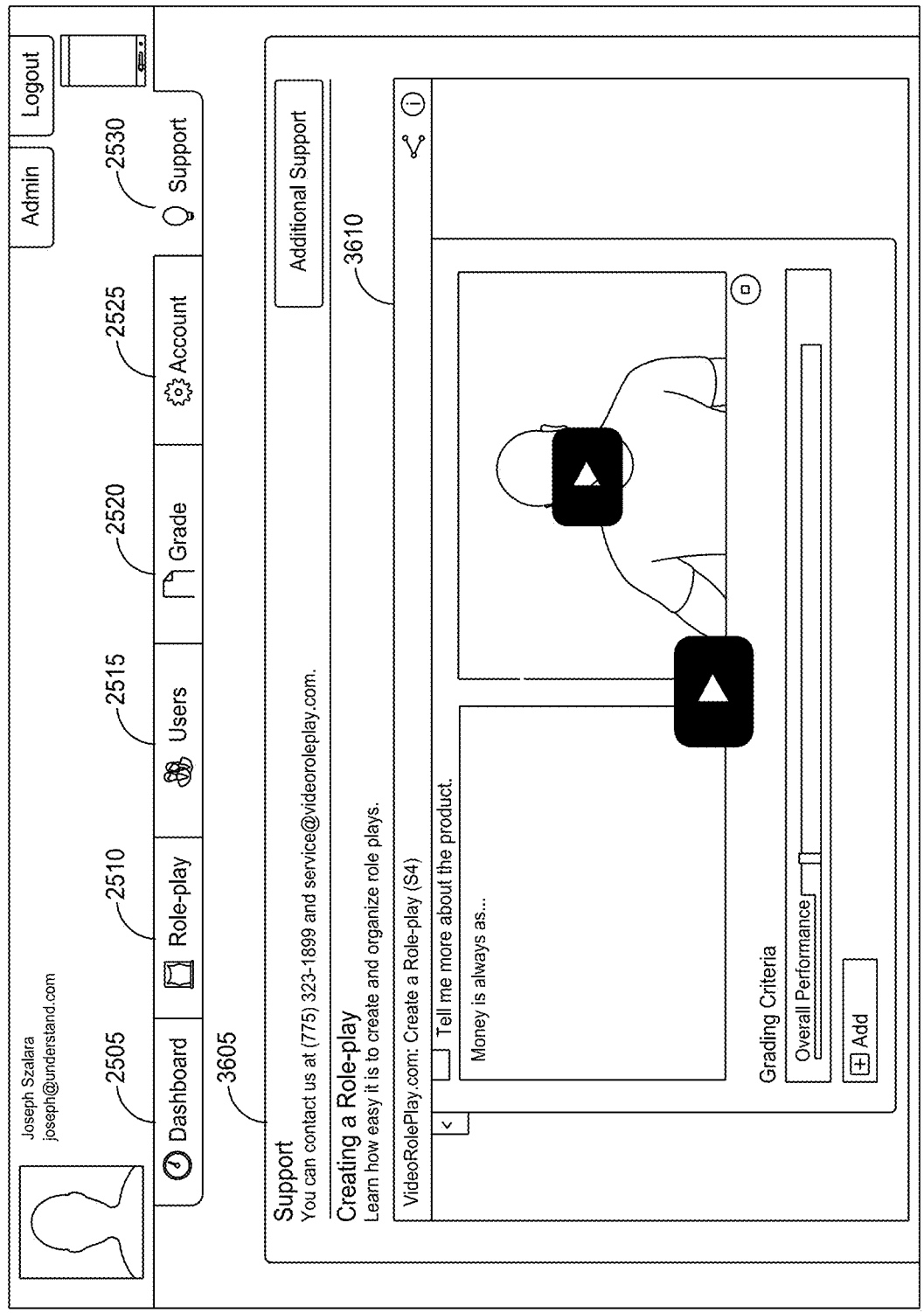
FIG. 36 is a screen capture of a client device of FIG. 1 displaying an admin support view.

Referring now to FIG. 35, detection of click event associated with the Admissions button 3215 displays an Admissions section 3505 that includes a list of admission requests and interface controls to manage those requests, such as a grant admission request control, a deny admission request control, or both, Referring now to FIG. 36, detection of the click event associated with the Support tab 2530 displays the support view 3600. A support container 3605 includes a video playback control 3610 displaying one or more support videos.

While the foregoing disclosure sets forth various embodiments using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The various illustrative blocks, components, and engines described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, multiple microprocessors, one or more microprocessors in conjunction with a DSP core, or any other such configuration.

Furthermore, while various embodiments have been described and/or illustrated herein in the context of fully functional computing systems, the functions described herein can be implemented in hardware, software executed by a processor, firmware, or any combination thereof. If implemented in software executed by a processor, the functions can be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as can be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon." Also, the term "immediately" with respect to a delay of machine action means without delay typically perceivable by human users.

What is claimed is:

1. A video role-play teaching computing machine comprising in combination:
   A. a computing system including: (i) at least one processor, at least one computer memory, and at least one automated display and (ii) local or remotely accessible digital video storage; and
   B. a role-playing-and-management interface displayable on the automated display and providing user-selectable, automated display of:
      (i) a plurality of student-recorded role-play videos;
      (ii) one or more automated feedback facilities for the user to input user feedback to a plurality of role-playing students relating to one or more student-recorded role-play videos,; wherein the plurality of student recorded role-play videos are prioritized in an interactive leaderboard; and (iii) a hot seat facility for the user comprising a predetermined maximum number of times a scenario video associated with the student role-play can be viewed uninterrupted before a response video is recorded, and wherein said response video comprises a single student recorded role-play, the recording of the single student recorded roleplay being automatically initiated following playback of the maximum number of views of the video.

2. The video role-play teaching computing machine of claim 1 wherein, the prioritization of the student recorded role-play videos is based on at least one ranking of user-selectable metrics.

3. The video role-play teaching computing machine of claim 2 wherein the role-playing-and-management interface further provides a user-selectable automated display of the interactive leaderboard, wherein the user-selectable metrics include at least one from the group consisting of: a student selected favorite; number of total votes from users; and selection by an evaluator.

4. The video role-play teaching computing machine of claim 1 wherein the role-playing-and-management interface further provides user-selectable, automated display of an automated role-play scenario input facility for the user to input role-play scenarios.

5. The video role-play teaching computing machine of claim 4 wherein the role-playing-and-management interface further provides user-selectable, automated display of an automated role-play scenario input facility for the user to input role-play scenarios.

6. The video role-play teaching computing machine of claim 1 wherein the role-playing-and-management interface further provides a user-selectable, automated display of an automated calendar for the user to input role-play related dates.

7. The video role-play teaching computing machine of claim 3 wherein the role-playing-and-management interface further provides a user-selectable, automated display of an automated calendar for the user to input role-play related dates.

8. The video role-play teaching computing machine of claim 5 wherein the role-playing-and-management interface further provides a user-selectable, automated display of an automated calendar for the user to input role-play related dates.

9. A video role-play teaching computing machine comprising in combination:

A a computing system including: (i) at least one processor, at least one computer memory, and at least one automated display and (ii) local or remotely accessible digital video storage; and B. a role-playing-and-management interface displayable on the automated display and providing user-selectable, automated display of:
(i) a plurality of student-recorded role-play videos;
(ii) one or more automated feedback facilities for the user to input user feedback to a plurality of role-playing students relating to one or more student-recorded role-play videos; and
(iii) a hot seat facility comprising a maxiumum predetermined number of times a scenario video associated with the student role-play can be viewed uninterrupted before a response video is recorded, and wherein said response video comprises a single student recorded role-play, the recording of the single student recorded roleplay being automatically initiated following playback of the maximum number of views of the scenario video.

10. The video role-play teaching computing machine of claim 9 wherein the pre-determined number of times the video can be viewed is one.

11. The video role-play teaching computing machine of claim 1 wherein the role-playing-and-management interface further provides user-selectable, automated display of an automated role-play scenario input facility for the user to input role-play scenarios.

12. The video role-play teaching computing machine of claim 1 wherein the role-playing-and-management interface further provides a user-selectable, automated display of an automated calendar for the user to input role-play related dates.

13. An automated role-play teaching process run on a computing machine having, (i) at least one processor, at least one computer memory, and at least one automated display, and (ii) local or remotely accessible digital video storage, comprising:

A. providing a display of a role-playing-and-management interface on the automated display;

B. in the role-playing-and-management interface on the automated display, providing user-selectable, automated display of (i) a plurality of student-recorded role-play videos and (ii) one or more automated user-to-student feedback facilities;
wherein the user can view a student role-play video and provide feedback to the student through the role-playing-and-management interface on the automated display;

C. providing user-selectable automated display of a role-playing leaderboard ranking role- playing students or student-recorded role-play video; and D. providing a hotseat facility for the user comprising a maximum pre-determined number of times a scenario video associated with the student role-play can be viewed uninterrupted before a response video is recorded, and wherein said response video comprises a single student recorded role-play, the recording of the single student recorded roleplay being automatically initiated following playback of the maximum number of views of the scenario video.

14. The automated role-play teaching process of claim 13 further comprising:

E. in the role-playing-and-management interface on the automated display, providing user-selectable, automated display of an automated user role-play scenario input facility.

15. The automated role-play teaching process of claim 13 further comprising:

E. in the role-playing-and-management interface on the automated display, providing a user-controllable, automated display of an automated role-play data calendar.

16. A video role-play teaching computing machine comprising in combination:

A. a computing system including: (i) at least one processor, at least one computer memory, and at least one automated display and (ii) local or remotely accessible digital video storage; and B. a role-playing-and-management interface displayable on the automated display and providing:
(i) student-selectable, automated display of a student role-play video recording and uploading facility;

(ii) student-selectable, automated display of one or more automated feedback facilities for the student to review teacher feedback relating to one or more student-recorded role-play videos; wherein the plurality of student recorded role- play videos are prioritized in an interactive leaderboard, the prioritization of the student recorded role-play videos based on at least one ranking of user-selectable metrics; and (iii) a hotseat facility comprising a maximum predetermined number of times a scenario video associated with the student role-play can be viewed uninterrupted before a response video is recorded, and wherein said response video comprises a single student recorded role-play, the recording of the single student recorded roleplay being automatically initiated following playback of the maximum number of views of the scenario video.

17. The video role-play teaching computing machine of claim 16 wherein the role-playing- and-management interface further provides student-selectable, automated display of one or more role-play scenarios.

18. The video role-play teaching computing machine of claim 16 wherein the role-playing- and-management interface further provides a student-selectable, automated display of an automated calendar of role-play related dates.

19. The video role-play teaching computing machine of claim 16 wherein the role-playing- and-management interface further provides:
(i) student-selectable automated display of a role-playing leaderboard ranking role-playing students or student-recorded role-play videos;
(ii) a student-selectable, automated display of one or more role-play scenarios; and
(iii) a student-selectable, automated display of an automated calendar of role-play related dates.

20. The video role-play teaching computing machine of claim 16 wherein the role-playing- and-management interface further provides:
(i) student-selectable automated display of a role-playing leaderboard ranking role-playing students or student-recorded role-play videos;
(ii) a student-selectable, automated display of one or more role-play scenarios; and
(iii) a student-selectable, automated display of an automated calendar of role-play related dates.

21. A video role-play teaching server system comprising in combination:
A a computing server system including: (i) at least one processor, (ii) at least one computer memory, and (iii) local or remotely accessible digital video storage; and
B. an application for transmitting a role-playing-and-management interface displayable on a remote automated display and providing (i) user-selectable, automated display of a plurality of student-recorded role-play videos; (ii) user-selectable, automated display of one or more automated user feedback facilities for the user to input user feedback to a plurality of role-playing students relating to one or more student-recorded role-play videos; wherein the plurality of student recorded role-play videos are prioritized in an interactive leaderboard, the prioritization of the student recorded role-play videos based on at least one ranking of user-selectable metrics; and (iii) a hotseat facility for the user comprising a masimum predetermined number of times a scenario video associated with the student role-play can be viewed uninterrupted before a response video is recorded, and wherein said response video comprises a single student recorded role-play, the recording of the single student recorded roleplay being automatically initiated following playback of the maximum number of views of the scenario video.

22. An automated role-play teaching application server process comprising
with a computing server system having (i) at least one processor, (ii) at least one computer memory, and (iii) digital video storage, automatically serving toward each among a plurality of remote automated displays an automated role-playing-and-management interface providing (i) user-selectable, automated display of a plurality of student-recorded role-play videos (ii) user-selectable, automated display of one or more automated user-to-student feedback facilities; whereby the user can view a student role-play video and provide feedback to the student through the role-playing-and-management interface on the automated display; and (iii) a hotseat facility comprising a maximum pre-determined number of times a scenario video associated with the student role-play can be viewed uninterrupted before a response video is recorded, and wherein said response video comprises a single student recorded role-play, the recording of the single student recorded roleplay being automatically initiated following playback of the maximum number of views of the scenario video.

23. The automated role-play teaching application server process of claim 22 wherein the role playing-and-management interface further provides user-selectable automated display of a role-playing leaderboard ranking role-playing students or student-recorded role-play videos.

24. The automated role-play teaching application server process of claim 22 wherein the role-playing-and-management interface further provides user-selectable, automated display of an automated user role-play scenario input facility.

25. The automated role-play teaching application server process of claim 22 wherein the role-playing-and-management interface further provides a user-controllable, automated display of an automated role-play data calendar.

26. A video role-play application server process comprising:
with a computing system including: (i) at least one processor, (ii) at least one computer memory, and (iii) digital video storage, serving toward each among a plurality of remote automated displays a role-playing-and-management interface providing (i) a student-selectable, automated display of a student role-play video recording and uploading facility; (ii) a student-selectable, automated display of one or more automated feedback facilities for a student to review teacher feedback relating to one or more student-recorded role-play videos; wherein the plurality of student recorded role-play videos are prioritized in an interactive leaderboard, the prioritization of the student recorded role-play videos based on at least one ranking of user-selectable metrics; and (iii) a hotseat facility comprising a pre-determined maximum number of times a scenario video associated with the student role-play can be viewed continuously before a response video is recorded, and wherein said response video comprises a single student recorded role-play, the recording of the single student recorded roleplay being automatically initiated following playback of the maximum number of views of scenario video.

27. The video role-play teaching application server process of claim 26 wherein the role-playing-and-management interface further provides student-selectable automated display of a role-playing leaderboard ranking role-playing students or student-recorded role-play videos.

28. The video role-play teaching application server process of claim 26 wherein the role-playing-and-management interface further provides student-selectable, automated display of one or more role-play scenarios.

29. The video role-play teaching application server process of claim 26 wherein the role-playing-and-management interface further provides a student-selectable, automated display of an automated calendar of role-play related dates.

* * * * *